US012435363B1

(12) United States Patent
Gallant et al.

(10) Patent No.: US 12,435,363 B1
(45) Date of Patent: Oct. 7, 2025

(54) MATERIALS AND METHODS FOR SPATIAL TRANSCRIPTOMICS

(71) Applicant: 10x Genomics, Inc., Pleasanton, CA (US)

(72) Inventors: Caroline Julie Gallant, Stockholm (SE); Augusto Manuel Tentori, Pleasanton, CA (US); Hanyoup Kim, Pleasanton, CA (US); Rajiv Bharadwaj, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 328 days.

(21) Appl. No.: 17/343,271

(22) Filed: Jun. 9, 2021

Related U.S. Application Data

(60) Provisional application No. 63/037,189, filed on Jun. 10, 2020, provisional application No. 63/037,305, filed on Jun. 10, 2020.

(51) Int. Cl.
*C12Q 1/6837* (2018.01)
*G01N 21/64* (2006.01)

(52) U.S. Cl.
CPC ....... *C12Q 1/6837* (2013.01); *G01N 21/6428* (2013.01); *G01N 21/6458* (2013.01); *G01N 2021/6439* (2013.01)

(58) Field of Classification Search
CPC ............. C12Q 1/6837; G01N 21/6428; G01N 21/6458; G01N 2021/6439
See application file for complete search history.

(56) References Cited

U.S. PATENT DOCUMENTS

| | | |
|---|---|---|
| 4,683,195 A | 7/1987 | Mullis |
| 4,683,202 A | 7/1987 | Mullis |
| 4,800,159 A | 1/1989 | Mullis |
| 4,883,867 A | 11/1989 | Lee |
| 4,965,188 A | 10/1990 | Mullis |
| 5,002,882 A | 3/1991 | Lunnen |
| 5,130,238 A | 7/1992 | Malek |
| 5,308,751 A | 5/1994 | Ohkawa |
| 5,321,130 A | 6/1994 | Yue |
| 5,410,030 A | 4/1995 | Yue |
| 5,436,134 A | 7/1995 | Haugland |
| 5,455,166 A | 10/1995 | Walker |
| 5,494,810 A | 2/1996 | Barany et al. |
| 5,503,980 A | 4/1996 | Cantor |
| 5,512,439 A | 4/1996 | Hornes |
| 5,512,462 A | 4/1996 | Cheng |
| 5,582,977 A | 12/1996 | Yue |

(Continued)

FOREIGN PATENT DOCUMENTS

| | | |
|---|---|---|
| CN | 1680604 | 10/2005 |
| EP | 1923471 | 5/2008 |

(Continued)

OTHER PUBLICATIONS

Howell (Genome Research (202) vol. 12, pp. 1401-1407).*

(Continued)

*Primary Examiner* — Anne M. Gussow
*Assistant Examiner* — Allison E Shloop
(74) *Attorney, Agent, or Firm* — Fish & Richardson P.C.

(57) ABSTRACT

Provided herein are methods of determining efficiencies of spatial transcriptomics methods.

17 Claims, 7 Drawing Sheets

Specification includes a Sequence Listing.

(56) References Cited

U.S. PATENT DOCUMENTS

| | | |
|---|---|---|
| 5,599,675 A | 2/1997 | Brenner |
| 5,641,658 A | 6/1997 | Adams |
| 5,648,245 A | 7/1997 | Fire et al. |
| 5,658,751 A | 8/1997 | Yue |
| 5,750,341 A | 5/1998 | Macevicz |
| 5,763,175 A | 6/1998 | Brenner |
| 5,830,711 A | 11/1998 | Barany et al. |
| 5,837,832 A | 11/1998 | Chee et al. |
| 5,854,033 A | 12/1998 | Lizardi |
| 5,863,753 A | 1/1999 | Haugland |
| 5,871,921 A | 2/1999 | Landegren et al. |
| 5,912,148 A | 6/1999 | Eggerding |
| 5,962,272 A | 10/1999 | Chenchik et al. |
| 6,013,440 A | 1/2000 | Lipshutz |
| 6,027,889 A | 2/2000 | Barany et al. |
| 6,060,240 A | 5/2000 | Kamb et al. |
| 6,130,073 A | 10/2000 | Eggerding |
| 6,143,496 A | 11/2000 | Brown |
| 6,153,389 A | 11/2000 | Haarer |
| 6,165,714 A | 12/2000 | Lane et al. |
| 6,210,891 B1 | 4/2001 | Nyren |
| 6,210,894 B1 | 4/2001 | Brennan |
| 6,214,587 B1 | 4/2001 | Dattagupta |
| 6,258,568 B1 | 7/2001 | Nyren |
| 6,265,552 B1 | 7/2001 | Schatz |
| 6,266,459 B1 | 7/2001 | Walt |
| 6,274,320 B1 | 8/2001 | Rothberg |
| 6,300,063 B1 | 10/2001 | Lipshutz et al. |
| 6,309,824 B1 | 10/2001 | Drmanac |
| 6,344,316 B1 | 2/2002 | Lockhart |
| 6,355,431 B1 | 3/2002 | Chee |
| 6,368,801 B1 | 4/2002 | Faruqi |
| 6,401,267 B1 | 6/2002 | Drmanac |
| 6,404,907 B1 | 6/2002 | Gilchrist |
| 6,432,360 B1 | 8/2002 | Church et al. |
| 6,503,713 B1 | 1/2003 | Rana |
| 6,506,561 B1 | 1/2003 | Cheval et al. |
| 6,544,732 B1 | 4/2003 | Chee |
| 6,620,584 B1 | 9/2003 | Chee |
| 6,632,641 B1 | 10/2003 | Brennan |
| 6,737,236 B1 | 5/2004 | Pieken et al. |
| 6,770,441 B2 | 8/2004 | Dickinson |
| 6,773,886 B2 | 8/2004 | Kaufman |
| 6,787,308 B2 | 9/2004 | Balasubramanian |
| 6,800,453 B2 | 10/2004 | Labaer |
| 6,812,005 B2 | 11/2004 | Fan et al. |
| 6,828,100 B1 | 12/2004 | Ronaghi |
| 6,833,246 B2 | 12/2004 | Balasubramanian |
| 6,859,570 B2 | 2/2005 | Walt |
| 6,864,052 B1 | 3/2005 | Drmanac |
| 6,897,023 B2 | 5/2005 | Fu |
| 6,942,968 B1 | 9/2005 | Dickinson et al. |
| 7,057,026 B2 | 6/2006 | Barnes |
| 7,115,400 B1 | 10/2006 | Adessi |
| 7,118,883 B2 | 10/2006 | Inoue |
| 7,166,431 B2 | 1/2007 | Chee et al. |
| 7,211,414 B2 | 5/2007 | Hardin |
| 7,255,994 B2 | 8/2007 | Lao |
| 7,258,976 B2 | 8/2007 | Mitsuhashi |
| 7,297,518 B2 | 11/2007 | Quake |
| 7,329,492 B2 | 2/2008 | Hardin |
| 7,361,488 B2 | 4/2008 | Fan et al. |
| 7,378,242 B2 | 5/2008 | Hurt |
| 7,393,665 B2 | 7/2008 | Brenner |
| 7,405,281 B2 | 7/2008 | Xu |
| 7,407,757 B2 | 8/2008 | Brenner |
| 7,537,897 B2 | 5/2009 | Brenner |
| 7,563,576 B2 | 7/2009 | Chee |
| 7,582,420 B2 | 9/2009 | Oliphant et al. |
| 7,601,498 B2 | 10/2009 | Mao |
| 7,635,566 B2 | 12/2009 | Brenner |
| 7,674,752 B2 | 3/2010 | He |
| 7,709,198 B2 | 5/2010 | Luo et al. |
| 7,776,567 B2 | 8/2010 | Mao |
| 7,803,943 B2 | 9/2010 | Mao |
| 7,910,304 B2 | 3/2011 | Drmanac |
| 7,955,794 B2 | 6/2011 | Shen et al. |
| 7,960,119 B2 | 6/2011 | Chee |
| 8,003,354 B2 | 8/2011 | Shen et al. |
| 8,148,068 B2 | 4/2012 | Brenner |
| 8,206,917 B2 | 6/2012 | Chee |
| 8,288,103 B2 | 10/2012 | Oliphant |
| 8,460,865 B2 | 6/2013 | Chee |
| 8,481,257 B2 | 7/2013 | Van Eijk |
| 8,603,743 B2 | 12/2013 | Liu et al. |
| 8,604,182 B2 | 12/2013 | Luo et al. |
| 8,815,512 B2 | 8/2014 | Van Eijk |
| 8,835,358 B2 | 9/2014 | Fodor |
| 8,911,945 B2 | 12/2014 | Van Eijk |
| 8,951,726 B2 | 2/2015 | Luo et al. |
| 9,062,348 B1 | 6/2015 | Van Eijk |
| 9,194,001 B2 | 11/2015 | Brenner |
| 9,290,808 B2 | 3/2016 | Fodor |
| 9,290,809 B2 | 3/2016 | Fodor |
| 9,328,383 B2 | 5/2016 | Van Eijk |
| 9,334,536 B2 | 5/2016 | Van Eijk |
| 9,371,598 B2 | 6/2016 | Chee |
| 9,506,061 B2 | 11/2016 | Brown et al. |
| 9,593,365 B2 | 3/2017 | Frisen et al. |
| 9,644,204 B2 | 5/2017 | Hindson et al. |
| 9,694,361 B2 | 7/2017 | Bharadwaj |
| 9,702,004 B2 | 7/2017 | Van Eijk |
| 9,727,810 B2 | 8/2017 | Fodor et al. |
| 9,777,324 B2 | 10/2017 | Van Eijk |
| 9,783,841 B2 | 10/2017 | Nolan et al. |
| 9,834,814 B2 | 12/2017 | Peter et al. |
| 9,850,536 B2 | 12/2017 | Oliphant et al. |
| 9,868,979 B2 | 1/2018 | Chee et al. |
| 9,879,313 B2 | 1/2018 | Chee et al. |
| 10,002,316 B2 | 6/2018 | Fodor et al. |
| 10,023,907 B2 | 7/2018 | Van Eijk |
| 10,030,261 B2 | 7/2018 | Frisen et al. |
| 10,041,949 B2 | 8/2018 | Bendall et al. |
| 10,059,990 B2 | 8/2018 | Boyden et al. |
| 10,208,982 B2 | 2/2019 | Bannish et al. |
| 10,273,541 B2 | 4/2019 | Hindson et al. |
| 10,308,982 B2 | 6/2019 | Chee |
| 10,357,771 B2 | 7/2019 | Bharadwaj |
| 10,472,669 B2 | 11/2019 | Chee |
| 10,480,022 B2 | 11/2019 | Chee |
| 10,480,029 B2 | 11/2019 | Bent et al. |
| 10,494,667 B2 | 12/2019 | Chee |
| 10,550,429 B2 | 2/2020 | Harada et al. |
| 10,590,244 B2 | 3/2020 | Delaney et al. |
| 10,662,468 B2 | 5/2020 | Chee |
| 10,724,078 B2 | 7/2020 | Van Driel et al. |
| 10,725,027 B2 | 7/2020 | Bell |
| 10,774,372 B2 | 9/2020 | Chee et al. |
| 10,774,374 B2 | 9/2020 | Frisen et al. |
| 10,787,701 B2 | 9/2020 | Chee |
| 10,858,702 B2 | 12/2020 | Lucero et al. |
| 10,913,975 B2 | 2/2021 | So et al. |
| 10,914,730 B2 | 2/2021 | Chee et al. |
| 10,927,403 B2 | 2/2021 | Chee et al. |
| 10,961,566 B2 | 3/2021 | Chee |
| 11,001,879 B1 | 5/2021 | Chee |
| 11,008,607 B2 | 5/2021 | Chee |
| 11,046,996 B1 | 6/2021 | Chee et al. |
| 11,067,567 B2 | 7/2021 | Chee |
| 11,156,603 B2 | 10/2021 | Chee |
| 11,162,132 B2 | 11/2021 | Frisen et al. |
| 11,208,684 B2 | 12/2021 | Chee |
| 11,214,796 B2 | 1/2022 | Shirai et al. |
| 11,286,515 B2 | 3/2022 | Chee et al. |
| 11,293,917 B2 | 4/2022 | Chee |
| 11,299,774 B2 | 4/2022 | Frisen et al. |
| 11,313,856 B2 | 4/2022 | Chee |
| 11,332,790 B2 | 5/2022 | Chell et al. |
| 11,352,659 B2 | 6/2022 | Frisen et al. |
| 11,352,667 B2 | 6/2022 | Hauling et al. |
| 11,359,228 B2 | 6/2022 | Chee et al. |
| 11,365,442 B2 | 6/2022 | Chee |
| 11,371,086 B2 | 6/2022 | Chee |
| 11,384,386 B2 | 7/2022 | Chee |

(56) References Cited

U.S. PATENT DOCUMENTS

| | | |
|---|---|---|
| 11,390,912 B2 | 7/2022 | Frisen et al. |
| 11,401,545 B2 | 8/2022 | Chee |
| 11,407,992 B2 | 8/2022 | Dadhwal |
| 11,408,029 B2 | 8/2022 | Katiraee et al. |
| 11,434,524 B2 | 9/2022 | Ramachandran Iyer et al. |
| 11,459,607 B1 | 10/2022 | Terry et al. |
| 11,479,809 B2 | 10/2022 | Frisen et al. |
| 11,479,810 B1 | 10/2022 | Chee |
| 11,492,612 B1 | 11/2022 | Dadhwal |
| 11,501,440 B2 | 11/2022 | Weisenfeld et al. |
| 11,505,828 B2 | 11/2022 | Chell et al. |
| 11,512,308 B2 | 11/2022 | Gallant et al. |
| 11,519,022 B2 | 12/2022 | Chee |
| 11,519,033 B2 | 12/2022 | Schnall-Levin et al. |
| 11,519,138 B2 | 12/2022 | Meier et al. |
| 11,530,438 B2 | 12/2022 | Persson et al. |
| 11,535,887 B2 | 12/2022 | Gallant et al. |
| 11,542,543 B2 | 1/2023 | Chee |
| 11,549,138 B2 | 1/2023 | Chee |
| 11,560,587 B2 | 1/2023 | Chee |
| 11,560,592 B2 | 1/2023 | Chew et al. |
| 11,560,593 B2 | 1/2023 | Chell et al. |
| 11,592,447 B2 | 2/2023 | Uytingco et al. |
| 11,608,498 B2 | 3/2023 | Gallant et al. |
| 11,608,520 B2 | 3/2023 | Galonska et al. |
| 11,613,773 B2 | 3/2023 | Frisen et al. |
| 11,618,897 B2 | 4/2023 | Kim et al. |
| 11,618,918 B2 | 4/2023 | Chee et al. |
| 11,624,063 B2 | 4/2023 | Dadhwal |
| 11,624,086 B2 | 4/2023 | Uytingco et al. |
| 11,634,756 B2 | 4/2023 | Chee |
| 11,649,485 B2 | 5/2023 | Yin et al. |
| 11,661,626 B2 | 5/2023 | Katiraee et al. |
| 11,680,260 B2 | 6/2023 | Kim et al. |
| 11,692,218 B2 | 7/2023 | Engblom et al. |
| 11,702,693 B2 | 7/2023 | Bharadwaj |
| 11,702,698 B2 | 7/2023 | Stoeckius |
| 11,713,480 B2 | 8/2023 | Lee |
| 11,732,292 B2 | 8/2023 | Chee |
| 11,732,299 B2 | 8/2023 | Ramachandran Iyer |
| 11,732,300 B2 | 8/2023 | Bava |
| 11,733,238 B2 | 8/2023 | Chee |
| 11,739,372 B2 | 8/2023 | Frisen et al. |
| 11,739,381 B2 | 8/2023 | Chew et al. |
| 11,753,673 B2 | 9/2023 | Chew et al. |
| 11,753,674 B2 | 9/2023 | Chee et al. |
| 11,753,675 B2 | 9/2023 | Ramachandran Iyer |
| 11,761,030 B2 | 9/2023 | Chee |
| 11,761,038 B1 | 9/2023 | Stoeckius |
| 11,767,550 B2 | 9/2023 | Chee |
| 11,768,175 B1 | 9/2023 | Kim et al. |
| 11,773,433 B2 | 10/2023 | Gallant et al. |
| 11,781,130 B2 | 10/2023 | Dadhwal |
| 11,788,122 B2 | 10/2023 | Frisen et al. |
| 11,795,498 B2 | 10/2023 | Frisen et al. |
| 11,795,507 B2 | 10/2023 | Chell et al. |
| 11,808,769 B2 | 11/2023 | Uytingco et al. |
| 11,821,024 B2 | 11/2023 | Chee et al. |
| 11,821,035 B1 | 11/2023 | Bent et al. |
| 11,827,935 B1 | 11/2023 | Ramachandran Iyer et al. |
| 11,835,462 B2 | 12/2023 | Bava |
| 11,840,687 B2 | 12/2023 | Gallant et al. |
| 11,840,724 B2 | 12/2023 | Chew et al. |
| 11,845,979 B2 | 12/2023 | Engblom et al. |
| 11,859,178 B2 | 1/2024 | Gallant et al. |
| 11,866,767 B2 | 1/2024 | Uytingco et al. |
| 11,866,770 B2 | 1/2024 | Chee |
| 11,873,482 B2 | 1/2024 | Kim et al. |
| 11,891,654 B2 | 2/2024 | Alvarado Martinez et al. |
| 11,898,205 B2 | 2/2024 | Bava |
| 11,926,822 B1 | 3/2024 | Gohil et al. |
| 11,926,863 B1 | 3/2024 | Boutet |
| 11,926,867 B2 | 3/2024 | Yin et al. |
| 11,933,957 B1 | 3/2024 | Tentori et al. |
| 11,952,627 B2 | 4/2024 | Stoeckius |
| 11,959,076 B2 | 4/2024 | Kim et al. |
| 11,959,130 B2 | 4/2024 | Galonska et al. |
| 11,965,213 B2 | 4/2024 | Williams |
| 11,970,739 B2 | 4/2024 | Chew et al. |
| 11,981,958 B1 | 5/2024 | Galonska |
| 11,981,960 B1 | 5/2024 | Lin et al. |
| 11,981,965 B2 | 5/2024 | Chell et al. |
| RE50,065 E | 7/2024 | Frisen et al. |
| 12,024,741 B2 | 7/2024 | Tentori et al. |
| 12,031,177 B1 | 7/2024 | Tentori et al. |
| 12,060,604 B2 | 8/2024 | Katiraee et al. |
| 12,071,655 B2 | 8/2024 | Sukovich et al. |
| 12,076,701 B2 | 9/2024 | Bava |
| 12,098,417 B2 | 9/2024 | Engblom et al. |
| 12,098,985 B2 | 9/2024 | Cox et al. |
| 12,110,541 B2 | 10/2024 | Bava |
| 12,117,439 B2 | 10/2024 | Delaney et al. |
| 12,128,403 B2 | 10/2024 | Kim et al. |
| 12,129,516 B2 | 10/2024 | Tentori et al. |
| 12,157,124 B2 | 12/2024 | Cox et al. |
| 12,180,543 B2 | 12/2024 | Uytingco et al. |
| 12,195,790 B2 | 1/2025 | Sukovich et al. |
| 12,203,134 B2 | 1/2025 | Nagendran et al. |
| 12,209,280 B1 | 1/2025 | Mignardi et al. |
| D1,064,308 S | 2/2025 | Alimsijah et al. |
| 12,223,751 B2 | 2/2025 | Lin et al. |
| 12,228,544 B2 | 2/2025 | Kim et al. |
| 12,234,505 B2 | 2/2025 | Chee |
| 12,241,060 B2 | 3/2025 | Kim et al. |
| 12,241,890 B2 | 3/2025 | Delaney et al. |
| 2002/0040275 A1 | 4/2002 | Cravatt |
| 2002/0164611 A1 | 11/2002 | Bamdad |
| 2003/0017451 A1 | 1/2003 | Wang et al. |
| 2003/0022207 A1 | 1/2003 | Balasubramanian |
| 2003/0148335 A1 | 8/2003 | Shen et al. |
| 2003/0162216 A1 | 8/2003 | Gold |
| 2003/0211489 A1 | 11/2003 | Shen et al. |
| 2003/0224419 A1 | 12/2003 | Corcoran |
| 2003/0232348 A1 | 12/2003 | Jones et al. |
| 2003/0232382 A1 | 12/2003 | Brennan |
| 2004/0033499 A1 | 2/2004 | Ilsley et al. |
| 2004/0067492 A1 | 4/2004 | Peng et al. |
| 2004/0096853 A1 | 5/2004 | Mayer |
| 2004/0106110 A1 | 6/2004 | Balasubramanian |
| 2005/0037393 A1 | 2/2005 | Gunderson et al. |
| 2005/0048580 A1 | 3/2005 | Labaer |
| 2005/0100900 A1 | 5/2005 | Kawashima et al. |
| 2005/0130173 A1 | 6/2005 | Leamon et al. |
| 2005/0136414 A1 | 6/2005 | Gunderson et al. |
| 2005/0170373 A1 | 8/2005 | Monforte |
| 2005/0191656 A1 | 9/2005 | Drmanac et al. |
| 2005/0191698 A1 | 9/2005 | Chee et al. |
| 2005/0202433 A1 | 9/2005 | Van Beuningen |
| 2005/0227271 A1 | 10/2005 | Kwon |
| 2005/0260653 A1 | 11/2005 | LaBaer |
| 2006/0041385 A1 | 2/2006 | Bauer et al. |
| 2006/0211001 A1 | 9/2006 | Yu et al. |
| 2006/0216775 A1 | 9/2006 | Burkart et al. |
| 2006/0263789 A1 | 11/2006 | Kincaid |
| 2007/0020640 A1 | 1/2007 | McCloskey et al. |
| 2007/0054288 A1 | 3/2007 | Su et al. |
| 2007/0099208 A1 | 5/2007 | Drmanac et al. |
| 2007/0128624 A1 | 6/2007 | Gormley et al. |
| 2007/0128656 A1 | 6/2007 | Agrawal |
| 2007/0172873 A1 | 7/2007 | Brenner et al. |
| 2007/0207482 A1 | 9/2007 | Church et al. |
| 2007/0254305 A1 | 11/2007 | Paik et al. |
| 2007/0269805 A1 | 11/2007 | Hogers |
| 2008/0009420 A1 | 1/2008 | Schroth et al. |
| 2008/0108804 A1 | 5/2008 | Hayashizaki et al. |
| 2008/0160580 A1 | 7/2008 | Adessi et al. |
| 2008/0220434 A1 | 9/2008 | Thomas |
| 2008/0261204 A1 | 10/2008 | Lexow |
| 2008/0286795 A1 | 11/2008 | Kawashima et al. |
| 2009/0005252 A1 | 1/2009 | Drmanac et al. |
| 2009/0006002 A1 | 1/2009 | Honisch et al. |
| 2009/0018024 A1 | 1/2009 | Church et al. |
| 2009/0026082 A1 | 1/2009 | Rothberg et al. |
| 2009/0082212 A1 | 3/2009 | Williams |

(56) References Cited

U.S. PATENT DOCUMENTS

| | | |
|---|---|---|
| 2009/0099041 A1 | 4/2009 | Church et al. |
| 2009/0105959 A1 | 4/2009 | Braverman et al. |
| 2009/0117573 A1 | 5/2009 | Fu et al. |
| 2009/0127589 A1 | 5/2009 | Rothberg et al. |
| 2009/0155781 A1 | 6/2009 | Drmanac et al. |
| 2009/0233802 A1 | 9/2009 | Bignell et al. |
| 2009/0253581 A1 | 10/2009 | van Eijk et al. |
| 2009/0270273 A1 | 10/2009 | Burns et al. |
| 2009/0291854 A1 | 11/2009 | Weisinger-Mayr et al. |
| 2009/0312193 A1 | 12/2009 | Kim et al. |
| 2010/0035249 A1 | 2/2010 | Hayashizaki et al. |
| 2010/0120097 A1 | 5/2010 | Matz et al. |
| 2010/0120098 A1 | 5/2010 | Grunenwald et al. |
| 2010/0145037 A1 | 6/2010 | Brive et al. |
| 2010/0227329 A1 | 9/2010 | Cuppens |
| 2011/0028685 A1 | 2/2011 | Purkayastha et al. |
| 2011/0059436 A1 | 3/2011 | Hardin et al. |
| 2011/0245111 A1 | 10/2011 | Chee |
| 2012/0135871 A1 | 5/2012 | van Eijk et al. |
| 2012/0202698 A1 | 8/2012 | van Eijk et al. |
| 2013/0171621 A1 | 7/2013 | Luo et al. |
| 2014/0066318 A1 | 3/2014 | Frisen et al. |
| 2014/0227705 A1 | 8/2014 | Vogelstein et al. |
| 2014/0270435 A1 | 9/2014 | Dunn |
| 2014/0274731 A1 | 9/2014 | Raymond et al. |
| 2014/0323330 A1 | 10/2014 | Glezer et al. |
| 2014/0378350 A1 | 12/2014 | Hindson et al. |
| 2015/0000854 A1 | 1/2015 | Gann-Fetter et al. |
| 2015/0292988 A1 | 10/2015 | Bharadwaj et al. |
| 2015/0344942 A1 | 12/2015 | Frisen et al. |
| 2016/0003812 A1 | 1/2016 | Porreca et al. |
| 2016/0108458 A1 | 4/2016 | Frei et al. |
| 2016/0138091 A1 | 5/2016 | Chee et al. |
| 2016/0145677 A1 | 5/2016 | Chee et al. |
| 2016/0253584 A1 | 9/2016 | Fodor et al. |
| 2016/0289740 A1 | 10/2016 | Fu et al. |
| 2016/0298180 A1 | 10/2016 | Chee |
| 2017/0016053 A1 | 1/2017 | Beechem et al. |
| 2017/0029875 A1 | 2/2017 | Zhang et al. |
| 2017/0067096 A1 | 3/2017 | Wassie et al. |
| 2017/0089811 A1 | 3/2017 | Tillberg et al. |
| 2017/0159109 A1 | 6/2017 | Zheng et al. |
| 2017/0220733 A1 | 8/2017 | Zhuang et al. |
| 2017/0241911 A1 | 8/2017 | Rockel et al. |
| 2017/0342405 A1 | 11/2017 | Fu et al. |
| 2018/0051322 A1 | 2/2018 | Church et al. |
| 2018/0057873 A1 | 3/2018 | Zhou et al. |
| 2018/0088112 A1 | 3/2018 | Fan et al. |
| 2018/0112261 A1 | 4/2018 | Van Driel et al. |
| 2018/0201980 A1 | 7/2018 | Chee et al. |
| 2018/0216161 A1 | 8/2018 | Chen et al. |
| 2018/0216162 A1 | 8/2018 | Belhocine et al. |
| 2018/0245142 A1 | 8/2018 | So et al. |
| 2018/0291439 A1 | 10/2018 | van Eijk et al. |
| 2018/0305681 A1 | 10/2018 | Jovanovich et al. |
| 2018/0334670 A1 | 11/2018 | Bharadwaj et al. |
| 2019/0055594 A1 | 2/2019 | Samusik et al. |
| 2019/0064173 A1 | 2/2019 | Bharadwaj et al. |
| 2019/0085383 A1 | 3/2019 | Church et al. |
| 2019/0161796 A1 | 5/2019 | Hauling et al. |
| 2019/0177777 A1 | 6/2019 | Chee |
| 2019/0177778 A1 | 6/2019 | Chee |
| 2019/0177789 A1 | 6/2019 | Hindson et al. |
| 2019/0177800 A1 | 6/2019 | Boutet et al. |
| 2019/0194709 A1 | 6/2019 | Church et al. |
| 2019/0203275 A1 | 7/2019 | Frisen et al. |
| 2019/0233878 A1 | 8/2019 | Delaney et al. |
| 2019/0249226 A1 | 8/2019 | Bent et al. |
| 2019/0262831 A1 | 8/2019 | West et al. |
| 2019/0264268 A1 | 8/2019 | Frisen et al. |
| 2019/0271030 A1 | 9/2019 | Chee |
| 2019/0271031 A1 | 9/2019 | Chee |
| 2019/0300943 A1 | 10/2019 | Chee et al. |
| 2019/0300944 A1 | 10/2019 | Chee et al. |
| 2019/0300945 A1 | 10/2019 | Chee et al. |
| 2019/0309353 A1 | 10/2019 | Chee |
| 2019/0309354 A1 | 10/2019 | Chee |
| 2019/0309355 A1 | 10/2019 | Chee |
| 2019/0323071 A1 | 10/2019 | Chee |
| 2019/0323088 A1 | 10/2019 | Boutet et al. |
| 2019/0330617 A1 | 10/2019 | Church et al. |
| 2019/0338353 A1 | 11/2019 | Belgrader et al. |
| 2019/0367969 A1 | 12/2019 | Belhocine et al. |
| 2019/0367982 A1 | 12/2019 | Belhocine et al. |
| 2019/0367997 A1 | 12/2019 | Bent et al. |
| 2020/0002763 A1 | 1/2020 | Belgrader et al. |
| 2020/0024641 A1 | 1/2020 | Nolan et al. |
| 2020/0047010 A1 | 2/2020 | Lee et al. |
| 2020/0048690 A1 | 2/2020 | Chee |
| 2020/0063191 A1 | 2/2020 | Kennedy-Darling et al. |
| 2020/0063195 A1 | 2/2020 | Chee |
| 2020/0063196 A1 | 2/2020 | Chee |
| 2020/0071751 A1 | 3/2020 | Daugharthy et al. |
| 2020/0080136 A1 | 3/2020 | Zhang et al. |
| 2020/0109443 A1 | 4/2020 | Chee |
| 2020/0173985 A1 | 6/2020 | Dong et al. |
| 2020/0224244 A1 | 7/2020 | Nilsson et al. |
| 2020/0239946 A1 | 7/2020 | Dewal |
| 2020/0256867 A1 | 8/2020 | Hennek et al. |
| 2020/0277663 A1 | 9/2020 | Iyer |
| 2020/0277664 A1 | 9/2020 | Frenz |
| 2020/0299757 A1 | 9/2020 | Chee et al. |
| 2020/0325531 A1 | 10/2020 | Chee |
| 2020/0370095 A1 | 11/2020 | Farmer et al. |
| 2020/0399687 A1 | 12/2020 | Frisen et al. |
| 2020/0407781 A1 | 12/2020 | Schnall-Levin |
| 2021/0010068 A1 | 1/2021 | Chee et al. |
| 2021/0010070 A1 | 1/2021 | Schnall-Levin et al. |
| 2021/0095331 A1 | 4/2021 | Fan et al. |
| 2021/0123040 A1 | 4/2021 | Macosko et al. |
| 2021/0130881 A1 | 5/2021 | Cox |
| 2021/0140982 A1 | 5/2021 | Uytingco et al. |
| 2021/0150707 A1 | 5/2021 | Weisenfeld et al. |
| 2021/0155982 A1 | 5/2021 | Yin et al. |
| 2021/0158522 A1 | 5/2021 | Weisenfeld et al. |
| 2021/0172007 A1 | 6/2021 | Chee et al. |
| 2021/0189475 A1 | 6/2021 | Tentori et al. |
| 2021/0190770 A1 | 6/2021 | Delaney et al. |
| 2021/0198741 A1 | 7/2021 | Williams |
| 2021/0199660 A1 | 7/2021 | Williams et al. |
| 2021/0207202 A1 | 7/2021 | Chee |
| 2021/0214785 A1 | 7/2021 | Stoeckius |
| 2021/0222235 A1 | 7/2021 | Chee |
| 2021/0222241 A1 | 7/2021 | Bharadwaj |
| 2021/0222242 A1 | 7/2021 | Ramachandran Iyer |
| 2021/0222253 A1 | 7/2021 | Uytingco |
| 2021/0223227 A1 | 7/2021 | Stoeckius |
| 2021/0230584 A1 | 7/2021 | Mikkelsen et al. |
| 2021/0230681 A1 | 7/2021 | Patterson et al. |
| 2021/0230692 A1 | 7/2021 | Daugharthy et al. |
| 2021/0237022 A1 | 8/2021 | Bava |
| 2021/0238581 A1 | 8/2021 | Mikkelsen et al. |
| 2021/0238664 A1 | 8/2021 | Bava et al. |
| 2021/0238675 A1 | 8/2021 | Bava |
| 2021/0238680 A1 | 8/2021 | Bava |
| 2021/0247316 A1 | 8/2021 | Bava |
| 2021/0255175 A1 | 8/2021 | Chee et al. |
| 2021/0262018 A1 | 8/2021 | Bava et al. |
| 2021/0262019 A1 | 8/2021 | Alvarado Martinez et al. |
| 2021/0269864 A1 | 9/2021 | Chee |
| 2021/0270822 A1 | 9/2021 | Chee |
| 2021/0285036 A1 | 9/2021 | Yin et al. |
| 2021/0285046 A1 | 9/2021 | Chell et al. |
| 2021/0292748 A1 | 9/2021 | Frisen et al. |
| 2021/0292822 A1 | 9/2021 | Frisen et al. |
| 2021/0317510 A1 | 10/2021 | Chee et al. |
| 2021/0317524 A1 | 10/2021 | Lucero et al. |
| 2021/0324457 A1 | 10/2021 | Ramachandran Iyer et al. |
| 2021/0332424 A1 | 10/2021 | Schnall-Levin |
| 2021/0332425 A1 | 10/2021 | Pfeiffer et al. |
| 2021/0348221 A1 | 11/2021 | Chell et al. |
| 2022/0002791 A1 | 1/2022 | Frisen et al. |
| 2022/0003755 A1 | 1/2022 | Chee |
| 2022/0010367 A1 | 1/2022 | Ramachandran Iyer et al. |

(56) References Cited

U.S. PATENT DOCUMENTS

| | | |
|---|---|---|
| 2022/0017951 A1 | 1/2022 | Ramachandran Iyer et al. |
| 2022/0025446 A1 | 1/2022 | Shah |
| 2022/0025447 A1 | 1/2022 | Tentori et al. |
| 2022/0033888 A1 | 2/2022 | Schnall-Levin et al. |
| 2022/0049293 A1 | 2/2022 | Frenz et al. |
| 2022/0049294 A1 | 2/2022 | Uytingco et al. |
| 2022/0064630 A1 | 3/2022 | Bent et al. |
| 2022/0081728 A1 | 3/2022 | Williams |
| 2022/0090058 A1 | 3/2022 | Frisen et al. |
| 2022/0090175 A1 | 3/2022 | Uytingco et al. |
| 2022/0090181 A1 | 3/2022 | Gallant et al. |
| 2022/0098576 A1 | 3/2022 | Dadhwal |
| 2022/0098661 A1 | 3/2022 | Chew et al. |
| 2022/0106632 A1 | 4/2022 | Galonska et al. |
| 2022/0106633 A1 | 4/2022 | Engblom et al. |
| 2022/0112486 A1 | 4/2022 | Ramachandran Iyer et al. |
| 2022/0112545 A1 | 4/2022 | Chee |
| 2022/0119869 A1 | 4/2022 | Ramachandran Iyer et al. |
| 2022/0127659 A1 | 4/2022 | Frisen et al. |
| 2022/0127666 A1 | 4/2022 | Katiraee et al. |
| 2022/0127672 A1 | 4/2022 | Stoeckius |
| 2022/0145361 A1 | 5/2022 | Frenz et al. |
| 2022/0154255 A1 | 5/2022 | Chee et al. |
| 2022/0170083 A1 | 6/2022 | Khaled et al. |
| 2022/0195422 A1 | 6/2022 | Gallant et al. |
| 2022/0195505 A1 | 6/2022 | Frisen et al. |
| 2022/0196644 A1 | 6/2022 | Chee |
| 2022/0213526 A1 | 7/2022 | Frisen et al. |
| 2022/0220544 A1 | 7/2022 | Ach et al. |
| 2022/0241780 A1 | 8/2022 | Tentori et al. |
| 2022/0267844 A1 | 8/2022 | Ramachandran Iyer et al. |
| 2022/0282329 A1 | 9/2022 | Chell et al. |
| 2022/0290217 A1 | 9/2022 | Frenz et al. |
| 2022/0290219 A1 | 9/2022 | Chee |
| 2022/0298560 A1 | 9/2022 | Frisen et al. |
| 2022/0325325 A1 | 10/2022 | Chee et al. |
| 2022/0326251 A1 | 10/2022 | Uytingco et al. |
| 2022/0333171 A1 | 10/2022 | Chee |
| 2022/0333191 A1 | 10/2022 | Mikkelsen et al. |
| 2022/0333192 A1 | 10/2022 | Uytingco |
| 2022/0333195 A1 | 10/2022 | Schnall-Levin et al. |
| 2022/0334031 A1 | 10/2022 | Delaney et al. |
| 2022/0348905 A1 | 11/2022 | Dadhwal |
| 2022/0348992 A1 | 11/2022 | Stoeckius et al. |
| 2022/0356464 A1 | 11/2022 | Kim et al. |
| 2022/0364163 A1 | 11/2022 | Stahl et al. |
| 2022/0389491 A1 | 12/2022 | Chee |
| 2022/0389503 A1 | 12/2022 | Mikkelsen et al. |
| 2022/0389504 A1 | 12/2022 | Chew et al. |
| 2022/0403455 A1 | 12/2022 | Ramachandran Iyer et al. |
| 2022/0404245 A1 | 12/2022 | Chell et al. |
| 2023/0002812 A1 | 1/2023 | Stoeckius et al. |
| 2023/0014008 A1 | 1/2023 | Shastry |
| 2023/0017773 A1 | 1/2023 | Kim et al. |
| 2023/0031305 A1 | 2/2023 | Hernandez Neuta et al. |
| 2023/0033960 A1 | 2/2023 | Gallant et al. |
| 2023/0034039 A1 | 2/2023 | Shahjamali |
| 2023/0034216 A1 | 2/2023 | Bava |
| 2023/0040363 A1 | 2/2023 | Chee |
| 2023/0042088 A1 | 2/2023 | Chee |
| 2023/0042817 A1 | 2/2023 | Mignardi |
| 2023/0047782 A1 | 2/2023 | Tentori et al. |
| 2023/0056549 A1 | 2/2023 | Dadhwal |
| 2023/0064372 A1 | 3/2023 | Chell et al. |
| 2023/0069046 A1 | 3/2023 | Chew et al. |
| 2023/0077364 A1 | 3/2023 | Patterson et al. |
| 2023/0080543 A1 | 3/2023 | Katiraee et al. |
| 2023/0081381 A1 | 3/2023 | Chew et al. |
| 2023/0100497 A1 | 3/2023 | Frisen et al. |
| 2023/0107023 A1 | 4/2023 | Chee |
| 2023/0111225 A1 | 4/2023 | Chew et al. |
| 2023/0113230 A1 | 4/2023 | Kim et al. |
| 2023/0126825 A1 | 4/2023 | Nagendran et al. |
| 2023/0129552 A1 | 4/2023 | Ramachandran Iyer |
| 2023/0135010 A1 | 5/2023 | Tentori et al. |
| 2023/0143569 A1 | 5/2023 | Iyer et al. |
| 2023/0145575 A1 | 5/2023 | Gallant et al. |
| 2023/0147726 A1 | 5/2023 | Hadrup et al. |
| 2023/0151412 A1 | 5/2023 | Chee |
| 2023/0159994 A1 | 5/2023 | Chee |
| 2023/0159995 A1 | 5/2023 | Iyer et al. |
| 2023/0160008 A1 | 5/2023 | Chell et al. |
| 2023/0175045 A1 | 6/2023 | Katsori et al. |
| 2023/0183684 A1 | 6/2023 | Gallant et al. |
| 2023/0183785 A1 | 6/2023 | Frisen et al. |
| 2023/0194469 A1 | 6/2023 | Tentori et al. |
| 2023/0194470 A1 | 6/2023 | Kim et al. |
| 2023/0203478 A1 | 6/2023 | Kim et al. |
| 2023/0212650 A1 | 7/2023 | Chew et al. |
| 2023/0212655 A1 | 7/2023 | Chee |
| 2023/0220368 A1 | 7/2023 | Kim |
| 2023/0220454 A1 | 7/2023 | Bent et al. |
| 2023/0220455 A1 | 7/2023 | Galonska et al. |
| 2023/0227811 A1 | 7/2023 | Dadhwal |
| 2023/0228762 A1 | 7/2023 | Uytingco et al. |
| 2023/0242973 A1 | 8/2023 | Frisen et al. |
| 2023/0242976 A1 | 8/2023 | Tentori et al. |
| 2023/0265488 A1 | 8/2023 | Gohil et al. |
| 2023/0265489 A1 | 8/2023 | Uytingco et al. |
| 2023/0265491 A1 | 8/2023 | Tentori et al. |
| 2023/0267625 A1 | 8/2023 | Tentori et al. |
| 2023/0279474 A1 | 9/2023 | Katiraee |
| 2023/0279477 A1 | 9/2023 | Kvastad et al. |
| 2023/0279481 A1 | 9/2023 | Marrache et al. |
| 2023/0287399 A1 | 9/2023 | Gallant et al. |
| 2023/0287475 A1 | 9/2023 | Chell et al. |
| 2023/0287481 A1 | 9/2023 | Katsori et al. |
| 2023/0295699 A1 | 9/2023 | Sukovich et al. |
| 2023/0295722 A1 | 9/2023 | Bharadwaj |
| 2023/0304072 A1 | 9/2023 | Gohil et al. |
| 2023/0304074 A1 | 9/2023 | Chee et al. |
| 2023/0304078 A1 | 9/2023 | Frisen et al. |
| 2023/0313279 A1 | 10/2023 | Giacomello et al. |
| 2023/0323340 A1 | 10/2023 | Dadhwal |
| 2023/0323434 A1 | 10/2023 | Yin et al. |
| 2023/0323436 A1 | 10/2023 | Chee |
| 2023/0323447 A1 | 10/2023 | Schnall-Levin et al. |
| 2023/0323453 A1 | 10/2023 | Stoeckius |
| 2023/0332138 A1 | 10/2023 | Kim et al. |
| 2023/0332211 A1 | 10/2023 | Chee |
| 2023/0332212 A1 | 10/2023 | Chew et al. |
| 2023/0332227 A1 | 10/2023 | Ramachandran Iyer |
| 2023/0332247 A1 | 10/2023 | Singh et al. |
| 2023/0351619 A1 | 11/2023 | Tentori et al. |
| 2023/0358733 A1 | 11/2023 | Chee |
| 2023/0366008 A1 | 11/2023 | Chew et al. |
| 2023/0383285 A1 | 11/2023 | Kim et al. |
| 2023/0383344 A1 | 11/2023 | Stoeckius |
| 2023/0392204 A1 | 12/2023 | Chell et al. |
| 2023/0393071 A1 | 12/2023 | Bava |
| 2023/0407404 A1 | 12/2023 | Baumgartner et al. |
| 2023/0416807 A1 | 12/2023 | Chee |
| 2023/0416808 A1 | 12/2023 | Sukovich et al. |
| 2023/0416850 A1 | 12/2023 | Singh et al. |
| 2024/0002931 A1 | 1/2024 | Bava |
| 2024/0011081 A1 | 1/2024 | Chee |
| 2024/0011090 A1 | 1/2024 | Chew et al. |
| 2024/0018572 A1 | 1/2024 | Mignardi |
| 2024/0018575 A1 | 1/2024 | Gallant et al. |
| 2024/0018589 A1 | 1/2024 | Schnall-Levin et al. |
| 2024/0026445 A1 | 1/2024 | Ramachandran Iyer et al. |
| 2024/0033743 A1 | 2/2024 | Tentori et al. |
| 2024/0035937 A1 | 2/2024 | Cox et al. |
| 2024/0043908 A1 | 2/2024 | Chew et al. |
| 2024/0043925 A1 | 2/2024 | Bent et al. |
| 2024/0052343 A1 | 2/2024 | Gallant et al. |
| 2024/0053351 A1 | 2/2024 | Uytingco et al. |
| 2024/0060115 A1 | 2/2024 | Chee et al. |
| 2024/0067953 A1 | 2/2024 | Mikkelsen et al. |
| 2024/0068016 A1 | 2/2024 | Frisen et al. |
| 2024/0068017 A1 | 2/2024 | Lundeberg et al. |
| 2024/0076723 A1 | 3/2024 | Mignardi |
| 2024/0080346 A1 | 3/2024 | Engblom et al. |
| 2024/0084365 A1 | 3/2024 | Frisen et al. |

(56) References Cited

U.S. PATENT DOCUMENTS

| | | |
|---|---|---|
| 2024/0084366 A1 | 3/2024 | Chee |
| 2024/0084383 A1 | 3/2024 | Ramachandran Iyer et al. |
| 2024/0093274 A1 | 3/2024 | Frisen et al. |
| 2024/0093290 A1 | 3/2024 | Stahl et al. |
| 2024/0110228 A1 | 4/2024 | Uytingco et al. |
| 2024/0124933 A1 | 4/2024 | Chell et al. |
| 2024/0125772 A1 | 4/2024 | Delaney et al. |
| 2024/0141327 A1 | 5/2024 | Kim et al. |
| 2024/0158838 A1 | 5/2024 | Alvarado Martinez et al. |
| 2024/0175080 A1 | 5/2024 | Galonska et al. |
| 2024/0182968 A1 | 6/2024 | Bava |
| 2024/0191286 A1 | 6/2024 | Boutet et al. |
| 2024/0200121 A1 | 6/2024 | Boutet |
| 2024/0209425 A1 | 6/2024 | Yin et al. |
| 2024/0218427 A1 | 7/2024 | Sukovich et al. |
| 2024/0218432 A1 | 7/2024 | Mielinis |
| 2024/0219701 A1 | 7/2024 | Tentori et al. |
| 2024/0253036 A1 | 8/2024 | Kim et al. |
| 2024/0263218 A1 | 8/2024 | Katiraee et al. |
| 2024/0271190 A1 | 8/2024 | Stoeckius et al. |
| 2024/0271195 A1 | 8/2024 | Mikhaiel et al. |
| 2024/0279747 A1 | 8/2024 | Williams |
| 2024/0287600 A1 | 8/2024 | Iyer et al. |
| 2024/0294971 A1 | 9/2024 | Galonska |
| 2024/0294974 A1 | 9/2024 | Galonska et al. |
| 2024/0294975 A1 | 9/2024 | Lin et al. |
| 2024/0301488 A1 | 9/2024 | Stoeckius |
| 2024/0301489 A1 | 9/2024 | Chew et al. |
| 2024/0360494 A1 | 10/2024 | Costa et al. |
| 2024/0368711 A1 | 11/2024 | Giacomello et al. |
| 2024/0377297 A1 | 11/2024 | Cox et al. |
| 2024/0385088 A1 | 11/2024 | Kim et al. |
| 2024/0392349 A1 | 11/2024 | Frisen et al. |
| 2024/0392351 A1 | 11/2024 | Chee |
| 2024/0392352 A1 | 11/2024 | Stahl et al. |
| 2024/0392353 A1 | 11/2024 | Engblom et al. |
| 2024/0401109 A1 | 12/2024 | Kim et al. |
| 2024/0401117 A1 | 12/2024 | Bava |
| 2024/0401118 A1 | 12/2024 | Tentori et al. |
| 2024/0404301 A1 | 12/2024 | Li et al. |
| 2024/0408593 A1 | 12/2024 | Kim et al. |
| 2024/0416315 A1 | 12/2024 | Bava |
| 2024/0417783 A1 | 12/2024 | Chew et al. |
| 2024/0417784 A1 | 12/2024 | Sukovich et al. |
| 2025/0002980 A1 | 1/2025 | Tentori et al. |
| 2025/0002982 A1 | 1/2025 | Stoeckius et al. |
| 2025/0003956 A1 | 1/2025 | Delaney et al. |
| 2025/0019689 A1 | 1/2025 | Galonska et al. |
| 2025/0019749 A1 | 1/2025 | Katiraee et al. |

FOREIGN PATENT DOCUMENTS

| | | | | |
|---|---|---|---|---|
| EP | | 2002017 | 12/2008 | |
| EP | | 2130913 | 12/2009 | |
| EP | | 2881465 | 6/2015 | |
| EP | | 3013984 | 5/2016 | |
| EP | | 3511423 | 7/2019 | |
| EP | | 3541956 | 9/2019 | |
| WO | WO 1989/010977 | | 11/1989 | |
| WO | WO 1991/006678 | | 5/1991 | |
| WO | WO 1995/025116 | | 9/1995 | |
| WO | WO 1995/035505 | | 12/1995 | |
| WO | WO 2001/042796 | | 6/2001 | |
| WO | WO 2002/059355 | | 8/2002 | |
| WO | WO 2002/077283 | | 10/2002 | |
| WO | WO 2003/002979 | | 1/2003 | |
| WO | WO 2003/010176 | | 2/2003 | |
| WO | WO 2005/007814 | | 1/2005 | |
| WO | WO 2007/073171 | | 6/2007 | |
| WO | WO 2007/076726 | | 7/2007 | |
| WO | WO 2007/145612 | | 12/2007 | |
| WO | WO 2008/075086 | | 6/2008 | |
| WO | WO 2009/032167 | | 3/2009 | |
| WO | WO 2009/036525 | | 3/2009 | |
| WO | WO 2009/152928 | | 12/2009 | |
| WO | WO 2010/088517 | | 8/2010 | |
| WO | WO 2010/126614 | | 11/2010 | |
| WO | WO 2011/068088 | | 6/2011 | |
| WO | WO 2012/142213 | | 10/2012 | |
| WO | WO 2012/159089 | | 11/2012 | |
| WO | WO 2013/123442 | | 8/2013 | |
| WO | WO 2013/131962 | | 9/2013 | |
| WO | WO 2013/138510 | | 9/2013 | |
| WO | WO 2013/150082 | | 10/2013 | |
| WO | WO 2013/150083 | | 10/2013 | |
| WO | WO 2014/060483 | | 4/2014 | |
| WO | WO 2014/210223 | | 12/2014 | |
| WO | WO 2014/210225 | | 12/2014 | |
| WO | WO 2015/031691 | | 3/2015 | |
| WO | WO 2015/117163 | | 8/2015 | |
| WO | WO 2016/044313 | | 3/2016 | |
| WO | WO 2016/138496 | | 9/2016 | |
| WO | WO 2016/138500 | | 9/2016 | |
| WO | WO 2016/162309 | | 10/2016 | |
| WO | WO 2016/166128 | | 10/2016 | |
| WO | WO 2016/168825 | | 10/2016 | |
| WO | WO 2017/019456 | | 2/2017 | |
| WO | WO 2017/075293 | | 5/2017 | |
| WO | WO-2017075293 A1 * | | 5/2017 | ......... C12N 15/1003 |
| WO | WO 2017/096158 | | 7/2017 | |
| WO | WO 2018/064640 | | 4/2018 | |
| WO | WO 2018/091676 | | 5/2018 | |
| WO | WO-2018089550 A1 * | | 5/2018 | ......... C12N 15/1096 |
| WO | WO 2018/175779 | | 9/2018 | |
| WO | WO 2019/213254 | | 11/2019 | |
| WO | WO 2019/213294 | | 11/2019 | |
| WO | WO-2019213254 A1 * | | 11/2019 | ......... C12N 15/1006 |
| WO | WO 2020/028194 | | 2/2020 | |
| WO | WO 2020/047002 | | 3/2020 | |
| WO | WO 2020/047005 | | 3/2020 | |
| WO | WO 2020/047010 | | 3/2020 | |
| WO | WO 2020/053655 | | 3/2020 | |
| WO | WO 2020/061064 | | 3/2020 | |
| WO | WO 2020/061066 | | 3/2020 | |
| WO | WO 2020/061108 | | 3/2020 | |
| WO | WO 2020/076979 | | 4/2020 | |
| WO | WO 2020/099640 | | 5/2020 | |
| WO | WO 2020/123301 | | 6/2020 | |
| WO | WO 2020/123305 | | 6/2020 | |
| WO | WO 2020/123309 | | 6/2020 | |
| WO | WO 2020/123311 | | 6/2020 | |
| WO | WO 2020/123316 | | 6/2020 | |
| WO | WO 2020/123317 | | 6/2020 | |
| WO | WO 2020/123318 | | 6/2020 | |
| WO | WO 2020/123319 | | 6/2020 | |
| WO | WO 2020/123320 | | 7/2020 | |
| WO | WO 2020/160044 | | 8/2020 | |
| WO | WO 2020/167862 | | 8/2020 | |
| WO | WO 2020/176788 | | 9/2020 | |
| WO | WO 2020/176882 | | 9/2020 | |
| WO | WO 2020/190509 | | 9/2020 | |
| WO | WO 2020/198071 | | 10/2020 | |
| WO | WO 2020/206285 | | 10/2020 | |
| WO | WO 2020/219901 | | 10/2020 | |
| WO | WO 2020/243579 | | 12/2020 | |
| WO | WO 2021/041974 | | 3/2021 | |
| WO | WO 2021/067246 | | 4/2021 | |
| WO | WO 2021/067514 | | 4/2021 | |
| WO | WO 2021/091611 | | 5/2021 | |
| WO | WO 2021/092433 | | 5/2021 | |
| WO | WO 2021/097255 | | 5/2021 | |
| WO | WO 2021/102003 | | 5/2021 | |
| WO | WO 2021/102005 | | 5/2021 | |
| WO | WO 2021/102039 | | 5/2021 | |
| WO | WO 2021/116715 | | 6/2021 | |
| WO | WO 2021/133842 | | 7/2021 | |
| WO | WO 2021/133845 | | 7/2021 | |
| WO | WO 2021/133849 | | 7/2021 | |
| WO | WO 2021/142233 | | 7/2021 | |
| WO | WO 2021/168261 | | 8/2021 | |
| WO | WO 2021/168278 | | 8/2021 | |
| WO | WO 2021/207610 | | 10/2021 | |
| WO | WO 2021/216708 | | 10/2021 | |
| WO | WO 2021/225900 | | 11/2021 | |

(56) References Cited

FOREIGN PATENT DOCUMENTS

| | | |
|---|---|---|
| WO | WO 2021/236625 | 11/2021 |
| WO | WO 2021/236929 | 11/2021 |
| WO | WO 2021/237056 | 11/2021 |
| WO | WO 2021/237087 | 11/2021 |
| WO | WO 2021/242834 | 12/2021 |
| WO | WO 2021/247543 | 12/2021 |
| WO | WO 2021/247568 | 12/2021 |
| WO | WO 2021/247593 | 12/2021 |
| WO | WO 2021/252499 | 12/2021 |
| WO | WO 2021/252576 | 12/2021 |
| WO | WO 2021/252591 | 12/2021 |
| WO | WO 2021/252747 | 12/2021 |
| WO | WO 2021/263111 | 12/2021 |
| WO | WO 2022/025965 | 2/2022 |
| WO | WO 2022/060798 | 3/2022 |
| WO | WO 2022/060953 | 3/2022 |
| WO | WO 2022/061150 | 3/2022 |
| WO | WO 2022/061152 | 3/2022 |
| WO | WO 2022/087273 | 4/2022 |
| WO | WO 2022/098810 | 5/2022 |
| WO | WO 2022/099037 | 5/2022 |
| WO | WO 2022/103712 | 5/2022 |
| WO | WO 2022/109181 | 5/2022 |
| WO | WO 2022/132645 | 6/2022 |
| WO | WO 2022/140028 | 6/2022 |
| WO | WO 2022/147005 | 7/2022 |
| WO | WO 2022/147296 | 7/2022 |
| WO | WO 2022/164615 | 8/2022 |
| WO | WO 2022/178267 | 8/2022 |
| WO | WO 2022/198068 | 9/2022 |
| WO | WO 2022/221425 | 10/2022 |
| WO | WO 2022/226057 | 10/2022 |
| WO | WO 2022/236054 | 11/2022 |
| WO | WO 2022/243303 | 11/2022 |
| WO | WO 2022/226372 | 12/2022 |
| WO | WO 2022/256503 | 12/2022 |
| WO | WO 2022/271820 | 12/2022 |
| WO | WO 2023/287765 | 1/2023 |
| WO | WO 2023/018799 | 2/2023 |
| WO | WO 2023/034489 | 3/2023 |
| WO | WO 2023/044071 | 3/2023 |
| WO | WO 2023/076345 | 5/2023 |
| WO | WO 2023/086880 | 5/2023 |
| WO | WO 2023/102118 | 6/2023 |
| WO | WO 2023/122033 | 6/2023 |
| WO | WO 2023/150098 | 8/2023 |
| WO | WO 2023/150163 | 8/2023 |
| WO | WO 2023/150171 | 8/2023 |
| WO | WO 2023/215552 | 11/2023 |
| WO | WO 2023/225519 | 11/2023 |
| WO | WO 2023/229988 | 11/2023 |
| WO | WO 2023/250077 | 12/2023 |
| WO | WO 2024/015578 | 1/2024 |
| WO | WO 2024/035844 | 2/2024 |
| WO | WO 2024/081212 | 4/2024 |
| WO | WO 2024/086167 | 4/2024 |
| WO | WO 2024/086776 | 4/2024 |
| WO | WO 2024/102809 | 5/2024 |
| WO | WO 2024/137826 | 6/2024 |
| WO | WO 2024/145224 | 7/2024 |
| WO | WO 2024/145441 | 7/2024 |
| WO | WO 2024/145445 | 7/2024 |
| WO | WO 2024/145491 | 7/2024 |
| WO | WO 2024/206603 | 10/2024 |
| WO | WO 2024/220882 | 10/2024 |
| WO | WO 2024/238900 | 11/2024 |
| WO | WO 2024/254316 | 12/2024 |
| WO | WO 2025/029605 | 2/2025 |
| WO | WO 2025/029627 | 2/2025 |

OTHER PUBLICATIONS

Cardullo (proceedings National Academy of Sciences (1988) vol. 85, pp. 8790-8794).*
Crisalli (Bioconjug Chem. Nov. 1, 20116; 22(11): 2345-2354. doi:10.1021/bc200424r).*
Stark (Nature Reviews Genetics (Jul. 2019) pp. 631-656).*
Fang (Angew. Chem. Int. Ed. 2022, 61, e202207188).*
Kong et al., Duplex probes: a new approach for the detection of specific nucleic acids in homogenous assays, Analytica Chimica Acta, Sep. 2003, 491, 135-143 (Year: 2003).*
Fiandaca et al., Self-Reporting PNA/DNA Primers for PCR Analysis, Genome Research, Apr. 2001, 11, 609-613 (Year: 2001).*
U.S. Appl. No. 63/033,348, filed Jun. 2, 2020, Bent.
Borm et al., "High throughput Human embryo spatial transcriptome mapping by surface transfer of tissue RNA," Abstracts Selected Talks, Single Cell Genomics mtg, (SCG2019), 2019, 1 pages (Abstract Only).
Chen et al., "Large field of view-spatially resolved transcriptomics at nanoscale resolution," bioRxiv, Jan. 19, 2021, retrieved from URL <https://www.biorxiv.org/node/1751045.abstract>, 37 pages.
Cho et al., "Seq-Scope: Submicrometer-resolution spatial transcriptomics for single cell and subcellular studies, " bioRxiv, Jan. 27, 2021, retrieved from URL <https://www.biorxiv.org/node/1754517.abstract>, 50 pages.
Codeluppi et al., "Spatial organization of the somatosensory cortex revealed by osmFISH," Nature Methods, Nov. 2018, 15:932-935.
Eng et al., "Transcriptome-scale super-resolved imaging in tissues by RNA seqFISH+," Nature, Apr. 2019, 568(7751):235-239, 37 pages.
Goh et al., "Highly Specific Multiplexed RNA Imaging In Tissues With Split-FISH," Nat Methods, Jun. 15, 2020, 17(7):689-693, 21 pages.
Liu et al., "High-Spatial-Resolution Multi-Omics Sequencing via Deterministic Barcoding in Tissue," Cell, Nov. 13, 2020, 183(6):1665-1681, 36 pages.
Liu et al., "Spatial transcriptome sequencing of FFPE tissues at cellular level," bioRxiv 788992, Oct. 14, 2020, 39 pages.
Takei et al., "Integrated Spatial Genomics Reveals Global Architecture Of Single Nuclei," Nature, Jan. 27, 2021, 590(7845):344-350, 53 pages.
Xia et al., "Spatial transcriptome profiling by MERFISH reveals subcellular RNA compartmentalization and cell cycle-dependent gene expression", Proceedings of the National Academy of Sciences, Sep. 2019, 116(39):19490-19499.
U.S. Appl. No. 16/353,937, Frisen et al., filed Mar. 14, 2019.
U.S. Appl. No. 17/707,189, Chell et al., filed Mar. 29, 2022.
Dalma-Weiszhausz et al., "The affymetrix GeneChip platform: an overview," Methods Enzymol., 2006. 410:3-28.
Miller et al., "Chapter 11—Solid and Suspension Microarrays for Microbial Diagnostics," Methods in Microbiology, 2015, 42:395-431.
Vickovic et al., "SM-Omics: An automated Platform for High-Throughput Spatial Multi-Omics," bioRxiv, Oct. 2020, 40 pages.
Ahlfen et al., "Determinants of RNA quality from FFPE samples," PLoS One, Dec. 2007, 2(12):e1261, 7 pages.
Burgess, "Spatial transcriptomics coming of age," Nat Rev Genet., Jun. 2019, 20(6):317, 1 page.
Kokkat et al., "Archived formalin-fixed paraffin-embedded (FFPE) blocks: A valuable underexploited resource for extraction of DNA, RNA, and protein," Apr. 2013, 11(2):101-6.
Ncbi.nlm.nih.gov, [online], "Molecular Inversion Probe Assay," available on or before Oct. 14, 2014, via Internet Archive: Wayback Machine URL<https://web.archive.org/web/20141014124037/https://www.ncbi.nlm.nih.gov/probe/docs/techmip/>, retrieved on Jun. 16, 2021, retrieved from URL<https://www.ncbi.nlm.nih.gov/probe/docs/techmip/>, 2 pages.
Sun et al., "Statistical Analysis of Spatial Expression Pattern for Spatially Resolved Transcriptomic Studies," Nature Methods, Jan. 27, 2020, 17(2): 193-200.
Svensson et al., "SpatialDE: identification of spatially variable genes," Nature Methods, May 2018, 15:343-346, 15 pages.
Asp et al., "A spatiotemporal organ-wide gene expression and cell atlas of the developing human heart," Cell, Dec. 12, 2019, 179(7):1647-1660.

(56) References Cited

OTHER PUBLICATIONS

[No Author Listed], "Chromium Next GEM Single Cell 3' Reagent Kits v3.1—User Guide," 10x Genomics, Document No. CG000204, Nov. 2019, 58 pages.

[No Author Listed], "Chromium Next GEM Single Cell 3' Reagent Kits v3.1 (Dual Index)—User Guide," 10x Genomics, Mar. 2021, Document No. CG000315, 61 pages.

[No Author Listed], "HuSNP Mapping Assay User's Manual," Affymetrix Part No. 90094 (Affymetrix, Santa Clara, Calif.), GeneChip, 2000, 104 pages.

[No Author Listed], "Microarray technologies have excellent possibilities in genomics-related researches," Science Tools From Amersham Pharmacia Biotech, 1998, 3(4): 8 pages (with English Translation).

10xGenomics.com, [online], "Visium Spatial Gene Expression Reagent Kits—Tissue Optimization—User Guide," Jul. 2020, retrieved on May 25, 2021, retrieved from URL<https://assets.ctfassets.net/an68im79xiti/5UJrN0CH17rEk0UXwd19It/e54d99fb08a8f1500aba503005a04a56/CG000238_VisiumSpatialTissueOptimizationUserGuide_RevD.pdf>, 42 pages.

10xGenomics.com, [online], "Visium Spatial Gene Expression Reagent Kits—Tissue Optimization, " Nov. 2019, retrieved on Jan. 25, 2022, retrieved from URL<https://assets.ctfassets.net/an68im79xiti/4q03w6959AJFxffSw5lee9/6a2ac61cf6388a72564eeb96bc294967/CG000238_VisiumSpatialTissueOptimizationUserGuide_Rev_A.pdf>, 46 pages.

10xGenomics.com, [online], "Visium Spatial Gene Expression Reagent Kits—Tissue Optimization," Oct. 2020, retrieved on Dec. 28, 2021, retrieved from URL<https://assets.ctfassets.net/an68im79xiti/5UJrNOCH17rEk0UXwd19It/e54d99fb08a8f1500aba503005a04a56/CG000238_VisiumSpatialTissueOptimizationUserGuide_RevD.pdf>, 43 pages.

10xGenomics.com, [online], "Visium Spatial Gene Expression Reagent Kits—User Guide," Jun. 2020. retrieved on May 25, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 69 pages.

10xGenomics.com, [online], "Visium Spatial Gene Expression Reagent Kits—User Guide," Oct. 2020, retrieved on Dec. 28, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 70 pages.

Adessi et al., "Solid phase DNA amplification: characterisation of primer attachment and amplification mechanisms," Nucl. Acids Res., 2000, 28(20):E87, 8 pages.

Affymetrix, "GeneChip Human Genome U133 Set," retrieved from the Internet: on the World Wide Web at affymetrix.com/support/technical/datasheets/hgu133_datasheet.pdf, retrieved on Feb. 26, 2003, 2 pages.

Affymetrix, "Human Genome U95Av2," Internet Citation, retrieved from the internet: on the World Wide Web affymetrix.com, retrieved on Oct. 2, 2002, 1 page.

Albretsen et al., "Applications of magnetic beads with covalently attached oligonucleotides in hybridization: Isolation and detection of specific measles virus mRNA from a crude cell lysate," Anal. Biochem., 1990, 189(1):40-50.

Allawi et al., "Thermodynamics and NMR of Internal GâT Mismatches in DNA," Biochemistry, 1996, 36(34):10581-10594.

Armani et al., "2D-PCR: a method of mapping DNA in tissue sections," Lab Chip, 2009, 9(24):3526-34.

Asp et al., "Spatially Resolved Transcriptomes-Next Generation Tools for Tissue Exploration," Bioessays, Oct. 2020, 42(10):e1900221, 16 pages.

Atkinson et al., "An Updated Protocol for High Throughput Plant Tissue Sectioning," Front Plant Sci. 2017, 8:1721, 8 pages.

Atkinson, "Overview of Translation: Lecture Manuscript," U of Texas, 2000, DD, pp. 6.1-6.8.

Bains et al., "A novel method for nucleic acid sequence determination," Journal of Theoretical Biology, 1988, 135(3), 303-7.

Barnes, "PCR amplification of up to 35-kb DNA with high fidelity and high yield from lambda bacteriophage templates," Proc. Natl. Acad. Sci USA, 1994, 91(6):2216-2220.

Beattie et al., "Advances in genosensor research," Clin Chem., May 1995, 41(5):700-6.

Beechem et al., "High-Plex Spatially Resolved RNA and Protein Detection Using Digital Spatial Profiling: A Technology Designed for Immuno-oncology Biomarker Discovery and Translational Research," Methods Mol Biol, 2020, Chapter 25, 2055:563-583.

Bergenstråhle et al., "Seamless integration of image and molecular analysis for spatial transcriptomics workflows," BMC Genomics, Jul. 2020, 21(1):482, 7 pages.

Birney et al., "Identification and analysis of functional elements in 1% of the human genome by the ENCODE pilot project," Nature, 2007, 447(7146):799-816.

Blanchard et al., "High-density oligonucleotide arrays," Biosensors & Bioelectronics, 1996, 11(6-7):687-690.

Blokzijl et al., "Profiling protein expression and interactions: proximity ligation as a tool for personalized medicine," J Intern. Med., 2010, 268(3):232-245.

Blow, "Tissue Issues," Nature, 2007, 448(7156):959-962.

Bocková et al., "Advances in Surface Plasmon Resonance Imaging and Microscopy and Their Biological Applications," Annu Rev Anal Chem (Palo Alto Calif)., Jun. 2019, 12(1):151-176.

Bolotin et al., "MiXCR: software for comprehensive adaptive immunity profiling," Nat Methods., May 2015, 12(5):380-1.

Brandon et al., "Mitochondrial mutations in cancer," Oncogene, 2006, 25(34):4647-4662.

Brenner et al., "Gene expression analysis by massively parallel signature sequencing (MPSS) on microbead arrays," Nat. Biotech., 2000, 18(6):630-634.

Brenner et al., "In vitro cloning of complex mixtures of DNA on microbeads: physical separation of differentially expressed cDNAs," Proc. Natl. Acad. Sci. USA, 2000, 97(4):1665-1670.

Brow, "35—The Cleavase I enzyme for mutation and polymorphism scanning, " PCR Applications Protocols for Functional Genomics, 1999, pp. 537-550.

Brown et al., "Retroviral integration: structure of the initial covalent product and its precursor, and a role for the viral IN protein, " Proc Natl Acad Sci USA, Apr. 1989, 86(8):2525-9.

Buenrostro et al., "Transposition of native chromatin for multimodal regulatory analysis and personal epigenomics," Nat Methods, Dec. 2013, 10(12):1213-1218.

Bullard et al., "Direct comparison of nick-joining activity of the nucleic acid ligases from bacteriophage T4," Biochem. J. 2006, 398(1):135-144.

Burgess, "A space for transcriptomics," Nature Reviews Genetics, 2016, 17(8):436-7.

Burgess, "Finding structure in gene expression," Nature Reviews Genetics, 2018, 19(5):249, 1 page.

Burton et al., "Coverslip Mounted-Immersion Cycled in Situ RT-PCR for the Localization of mRNA in Tissue Sections, " Biotechniques, 1998, 24(1):92-100.

Butler et al., "Integrating single-cell transcriptomic data across different conditions, technologies, and species," Nat Biotechnol., Jun. 2018, 36(5):411-420.

Cha et al., "Specificity, efficiency, and fidelity of PCR," Genome Res., 1993, 3(3):S18-29.

Chandra et al., "Cell-free synthesis-based protein microarrays and their applications," Proteomics, 2009. 5(6):717-30.

Chatterjee et al., "Mitochondrial DNA mutations in human cancer. Oncogene," 2006, 25(34):4663-4674.

Chen et al., "RNA imaging. Spatially resolved, highly multiplexed RNA profiling in single cells," Science, Apr. 2015, 348(6233):aaa6090, 21 pages.

Chen et al., "Spatial Transcriptomics and In Situ Sequencing to Study Alzheimer's Disease," Cell, Aug. 2020, 182(4):976-991.

Chen et al., "µCB-seq: microfluidic cell barcoding and sequencing for high-resolution imaging and sequencing of single cells," Lab Chip, Nov. 2020, 20(21):3899-3913.

Cheng, "The Contrast Formation in Optical Microscopy," Handbook Of Biological Confocal Microscopy, 2006, Chapter 8, pp. 162-206.

(56) References Cited

OTHER PUBLICATIONS

Colin et al., "Enzyme engineering in biomimetic compartments," Curr Opin Struct Biol., Aug. 2015, 33:42-51.
Constantine et al., "Use of genechip high-density oligonucleotide arrays for gene expression monitoring," Life Science News, Amersham Life Science, 1998, pp. 11-14.
Credle et al., "Multiplexed analysis of fixed tissue RNA using Ligation in situ Hybridization," Nucleic Acids Research, 2017, 45(14):e128, 9 pages.
Crosetto et al., "Spatially resolved transcriptomics and beyond," Nature Review Genetics, 2015. 16(1):57-66.
Czarnik, "Encoding methods for combinatorial chemistry," Curr Opin Chem Biol., Jun. 1997, 1(1):60-6.
Dahl et al., "Circle-to-circle amplification for precise and sensitive DNA analysis," Proc. Natl. Acad. Sci., 2004, 101(13):4548-4553.
Daubendiek et al., "Rolling-Circle RNA Synthesis: Circular Oligonucleotides as Efficient Substrates for T7 RNA Polymerase," J. Am. Chem. Soc., 1995, 117(29):7818-7819.
Davies et al., "How best to identify chromosomal interactions: a comparison of approaches," Nat. Methods, 2017, 14(2):125-134.
Dean et al., "Comprehensive human genome amplification using multiple displacement amplification," Proc Natl. Acad. Sci. USA, 2002, 99(8):5261-66.
Duncan et al., "Affinity chromatography of a sequence-specific DNA binding protein using Teflon-linked oligonucleotides," Anal. Biochem., 1988, 169(1):104-108.
Eguiluz et al., "Multitissue array review: a chronological description of tissue array techniques, applications and procedures," Pathology Research and Practice, 2006, 202(8):561-568.
Eldridge et al., "An in vitro selection strategy for conferring protease resistance to ligand binding peptides," Protein Eng Des Sel., 2009, 22(11):691-698.
Ellington et al., "Antibody-based protein multiplex platforms: technical and operational challenges," Clin Chem, 2010, 56(2):186-193.
Fang et al., "Fluoride-cleavable biotinylation phosphoramidite for 5'-end-labeling and affinity purification of synthetic oligonucleotides," Nucleic Acids Res., Jan. 2003, 31(2):708-715.
Fire et al., "Rolling replication of short DNA circles," Proc. Natl. Acad. Sci., 1995, 92(10):4641-4645.
Fodor et al., "Light-directed, spatially addressable parallel chemical synthesis," Science, 1995, 251(4995):767-773.
Forcucci et al., "All-plastic miniature fluorescence microscope for point-of-care readout of bead-based bioassays.," J. Biomed Opt., 2015, 20(10):105010, 15 pages.
Forster et al., "A human gut bacterial genome and culture collection for improved metagenomic analyses," Nature Biotechnology, 2019, 37(2):186-192.
Frese et al., "Formylglycine aldehyde Tag—protein engineering through a novel post-translational modification," ChemBioChem., 2009, 10(3):425-27.
Fu et al., "Counting individual DNA molecules by the stochastic attachment of diverse labels," PNAS, 2011, 108(22):9026-9031.
Fu et al., "Continuous Polony Gels for Tissue Mapping with High Resolution and RNA Capture Efficiency," bioRxiv, 2021, 20 pages.
Fullwood et al., "Next-generation DNA sequencing of paired-end tags (PET) for transcriptome and genome analyses." Genome Res., 2009, 19(4):521-532.
Ganguli et al., "Pixelated spatial gene expression analysis from tissue," Nat Commun., Jan. 2018, 9(1):202, 9 pages.
Gao et al., "Q&A: Expansion microscopy", BMC Biology, 15:50, 9 pages, 2017.
Gene@arrays[online], BeadArray Technology, available on or before Feb. 14, 2015, via Internet Archive: Wayback Machine URL <https://web.archive.org/web/20150214084616/http://genearrays.com/services/microarrays/illumina/beadarray-technology/>, [retrieved on Jan. 30, 2020], 3 pages.
Gnanapragasam, "Unlocking the molecular archive: the emerging use of formalin-fixed paraffin-embedded tissue for biomarker research in urological cancer," BJU International, 2009, 105(2):274-278.

Goldkorn et al., "A simple and efficient enzymatic method for covalent attachment of DNA to cellulose. Application for hybridization-restriction analysis and for in vitro synthesis of DNA probes," Nucleic Acids Res., 1986, 14(22):9171-9191.
Gracia Villacampa et al., "Genome-wide Spatial Expression Profiling in FFPE Tissues," bioRxiv, 2020, pp. 38 pages.
Groelz et al., "Impact of storage conditions on the quality of nucleic acids in paraffin embedded tissues," PLoS One, Sep. 2018, 13(9):e0203608, 16 pages.
Gunderson et al., "Decoding randomly ordered DNA arrays," Genome Research, 2004, 14(5):870-877.
Guo et al., "Direct fluorescence analysis of genetic polymorphisms by hybridization with oligonucleotide arrays on glass supports," Nucleic Acids Res., Dec. 1994, 22(24):5456-65.
Guo et al., "RNA Sequencing of Formalin-Fixed, Paraffin-Embedded Specimens for Gene Expression Quantification and Data Mining," Int J Genomics, 2016, 2016:9837310, 11 pages.
Gupta et al., "Single-cell isoform RNA sequencing characterizes isoforms in thousands of cerebellar cells." Nature Biotechnol., Oct. 2018, 36:1197-1202.
Hamaguchi et al., "Direct reverse transcription-PCR on oligo(dT)-immobilized polypropylene microplates after capturing total mRNA from crude cell lysates," Clin Chem., Nov. 1998, 44(11):2256-63.
Hayes et al., "Electrophoresis of proteins and nucleic acids: I-Theory," BMJ, Sep. 1989, 299(6703):843-6.
He et al., "In situ synthesis of protein arrays," Current Opinion in Biotechnology, 2008, 19(1):4-9.
He, "Cell-free protein synthesis: applications in proteomics and biotechnology," New Biotechnology, 2008, 25(2-3):126-132.
Hejatko et al., "In situ hybridization technique for mRNA detection in whole mount Arabidopsis samples," Nature Protocols, 2006, 1(4):1939-1946.
Hiatt et al., "Parallel, tag-directed assembly of locally derived short sequence reads," Nature Methods, 2010. 7(2):119-25.
Imbeaud et al., "Towards standardization of RNA quality assessment using user-independent classifiers of microcapillary electrophoresis traces," Nucleic Acids Res., Mar. 2005, 33(6):e56, 12 pages.
Jaffe et al., "qSVA framework for RNA quality correction in differential expression analysis," Proc Natl Acad Sci USA, Jul. 2017, 114(27):7130-7135.
Jamur et al., "Permeabilization of cell membranes.," Method Mol. Biol., 2010, 588:63-66.
Jemt et al., "An automated approach to prepare tissue-derived spatially barcoded RNA-sequencing libraries," Scientific Reports, 2016, 6:37137, 10 pages.
Kapteyn et al., "Incorporation of non-natural nucleotides into template-switching oligonucleotides reduces background and improves cDNA synthesis from very small RNA samples," BMC Genomics, Jul. 2010, 11:413, 9 pages.
Khaled, "Nucleic Acid Integrity Assessment of FFPE Specimens," KTH, School of Engineering Sciences in Chemistry, Biotechnology and Health (CBH), Master Thesis, 2020, 29 pages.
Korbel et al., "Paired-end mapping reveals extensive structural variation in the human genome," Science, 2007, 318(5849):420-426.
Kozlov et al., "A highly scalable peptide-based assay system for proteomics," PLoS ONE, 2012, 7(6):e37441, 10 pages.
Kristensen et al., "High-Throughput Methods for Detection of Genetic Variation," BioTechniques, Feb. 2001, 30(2):318-332.
Kurz et al., "cDNA—protein fusions: covalent protein—gene conjugates for the in vitro selection of peptides and proteins," ChemBioChem., 2001, 2(9):666-72.
Kwok, "High-throughput genotyping assay approaches," Pharmacogenomics, Feb. 2000, 1(1):95-100.
Lage et al., "Whole genome analysis of genetic alterations in small DNA samples using hyperbranched strand displacement amplification and array-CGH," Genome Research, 2003, 13(2):294-307.
Lakhin et al., "Aptamers: problems, solutions and prospects," Acta Naturae, Oct. 2013, 5(4):34-43.
Landegren et al., "Reading bits of genetic information: methods for single-nucleotide polymorphism analysis," Genome Res., Aug. 1998, 8(8):769-76.

(56) References Cited

OTHER PUBLICATIONS

Langdale et al., "A rapid method of gene detection using DNA bound to Sephacryl," Gene, 1985, 36(3):201-210.

Le Reste et al., "Characterization of dark quencher chromophores as nonfluorescent acceptors for single-molecule FRET," Biophysical Journal, Jun. 2012, 102(11):2658-2668.

Lee et al., "Fluorescent in situ sequencing (FISSEQ) of RNA for gene expression profiling in intact cells and tissues," Nature Protocols, 2015, 10(3):442-458.

Leriche et al., "Cleavable linkers in chemical biology," Bioorganic & Medicinal Chemistry, 2012, 20:571-582.

Linnarsson, "Recent advances in DNA sequencing methods—general principles of sample preparation," Experimental Cell Research, 2010, 316(8):1339-1343.

Liu et al., "High-Spatial-Resolution Multi-Omics Atlas Sequencing of Mouse Embryos via Deterministic Barcoding in Tissue," BioRxiv, 2019, 55 pages.

Lizardi et al., "Mutation detection and single-molecule counting using isothermal rolling-circle amplification," Nat. Genet., 1998, 19(3):225-232.

Lundberg et al., "Multiplexed homogeneous proximity ligation assays for high-throughput protein biomarker research in serological material," Mol Cell Proteomics, 2011, 10(4):M110.004978, 11 pages.

Macbeath et al., "Printing proteins as microarrays for high-throughput function determination," Science, Sep. 2000, 289(5485):1760-1763.

Marras, "Selection of fluorophore and quencher pairs for fluorescent nucleic acid hybridization probes," Methods Mol Biol., 2006, 335:3-16.

Marx, "Method of the Year: spatially resolved transcriptomics," Nature Methods, 2021, 18(1):9-14.

Massey et al., "Fluorescence resonance energy transfer (FRET) for DNA biosensors: FRET pairs and Förster distances for various dye-DNA conjugates," Anal Chim Acta., May 2006, 568(1-2):181-9.

Masuda et al., "Analysis of chemical modification of RNA from formalin-fixed samples and optimization of molecular biology applications for such samples," Nucleic Acids Research, Nov. 1999, 27(22):4436-4443.

Mattheyses et al., "Imaging with total internal reflection fluorescence microscopy for the cell biologist," J Cell Sci., Nov. 2010, 123(Pt 21):3621-3628.

Merritt et al., "Multiplex digital spatial profiling of proteins and RNA in fixed tissue," Nat Biotechnol, May 2020, 38(5):586-599.

Metzker, "Sequencing technologies—the next generation," Nature Reviews Genetics, 2010, 11(1):31-46.

Miller et al., "Basic concepts of microarrays and potential applications in clinical microbiology," Clinical Microbiology Reviews, 2009, 22(4):611-633.

Miner et al., "Molecular barcodes detect redundancy and contamination in hairpin-bisulfite PCR," Nucleic Acids Res., Sep. 2004, 32(17):e135, 4 pages.

Mishra et al., "Three-dimensional genome architecture and emerging technologies: looping in disease," Genome Medicine, 2017, 9(1):87, 14 pages.

Mitra et al., "Digital genotyping and haplotyping with polymerase colonies," Proc. Natl. Acad. Sci. USA. May 2003, 100(10):5926-5931.

Mizusawa et al., "A bacteriophage lambda vector for cloning with BamHI and Sau3A," Gene, 1982, 20(3):317-322.

Mueller et al., "RNA Integrity Number (RIN)—Standardization of RNA Quality Control," Agilent Technologies, 2004, 8 pages.

Nikiforov et al., "The use of 96-well polystyrene plates for DNA hybridization-based assays: an evaluation of different approaches to oligonucleotide immobilization," Anal Biochem, May 1995, 227(1):201-9.

Novusbio.com [online], "Lightning-Link® APC Antibody Labeling Kit," 2022, retrieved on Apr. 26, 2022, retrieved from URL<https://www.novusbio.com/products/lightning-link-r-apc-kit_705-0030>, 3 pages.

Nowak et al., "Entering the Postgenome Era," Science, 1995, 270(5235):368-71.

Pemov et al., "DNA analysis with multiplex microarray-enhanced PCR," Nucl. Acids Res., Jan. 2005, 33(2):e11, 9 pages.

Penland et al., "RNA expression analysis of formalin-fixed paraffin-embedded tumors," Laboratory Investigation, Apr. 2007, 87(4):383-391.

Perler et al., "Intervening sequences in an Archaea DNA polymerase gen," Proc Natl Acad Sci USA, Jun. 1992, 89(12):5577-5581.

Petterson et al., "Generations of sequencing technologies," Genomics, 2009, 93(2):105-111.

Piston et al., "Fluorescent protein FRET: the good, the bad and the ugly," Trends Biochem Sci., Sep. 2007, 32(9):407-14.

Polsky-Cynkin et al., "Use of DNA immobilized on plastic and agarose supports to detect DNA by sandwich hybridization," Clin. Chem., 1985, 31(9):1438-1443.

Rajeswari et al., "Multiple pathogen biomarker detection using an encoded bead array in droplet PCR," J. Microbial Methods, Aug. 2017, 139:22-28.

Ranki et al., "Sandwich hybridization as a convenient method for the detection of nucleic acids in crude samples," Gene, 1983, 21(1-2):77-85.

Reinartz et al., "Massively parallel signature sequencing (MPSS) as a tool for in-depth quantitative gene expression profiling in all organisms," Brief Funct Genomic Proteomic, Feb. 2002, 1(1):95-104.

Robinson et al., "Small-sample estimation of negative binomial dispersion, with applications to SAGE data," Biostatistics, Apr. 2008, 9(2):321-332.

Rodriques et al., "Slide-seq: A scalable technology for measuring genome-wide expression at high spatial resolution," Science, 2019, 363(6434):1463-1467.

Ronaghi et al., "A sequencing method based on real-time pyrophosphate," Science, Jul. 1998, 281(5375):363-365.

Ronaghi et al., "Real-time DNA sequencing using detection of pyrophosphate release," Analytical Biochemistry, Nov. 1996, 242(1):84-89.

Ronaghi, "Pyrosequencing sheds light on DNA sequencing," Genome Res, Jan. 2001, 11(1):3-11.

Salmén et al., "Barcoded solid-phase RNA capture for Spatial Transcriptomics profiling in mammalian tissue sections," Nature Protocols, Oct. 2018, 13(11):2501-2534.

San Paulo et al., "High-resolution imaging of antibodies by tapping-mode atomic force microscopy: attractive and repulsive tip-sample interaction regimes," Biophys J., Mar. 2000, 78(3):1599-1605.

Saxonov et al., "10x Genomics, Mastering Biology to Advance Human Health," PowerPoint, 10x, 2020, 41 pages.

Schena et al., "Quantitative monitoring of gene expression patterns with a complementary DNA microarray," Science, Oct. 1995, 270(5235):467-470.

Schroeder et al., "The RIN: an RNA integrity number for assigning integrity values to RNA measurements," BMC Molecular Biology, Jan. 2006, 7:3, 14 pages.

Sekar et al., "Fluorescence resonance energy transfer (FRET) microscopy imaging of live cell protein localizations," J Cell Biol., Mar. 2003, 160(5):629-33.

Shalon et al., "A DNA microarray system for analyzing complex DNA samples using two-color fluorescent probe hybridization," Genome Res., Jul. 1996, 6(7):639-45.

Shi et al., "The MicroArray Quality Control (MAQC) project shows inter- and intraplatform reproducibility of gene expression measurements," Nature Biotechnology, 2006, 24(9):1151-61.

Shrestha et al., "Understanding FRET as a research tool for cellular studies," Int J Mol Sci., Mar. 2015, 16(4):6718-56.

Stahl et al., "Visualization and analysis of gene expression in tissue sections by spatial transcriptomics," Science, Jul. 2016, 353(6294):78-82.

(56) References Cited

OTHER PUBLICATIONS

Stahl et al., "Visualization and analysis of gene expression in tissue sections by spatial transcriptomics," Supplementary Materials, Science, Jul. 2016, 353(6294):78-82, 41 pages.
Stimpson et al., "Real-time detection of DNA hybridization and melting on oligonucleotide arrays by using optical wave guides," Proc Natl Acad Sci USA, Jul. 1995, 92(14):6379-83.
Strell et al., "Placing RNA in context and space—methods for spatially resolved transcriptomics," The FEBS Journal, 2019, 286(8):1468-1481.
Tawfik et al., "Man-made cell-like compartments for molecular evolution," Nat Biotechnol., Jul. 1998, 16(7):652-6.
Tijssen et al., "Overview of principles of hybridization and the strategy of nucleic acid assays" in Techniques in Biochemistry and Molecular Biology—Hybridization with Nucleic Acid Probes, 1993, 24(Chapter 2), 65 pages.
Toseland, "Fluorescent labeling and modification of proteins," J Chem Biol., Apr. 2013, 6(3):85-95.
Trejo et al., "Extraction-free whole transcriptome gene expression analysis of FFPE sections and histology-directed subareas of tissue, " PLoS ONE, Feb. 2019, 14(2):e0212031, 22 pages.
Twyman et al., "Techniques Patents for SNP Genotyping," Pharmacogenomics, Jan. 2003, 4(1):67-79.
Vallejo et al., "Fluorescence-Activated Droplet Sorting for Single-Cell Directed Evolution," ACS Synth Biol., Jun. 2019, 8(6):1430-1440.
Van Gelder et al., "Amplified RNA synthesized from limited quantities of heterogeneous cDNA," Proc. Natl. Acad. Sci. USA, 1990, 87(5):1663-1667.
Vasiliskov et al., "Fabrication of microarray of gel-immobilized compounds on a chip by copolymerization," Biotechniques, Sep. 1999, 27(3):592-606.
Vickovic et al., "High-definition spatial transcriptomics for in situ tissue profiling," Nat Methods, Oct. 2019, 16(10):987-990.
Vogelstein et al., "Digital PCR," Proceedings of the National Academy of Sciences, Aug. 1999, 96(16):9236-9241.
Walker et al., "Strand displacement amplification—an isothermal, in vitro DNA amplification technique," Nucleic Acids Research, 1992, 20(7):1691-1696.
Wang et al., "Imaging-based pooled CRISPR screening reveals regulators of lncRNA localization," Proc Natl Acad Sci USA, May 2019, 116(22):10842-10851.
Wang et al., "High-fidelity mRNA amplification for gene profiling," Nature Biotechnology, Apr. 2000. 18(4):457-459.
Woo et al., "A Comparison of cDNA, Oligonucleotide, and Affymetrix GeneChip Gene Expression Microarray Platforms," Journal of Biomolecular Techniques, 2004, 15(4), 276-284.
Worthington et al., "Cloning of random oligonucleotides to create single-insert plasmid libraries," Anal Biochem, 2001. 294(2):169-175.
Yershov et al., "DNA analysis and diagnostics on oligonucleotide microchips," Proc. Natl. Acad. Sci. USA, May 1996, 93(10):4913-4918.
Yu et al., "Shrinkage estimation of dispersion in Negative Binomial models for RNA-seq experiments with small sample size." Bioinformatics, May 2013, 29(10):1275-1282.
Zhao et al., "Robustness of RNA sequencing on older formalin-fixed paraffin-embedded tissue from high-grade ovarian serous adenocarcinomas," PLoS One, May 2019, 14(5):e0216050, 23 pages.
Zheng, "Spectroscopy-based quantitative fluorescence resonance energy transfer analysis," Methods Mol Biol., 2006, 337:65-77.
Zhu et al., "Reverse transcriptase template switching: a SMART approach for full-length cDNA library construction," Biotechniques, Apr. 2001, 30(4):892-897.
10xGenomics.com, [online], "Visium Spatial Gene Expression Reagent Kits—User Guide," Jan. 2022, retrieved on Jun. 27, 2024, retrieved from URL<https://web.archive.org/web/20230326192142/https://www.10xgenomics.com/support/spatial-gene-expression-fresh-frozen/documentation/steps/library-construction/visium-spatial-gene-expression-reagent-kits-user-guide>, 71 pages.
Kuhn et al., "A novel, high-performance random array platform for quantitative gene expression profiling," Genome Res, 2004, 14:2347-2356.

\* cited by examiner

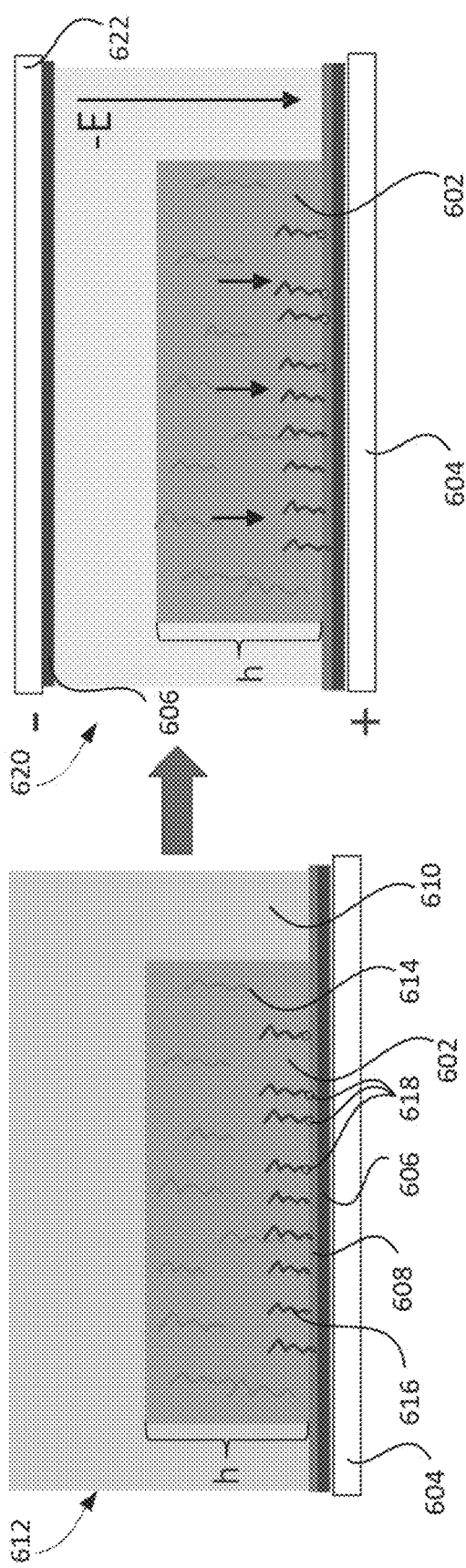
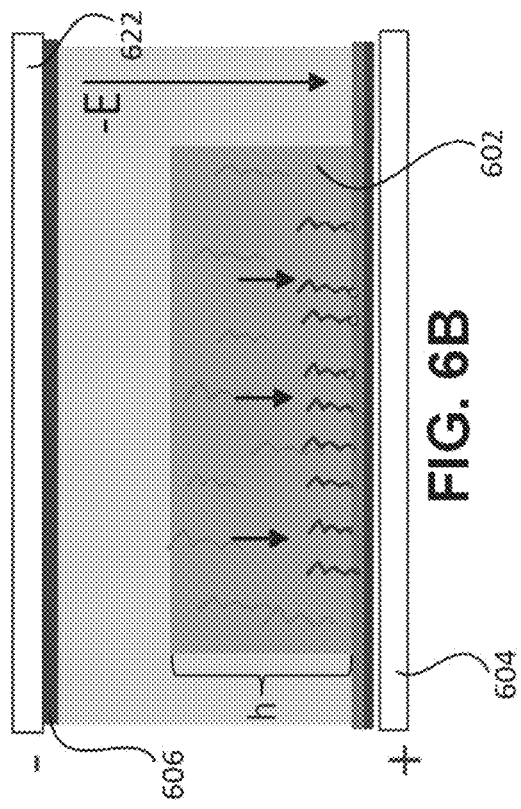
FIG. 6A
FIG. 6B

MATERIALS AND METHODS FOR SPATIAL TRANSCRIPTOMICS

CROSS-REFERENCE TO RELATED APPLICATIONS

This application claims benefit from U.S. Provisional Patent Application No. 63/037,305 filed Jun. 10, 2020, and U.S. Provisional Patent Application No. 63/037,189, filed Jun. 10, 2020, both of which are hereby incorporated by reference.

REFERENCE TO A SEQUENCE LISTING

This application contains a Sequence Listing that has been submitted electronically as an ASCII text file named "47706-0184001_SL_ST25.txt." The ASCII text file, created on Apr. 1, 2025, is 762 bytes in size. The material in the ASCII text file is hereby incorporated by reference in its entirety.

BACKGROUND

Cells within a tissue have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, e.g., the cell's morphology, differentiation, fate, viability, proliferation, behavior, signaling, and cross-talk with other cells in the tissue.

Spatial heterogeneity has been previously studied using techniques that typically provide data for a handful of analytes in the context of intact tissue or a portion of a tissue (e.g., tissue section), or provide significant analyte data from individual, single cells, but fails to provide information regarding the position of the single cells from the originating biological sample (e.g., tissue).

Different biological samples (e.g., tissue samples) can require different permeabilization conditions in order to release analytes. Often it can be difficult to predict the permeabilization conditions that will be required for different types of biological samples, or the effect that the permeabilization conditions will have on downstream capture, amplification, and/or sequencing of the released analytes.

SUMMARY

Provided herein are methods that allow for the assessment of a set of permeabilization conditions on a target biological sample and the effect that the permeabilization conditions have on downstream capture of an analyte by a capture domain, and subsequent cDNA synthesis and addition of a template switching oligonucleotide. In a second aspect, this description provides methods to improve the sensitivity and/or specificity of capture and detection of analytes in a spatial analysis.

Provided herein are methods that include: (a) contacting a biological sample with a plurality of capture probes, wherein a capture probe of the plurality comprises a capture domain, wherein the capture domain is positioned at a 3' end of the capture probe; (b) releasing one or more target analyte(s) from the biological sample, wherein a target analyte released from the biological sample is specifically bound by the capture domain of the capture probe; (c) extending the 3' end of the capture probe using the bound target analyte as a template thereby creating an extended capture probe complementary to the bound target analyte; (d) adding to the 3' end of the extended capture probe a first homopolynucleotide sequence; (e) generating a second strand that comprises in a 5' to a 3' direction: a conjugated first agent, a second homopolynucleotide sequence, and a sequence corresponding to a portion of the bound target analyte, wherein the first homopolynucleotide sequence hybridizes to the second homopolynucleotide sequence, and the step of generating the second strand comprises the use of a partially-double stranded template switching oligonucleotide sensor comprising: (i) a first oligonucleotide comprising a conjugated second agent at its 3' end, and (ii) a second oligonucleotide comprising the conjugated first agent at its 5' end and the second homopolynucleotide sequence at its 3' end, wherein the second oligonucleotide has a single-stranded overhang at its 3' end, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (f) measuring presence or absence of fluorescence upon release of the first oligonucleotide from the second oligonucleotide by extension of a 3' end of the first strand using the second oligonucleotide as a template.

In some embodiments of any of the methods described herein, the target analyte is RNA. In some embodiments of any of the methods described herein, the RNA is an mRNA. In some embodiments of any of the methods described herein, the target analyte is DNA. In some embodiments of any of the methods described herein, the DNA is genomic DNA. In some embodiments of any of the methods described herein, the genomic DNA comprises a mutation or a single nucleotide polymorphism.

In some embodiments of any of the methods described herein, the plurality of capture probes are attached to an array. In some embodiments of any of the methods described herein, the array comprises a slide. In some embodiments of any of the methods described herein, the array is a bead array. In some embodiments of any of the methods described herein, the capture probe further comprises a spatial barcode positioned 5' to the capture domain.

Some embodiments of any of the methods described herein further include determining (i) all or a portion of a nucleic acid sequence corresponding to the target analyte, or a complement thereof, and (ii) all or a portion of a nucleic acid sequence corresponding to the spatial barcode, or a complement thereof. Some embodiments of the methods described herein further include using the determined sequences of (i) and (ii) to identify the location of the target analyte in the biological sample.

In some embodiments of any of the methods described herein, the first conjugated agent is a fluorophore and the second conjugated agent is a fluorescence quencher. In some embodiments of any of the methods described herein, the first conjugated agent is a fluorescence quencher and the second conjugated agent is a fluorophore. In some embodiments of any of the methods described herein, the fluorophore comprises a xanthene moiety. In some embodiments of any of the methods described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the methods described herein, the quencher is a black hole quencher (BHQ). In some embodiments of any of the methods described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the methods described herein, the first conjugated agent is a donor fluorophore and the second conjugated agent is an acceptor fluorophore. In some embodiments of any of the methods described herein, the first conjugated agent is an acceptor fluorophore and the second conjugated agent is a donor fluorophore.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section. In some embodiments of any of the methods described herein, the tissue section is a fresh, frozen tissue section.

In some embodiments of any of the methods described herein, the first homopolynucleotide sequence is a poly (C) sequence and the second homopolynucleotide sequence is a poly (G) sequence. In some embodiments of any of the methods described herein, the first homopolynucleotide sequence is a poly (G) sequence and the second homopolynucleotide sequence is a poly (C) sequence. In some embodiments of any of the methods described herein, the first homopolynucleotide sequence is a poly (A) sequence and the second homopolynucleotide sequence is a poly (T) sequence. In some embodiments of any of the methods described herein, the first homopolynucleotide sequence is a poly (T) sequence and the second homopolynucleotide sequence is a poly (A) sequence. In some embodiments of any of the methods described herein, step (b) comprises permeabilizing the biological sample.

Some embodiments of any of the methods described herein further include comparing the measured presence or absence of fluorescence in step (f) to a control value. In some embodiments of any of the methods described herein, the control value is fluorescence measured in a control method comprising performance of steps (a) through (f), except the control method differs in condition(s) and/or reagent(s) used to perform one or more of steps (a) through (f). In some embodiments of any of the methods described herein, the control method utilizes different condition(s) to perform step (a). In some embodiments of any of the methods described herein, the control method utilizes different condition(s) and/or reagent(s) to perform step (b). In some embodiments of any of the methods described herein, step (b) comprises permeabilizing the biological sample. In some embodiments of any of the methods described herein, the control method utilizes different condition(s) and/or reagent(s) for permeabilizing the biological sample. In some embodiments of any of the methods described herein, the control method utilizes different condition(s) and/or reagent(s) to perform step (c). In some embodiments of any of the methods described herein, the control method utilizes different enzyme(s) to perform step (c). In some embodiments of any of the methods described herein, the control method utilizes different conditions and/or reagent(s) to perform step (d). In some embodiments of any of the methods described herein, the control method utilizes different enzyme(s) to perform step (d). In some embodiments of any of the methods described herein, the control method utilizes different condition(s) and/or reagent(s) to perform step (e).

Also provided herein are reaction mixtures that include: (a) a plurality of capture probes, wherein a capture probe of the plurality comprises a capture domain, wherein the capture domain is positioned at a 3' end of the capture probe; and (b) a partially-double stranded template switching oligonucleotide sensor comprising: (i) a first oligonucleotide comprising a conjugated first agent at its 3' end, and (ii) a second oligonucleotide comprising a conjugated second agent at its 5' end and a homopolynucleotide sequence at its 3' end, wherein the second oligonucleotide has a single-stranded overhang at its 3' end, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

In some embodiments of any of the reaction mixtures described herein, the plurality of capture probes are attached to an array. In some embodiments of any of the reaction mixtures described herein, the array comprises a slide. In some embodiments of any of the reaction mixtures described herein, the array is a bead array. In some embodiments of any of the reaction mixtures described herein, the capture probe further comprises a spatial barcode positioned 5' to the capture domain.

In some embodiments of any of the reaction mixtures described herein, the first conjugated agent is a fluorophore and the second conjugated agent is a fluorescence quencher. In some embodiments of any of the reaction mixtures described herein, the first conjugated agent is a fluorescence quencher and the second conjugated agent is a fluorophore. In some embodiments of any of the reaction mixtures described herein, the fluorophore comprises a xanthene moiety. In some embodiments of any of the reaction mixtures described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the reaction mixtures described herein, the quencher is a black hole quencher (BHQ). In some embodiments of any of the reaction mixtures described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the reaction mixtures described herein, the first conjugated agent is a donor fluorophore and the second conjugated agent is an acceptor fluorophore. In some embodiments of any of the reaction mixtures described herein, the first conjugated agent is an acceptor fluorophore and the second conjugated agent is a donor fluorophore.

In some embodiments of any of the reaction mixtures described herein, the homopolynucleotide sequence is a poly (C) sequence. In some embodiments of any of the reaction mixtures described herein, the homopolynucleotide sequence is a poly (G) sequence. In some embodiments of any of the reaction mixtures described herein, the homopolynucleotide sequence is a poly (A) sequence. In some embodiments of any of the reaction mixtures described herein, the homopolynucleotide sequence is a poly (T) sequence.

Some embodiments of any of the reaction mixtures described herein further include a terminal deoxynucleotidyl transferase. Some embodiments of any of the reaction mixtures described herein further include a reverse transcriptase. Some embodiments of any of the reaction mixtures described herein further include a DNA polymerase.

Also provided herein are kits that include: (a) a plurality of capture probes, wherein a capture probe of the plurality comprises a capture domain, wherein the capture domain is positioned at a 3' end of the capture probe; and (b) a partially-double stranded template switching oligonucleotide sensor comprising: (i) a first oligonucleotide comprising a conjugated first agent at its 3' end, and (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

In some embodiments of any of the kits described herein, the plurality of capture probes are attached to an array. In some embodiments of any of the kits described herein, the array comprises a slide. In some embodiments of any of the kits described herein, the array is a bead array. In some embodiments of any of the kits described herein, the capture probe further comprises a spatial barcode positioned 5' to the capture domain.

In some embodiments of any of the kits described herein, the first conjugated agent is a fluorophore and the second conjugated agent is a fluorescence quencher. In some embodiments of any of the kits described herein, the first conjugated agent is a fluorescence quencher and the second conjugated agent is a fluorophore. In some embodiments of any of the kits described herein, the fluorophore comprises a xanthene moiety. In some embodiments of any of the kits described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the kits described herein, the quencher is a black hole quencher (BHQ). In some embodiments of any of the kits described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the kits described herein, the first conjugated agent is a donor fluorophore and the second conjugated agent is an acceptor fluorophore. In some embodiments of any of the kits described herein, the first conjugated agent is an acceptor fluorophore and the second conjugated agent is a donor fluorophore.

In some embodiments of any of the kits described herein, the homopolynucleotide sequence is a poly (C) sequence. In some embodiments of any of the kits described herein, the homopolynucleotide sequence is a poly (G) sequence. In some embodiments of any of the kits described herein, the homopolynucleotide sequence is a poly (A) sequence. In some embodiments of any of the kits described herein, the homopolynucleotide sequence is a poly (T) sequence.

Some embodiments of any of the kits described herein further include a terminal deoxynucleotidyl transferase. Some embodiments of any of the kits described herein further include a reverse transcriptase. Some embodiments of any of the kits described herein further include a DNA polymerase.

Also provided herein are methods that include: (a) contacting a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) contacting a biological sample with a plurality of capture probes, wherein a capture probe of the plurality comprises a capture domain, wherein the capture domain that binds specifically to the analyte capture sequence, wherein the capture domain is positioned at a 3' end of the capture probe; (c) releasing one or more target analyte(s) from the biological sample, wherein the analyte capture sequence of the analyte capture agent selective bound to the target analyte released from the biological sample is specifically bound by the capture domain of the capture probe; (d) extending the 3' end of the capture probe using the analyte binding moiety barcode as a template; (e) adding to the 3' end of the capture probe a first homopolynucleotide sequence, thereby generating a first strand; (f) generating a second strand that comprises in a 5' to a 3' direction: a conjugated first agent, a second homopolynucleotide sequence, and a sequence corresponding to the analyte binding moiety barcode, wherein the first homopolynucleotide sequence hybridizes to the second homopolynucleotide sequence, and the step of generating the second strand comprises the use of a partially-double stranded template switching oligonucleotide sensor comprising: (i) a first oligonucleotide comprising a conjugated second agent at its 3' end, and (ii) a second oligonucleotide comprising the conjugated first agent at its 5' end and the second homopolynucleotide sequence at its 3' end, wherein the second oligonucleotide has a single-stranded overhang at its 3' end comprising the second homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (g) measuring presence or absence of fluorescence upon release of the first oligonucleotide from the second oligonucleotide by extension of a 3' end of the first strand using the second oligonucleotide as a template.

In some embodiments of any of the methods described herein, the target analyte is protein. In some embodiments of any of the methods described herein, the protein is an intracellular protein. In some embodiments of any of the methods described herein, the protein is an extracellular protein. In some embodiments of any of the methods described herein, the analyte binding moiety is an antibody or an antigen-binding fragment thereof.

In some embodiments of any of the methods described herein, the plurality of capture probes are attached to an array. In some embodiments of any of the methods described herein, the array comprises a slide. In some embodiments of any of the methods described herein, the array is a bead array. In some embodiments of any of the methods described herein, the capture probe further comprises a spatial barcode positioned 5' to the capture domain.

Some embodiments of any of the methods described herein further include determining (i) all or a portion of a nucleic acid sequence corresponding to the analyte binding moiety barcode, or a complement thereof, and (ii) all or a portion of a nucleic acid sequence corresponding to the spatial barcode, or a complement thereof. Some embodiments of any of the methods described herein further include using the determined sequences of (i) and (ii) to identify the location of the target analyte in the biological sample.

In some embodiments of any of the methods described herein, the first conjugated agent is a fluorophore and the second conjugated agent is a fluorescence quencher. In some embodiments of any of the methods described herein, the first conjugated agent is a fluorescence quencher and the second conjugated agent is a fluorophore. In some embodiments of any of the methods described herein, the fluorophore comprises a xanthene moiety. In some embodiments of any of the methods described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the methods described herein, the quencher is a black hole quencher (BHQ). In some embodiments of any of the methods described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the methods described herein, the first conjugated agent is a donor fluorophore and the second conjugated agent is an acceptor fluorophore. In some embodiments of any of the methods described herein, the first conjugated agent is an acceptor fluorophore and the second conjugated agent is a donor fluorophore.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section. In some embodiments of any of the methods described herein, the tissue section is a fresh, frozen tissue section.

In some embodiments of any of the methods described herein, the first homopolynucleotide sequence is a poly (C) sequence and the second homopolynucleotide sequence is a poly (G) sequence. In some embodiments of any of the methods described herein, the first homopolynucleotide sequence is a poly (G) sequence and the second homopolynucleotide sequence is a poly (C) sequence. In some embodiments of any of the methods described herein, the first homopolynucleotide sequence is a poly (A) sequence and the second homopolynucleotide sequence is a poly (T) sequence. In some embodiments of any of the methods described herein, the first homopolynucleotide sequence is a poly (T) sequence and the second homopolynucleotide sequence is a poly (A) sequence. In some embodiments of any of the methods described herein, step (b) comprises permeabilizing the biological sample.

Some embodiments of any of the methods described herein further include comparing the measured presence or absence of fluorescence in step (g) to a control value. In some embodiments of any of the methods described herein, the control value is fluorescence measured in a control method comprising performance of steps (a) through (g), except the control method differs in condition(s) and/or reagent(s) used to perform one or more of steps (a) through (g). In some embodiments of any of the methods described herein, the control method utilizes different condition(s) to perform step (a). In some embodiments of any of the methods described herein, the control method utilizes different condition(s) to perform step (b). In some embodiments of any of the methods described herein, the control method utilizes different condition(s) and/or reagent(s) to perform step (c). In some embodiments of any of the methods described herein, step (c) comprises permeabilizing the biological sample. In some embodiments of any of the methods described herein, the control method utilizes different condition(s) and/or reagent(s) for permeabilizing the biological sample. In some embodiments of any of the methods described herein, the control method utilizes different condition(s) and/or reagent(s) to perform step (d). In some embodiments of any of the methods described herein, the control method utilizes different enzyme(s) to perform step (d). In some embodiments of any of the methods described herein, the control method utilizes different conditions and/or reagent(s) to perform step (e). In some embodiments of any of the methods described herein, the control method utilizes different enzyme(s) to perform step (e). In some embodiments of any of the methods described herein, the control method utilizes different condition(s) and/or reagent(s) to perform step (f).

Also provided herein are reaction mixtures that include: (a) a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) a plurality of capture probes, wherein a capture probe of the plurality comprises a capture domain, wherein the capture domain binds specifically to the analyte capture sequence and the capture domain is positioned at a 3' end of the capture probe; and (c) a partially-double stranded template switching oligonucleotide sensor comprising: (i) a first oligonucleotide comprising a conjugated first agent at its 3' end, and (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

In some embodiments of any of the reaction mixtures described herein, the plurality of capture probes are attached to an array. In some embodiments of any of the reaction mixtures described herein, the array comprises a slide. In some embodiments of any of the reaction mixtures described herein, the array is a bead array. In some embodiments of any of the reaction mixtures described herein, the capture probe further comprises a spatial barcode positioned 5' to the capture domain.

In some embodiments of any of the reaction mixtures described herein, the first conjugated agent is a fluorophore and the second conjugated agent is a fluorescence quencher. In some embodiments of any of the reaction mixtures described herein, the first conjugated agent is a fluorescence quencher and the second conjugated agent is a fluorophore. In some embodiments of any of the reaction mixtures described herein, the fluorophore comprises a xanthene moiety. In some embodiments of any of the reaction mixtures described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the reaction mixtures described herein, the quencher is a black hole quencher (BHQ). In some embodiments of any of the reaction mixtures described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the reaction mixtures described herein, the first conjugated agent is a donor fluorophore and the second conjugated agent is an acceptor fluorophore. In some embodiments of any of the reaction mixtures described herein, the first conjugated agent is an acceptor fluorophore and the second conjugated agent is a donor fluorophore.

In some embodiments of any of the reaction mixtures described herein, the homopolynucleotide sequence is a poly (C) sequence. In some embodiments of any of the reaction mixtures described herein, the homopolynucleotide sequence is a poly (G) sequence. In some embodiments of any of the reaction mixtures described herein, the homopolynucleotide sequence is a poly (A) sequence. In some embodiments of any of the reaction mixtures described herein, the homopolynucleotide sequence is a poly (T) sequence.

Some embodiments of any of the reaction mixtures described herein further include a terminal deoxynucleotidyl transferase. Some embodiments of any of the reaction mixtures described herein further include a reverse transcriptase. Some embodiments of any of the reaction mixtures described herein further include a DNA polymerase.

Also provided herein are kits that include: (a) a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) a plurality of capture probes, wherein a capture probe of the plurality comprises a capture domain, wherein the capture domain binds specifically to the analyte capture sequence and the capture domain is positioned at a 3' end of the capture probe; and (c) a partially-double stranded template switching oligonucleotide sensor comprising: (i) a first oligonucleotide comprising a conjugated first agent at its 3' end, and (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

In some embodiments of any of the kits described herein, the plurality of capture probes are attached to an array. In some embodiments of any of the kits described herein, the array comprises a slide. In some embodiments of any of the kits described herein, the array is a bead array. In some embodiments of any of the kits described herein, the capture probe further comprises a spatial barcode positioned 5' to the capture domain.

In some embodiments of any of the kits described herein, the first conjugated agent is a fluorophore and the second conjugated agent is a fluorescence quencher. In some embodiments of any of the kits described herein, the first conjugated agent is a fluorescence quencher and the second conjugated agent is a fluorophore. In some embodiments of any of the kits described herein, the fluorophore comprises a xanthene moiety. In some embodiments of any of the kits described herein, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. In some embodiments of any of the kits described herein, the quencher is a black hole quencher (BHQ). In some embodiments of any of the kits described herein, the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21. In some embodiments of any of the kits described herein, the first conjugated agent is a donor fluorophore and the second conjugated agent is an acceptor fluorophore. In some embodiments of any of the kits described herein, the first conjugated agent is an acceptor fluorophore and the second conjugated agent is a donor fluorophore.

In some embodiments of any of the kits described herein, the homopolynucleotide sequence is a poly (C) sequence. In some embodiments of any of the kits described herein, the homopolynucleotide sequence is a poly (G) sequence. In some embodiments of any of the kits described herein, the homopolynucleotide sequence is a poly (A) sequence. In some embodiments of any of the kits described herein, the homopolynucleotide sequence is a poly (T) sequence.

Some embodiments of any of the kits described herein further include a terminal deoxynucleotidyl transferase. Some embodiments of any of the kits described herein further include a reverse transcriptase. Some embodiments of any of the kits described herein further include a DNA polymerase.

Also provided herein are methods for detecting capture of a nucleic acid from a biological sample that include: (a) migrating a nucleic acid from a biological sample towards a substrate using electrophoresis; (b) capturing the nucleic acid on the substrate, wherein the substrate comprises a plurality of capture probes, wherein a capture probe of the plurality of capture probes comprises a capture domain that binds specifically to the nucleic acid to form a duplex; (c) contacting the complex with an intercalating dye to form an intercalated duplex; and (d) detecting the intercalated duplex using total internal fluorescence microscopy, thereby detecting capture of the nucleic acid from the biological sample, wherein the capture probe further comprises one or both of a spatial barcode and a unique molecular identifier.

Also provided herein are methods for detecting nucleic acid migration from a biological sample to a substrate that include: (a) migrating a nucleic acid from a biological sample towards a substrate using electrophoresis; (b) capturing the nucleic acid on the substrate, wherein the substrate comprises a plurality of capture probes, wherein a capture probe of the plurality of capture probes comprises a capture domain that binds specifically to the nucleic acid to form a duplex; (c) contacting the complex with an intercalating dye to form an intercalated duplex; and (d) detecting the intercalated duplex using total internal fluorescence microscopy, thereby detecting analyte migration from the biological sample to the substrate, wherein the capture probe further comprises one or both of a spatial barcode and a unique molecular identifier.

In some embodiments of any of the methods described herein, the intercalating dye comprises berberine, ethidium bromide, proflavine, daunomycin, doxorubicin, propidium iodide, 4×1',6×1-diamidino-2×1-phenylindole, oxazole yellow, SYBR Green, or thalidomide. In some embodiments of any of the methods described herein, the total internal reflection fluorescence microscopy is objective-based. In some embodiments of any of the methods described herein, the total internal reflection fluorescence microscopy is prism-based. In some embodiments of any of the methods described herein, the total internal reflection fluorescence microscopy method uses an inverted objective.

Some embodiments of any of the methods described herein further include selecting a set of permeabilization conditions for biological samples similar to the biological sample, based on the detecting in (d). Some embodiments of any of the methods described herein further include selecting a set of capture conditions for biological samples similar to the biological sample, based on the detecting in (d).

In some embodiments of any of the methods described herein, the nucleic acid comprises single-stranded DNA or single stranded RNA. In some embodiments of any of the methods described herein, the single-stranded RNA is mRNA. In some embodiments of any of the methods described herein, the single-stranded DNA is genomic DNA.

Also provided herein are methods for detecting capture of an analyte from a biological sample that include: (a) capturing an analyte from a biological sample on a substrate comprising a plurality of capture probes, wherein a capture probe of the plurality of capture probes comprises a capture domain that binds specifically to the analyte to form a complex; (b) contacting the complex with a detectable agent that binds specifically to the complex; and (c) detecting the detectable agent specifically bound to the complex, thereby detecting capture of the analyte from the biological sample, wherein the capture probe further comprises one or both of a spatial barcode and a unique molecular identifier.

Also provided herein are methods for detecting analyte migration from a biological sample to a substrate that include: (a) capturing an analyte from a biological sample on a substrate comprising a plurality of capture probes, wherein a capture probe of the plurality of capture probes comprises a capture domain that binds specifically to the analyte to form a complex; (b) contacting the complex with a detectable agent that binds specifically to the complex; and (c) detecting the detectable agent specifically bound to the complex, thereby detecting analyte migration from the biological sample to the substrate, wherein the capture probe further comprises one or both of a spatial barcode and a unique molecular identifier.

In some embodiments of any of the methods described herein, the detectable agent is an intercalating dye. In some embodiments of any of the methods described herein, the intercalating dye comprises berberine, ethidium bromide, proflavine, daunomycin, doxorubicin, propidium iodide, 4',6-diamidino-2-phenylindole, oxazole yellow, SYBR Green, or thalidomide. In some embodiments of any of the methods described herein, the detectable agent comprises an antibody or an antigen-binding fragment thereof. In some embodiments of any of the methods described herein, the detectable agent further comprises a fluorophore. In some embodiments of any of the methods described herein, the fluorophore comprises 7-AAD (7-Aminoactinomycin D), Acridine Orange (+DNA), Acridine Orange (+RNA), Alexa Fluor® 35×10×1, Alexa Fluor® 43×10×1, Alexa Fluor® 48×18×1, Alexa Fluor® 53×12×1, Alexa Fluor® 54×16×1, Alexa Fluor® 55×15×1, Alexa Fluor® 56×18×1, Alexa Fluor® 59×14×1, Alexa Fluor® 63×13×1, Alexa Fluor® 64×17×1, Alexa Fluor® 66×10×1, Alexa Fluor® 68×10×1, Alexa Fluor® 70×10×1, Alexa Fluor® 75×10×1, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPYR TMR, BODIPY® TR-X, BODIPY® 53×10×1/55×10×1, BODIPY® 55×18×1/56×18×1, BODIPY® 56×14×1/57×10×1, BODIPY® 58×11×1/59×11×1, BODIPYR 63×10×1/65×10×1-X, BODIPY® 65×10×1-66×15×1-X, BTC, Calcein, Calcein Blue, Calcium Crimson™, Calcium Green-1TM, Calcium Orange™, Calcofluor® White, 5-Carboxyfluorescein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DIA (4-Di-16×1-ASP), DiD (DilC18×1 (5)), DIDS, Dil (DilC18×1 (3)), DiO (DiOC18×1 (3)), DiR (DilC18×1 (7)), Di-4 ANEPPS, Di-8 ANEPPS, DM-NERF (4.5-6.5 pH), DsRed (Red Fluorescent Protein), EBFP, ECFP, EGFP, ELF®-97×1 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43×1, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33×13×14×12 & 33×12×15×18, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 75×11×1 (+DNA), LDS 75×11×1 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), Lyso Tracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 48×18×1, Oregon Green® 50×10×1, Oregon Green® 51×14×1, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26×1, PKH67×1, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R67×10×1 (PE-Cy5), Red 61×13×1 (PE-Texas Red), Red Fluorescent Protein (DsRed), Resorufin, RH 41×14×1, Rhod-2, Rhodamine B, Rhodamine Green™, Rhodamine Red™, Rhodamine Phalloidin, Rhodamine 11×10×1, Rhodamine 12×13×1, 5-ROX (carboxy-X-rhodamine), S65×1A, S65×1C, S65×1L, S65×1T, SBFI, SITS, SNAFL®-1 (high pH), SNAFL®-2, SNARF®-1 (high pH), SNARF®-1 (low pH), Sodium Green™, SpectrumAqua®, SpectrumGreen® #1, SpectrumGreen® #2, SpectrumOrange®, SpectrumRed®, SYTO® 11×1, SYTOR 13×1, SYTOR 17×1, SYTOR 45×1, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTOR-1/TO-PRO®-1, TOTOR-3/TO-PRO®-3, TO-PRO®-5, Tri-color (PE-Cy5), TRITC (Tetramethylrhodamine), TruRed (PerCP-Cy5.5), WW 78×11×1, X-Rhodamine (XRITC), Y66×1F, Y66×1H, Y66×1 W, YFP (Yellow Fluorescent Protein), YOYO®-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX61×15×1, ATTO 48×18×1, ATTO 53×12×1, ATTO 55×10×1, ATTO 56×15×1, ATTO Rho10×11×1, ATTO 59×10×1, ATTO 63×13×1, ATTO 64×17×1N, TYE 56×13×1, TYE 66×15×1, TYE 70×15×1, 5' IRDye® 70×10×1, 5' IRDye® 80×10×1, 5' IRDye® 80×10×1CW (NHS Ester), WellRED D4 Dye, WellRED D3 Dye, WellRED D2 Dye, Lightcycler® 64×10×1 (NHS Ester), or Dy 75×10×1 (NHS Ester).

In some embodiments of any of the methods described herein, electrophoresis is used to migrate the analyte from the biological sample towards the substrate. In some embodiments of any of the methods described herein, the detecting in (c) is performed by detecting fluorescence emission. In some embodiments of any of the methods described herein, the detecting in (c) is performed using total internal reflection fluorescence microscopy. In some embodiments of any of the methods described herein, the total internal reflection fluorescence microscopy is objective-based. In some embodiments of any of the methods described herein, the total internal reflection fluorescence microscopy is prism-based. In some embodiments of any of the methods described herein, the total internal reflection fluorescence microscopy method uses an inverted objective.

In some embodiments of any of the methods described herein, the analyte comprises single-stranded DNA or single-stranded RNA. In some embodiments of any of the methods described herein, the single-stranded RNA is mRNA. In some embodiments of any of the methods described herein, the single-stranded DNA is genomic DNA. In some embodiments of any of the methods described herein, the capture probe comprises DNA. In some embodiments of any of the methods described herein, the capture domain comprises a poly (T) sequence. In some embodiments of any of the methods described herein, the capture domain comprises a gene-specific capture sequence. In some embodiments of any of the methods described herein, the capture probe further comprises a cleavage domain between the substrate and the spatial barcode.

In some embodiments of any of the methods described herein, the substrate further comprises a signal control region, wherein the signal control region comprises one or more detectable marker(s) in known concentration(s). In some embodiments of any of the methods described herein, the one or more detectable marker(s) of the signal control region comprise(s) a fluorophore. In some embodiments of any of the methods described herein, the one or more detectable marker(s) comprise(s) the detectable agent.

In some embodiments of any of the methods described herein, the substrate further comprises a positive control region comprising a plurality of positive control probes, wherein a positive control probe of the plurality of positive control probes comprises (i) a capture domain specifically bound to a positive control analyte to form a positive control complex. In some embodiments of any of the methods described herein, the detectable agent binds specifically to the positive control complex.

In some embodiments of any of the methods described herein, the substrate further comprises a negative control region wherein: the negative control region comprises a plurality of negative control probes, wherein a negative control probe of the plurality of negative control probes lacks a capture domain that binds specifically to the analyte, the negative control region does not comprise a capture probe, or the negative control region comprises a second plurality of capture probes, wherein a capture probe of the second plurality of capture probes comprises a capture domain that binds specifically to the analyte to form a complex, and the negative control region corresponds to a location where little or no analyte has been released from the biological sample.

Some embodiments of any of the methods described herein further include permeabilizing the biological sample prior to step (a). In some embodiments of any of the methods described herein, the location in the biological sample corresponding to the negative control region is not permeabilized. In some embodiments of any of the methods described herein, the permeabilizing comprises the use of a permeabilization reagent, wherein the permeabilization reagent comprises one or more of: an organic solvent, a detergent, and an enzyme. In some embodiments of any of the methods described herein, the organic solvent comprises acetone, ethanol, or methanol. In some embodiments of any of the methods described herein, the detergent comprises a saponin, a polyethylene oxide surfactant, a polysorbate surfactant, or sodium dodecyl sulfate (SDS). In some embodiments of any of the methods described herein, the enzyme comprises trypsin or proteinase K. In some embodiments of any of the methods described herein, the permeabilizing comprises the use of electroporation, mechanical permeabilization, acoustic permeabilization, or thermal permeabilization. In some embodiments of any of the methods described herein, the method further comprises selecting a set of permeabilization conditions for biological samples similar to the biological sample, based on the detecting in (c). In some embodiments of any of the methods described herein, the method further comprises selecting a set of capture conditions for biological samples similar to the biological sample, based on the detecting in (c).

In some embodiments of any of the methods described herein, the analyte comprises a protein. In some embodiments of any of the methods described herein, the analyte comprises the protein specifically bound by an analyte capture agent comprising (i) an analyte binding moiety that binds specifically to the protein, (ii) an analyte binding moiety barcode, and (ii) an analyte capture sequence that specifically binds to the capture domain of the capture probe to form a complex. In some embodiments of any of the methods described herein, the analyte binding moiety is an antibody or an antigen-binding fragment thereof.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section.

In some embodiments of any of the methods described herein, the substrate comprises a slide. In some embodiments of any of the methods described herein, the substrate comprises a bead.

Also provided herein are methods for detecting capture of an analyte from a biological sample that include: (a) adding a first label to an analyte from a biological sample; (b) capturing the analyte on a substrate comprising a plurality of capture probes, wherein a capture probe of the plurality of capture probes comprises (i) a capture domain that binds specifically to the analyte and (ii) a second label; and (c) detecting the association of the first label and the second label, thereby detecting capture of the analyte from the biological sample, wherein the capture probe further comprises one or both of a spatial barcode and a unique molecular identifier.

Also provided herein are methods for detecting analyte migration from a biological sample to a substrate that include: (a) adding a first label to an analyte from a biological sample; (b) capturing the analyte on a substrate comprising a plurality of capture probes, wherein a capture probe of the plurality of capture probes comprises (i) a capture domain that binds specifically to the analyte and (ii) a second label; and (c) detecting an amount of association of the first label and the second label, thereby detecting analyte migration from a biological sample to the substrate, wherein the capture probe further comprises one or both of a spatial barcode and a unique molecular identifier.

In some embodiments of any of the methods described herein, the first label is a fluorophore and the second label is a quencher. In some embodiments of any of the methods described herein, the first label is a quencher and the second label is a fluorophore. In some embodiments of any of the methods described herein, the first label is a donor fluorophore and the second label is an acceptor fluorophore. In some embodiments of any of the methods described herein, the first label is an acceptor fluorophore and the second label is the donor fluorophore. In some embodiments of any of the methods described herein, electrophoresis is used to migrate the analyte from the biological sample towards the substrate. In some embodiments of any of the methods described herein, the detecting in (c) is performed by detecting fluorescence emission. In some embodiments of any of the methods described herein, the detecting in (c) is performed using total internal reflection fluorescence microscopy. In some embodiments of any of the methods described herein, the total internal reflection fluorescence microscopy is objective-based. In some embodiments of any of the methods described herein, the total internal reflection fluorescence microscopy is prism-based. In some embodiments of any of the methods described herein, the total internal reflection fluorescence microscopy method uses an inverted objective.

In some embodiments of any of the methods described herein, the analyte comprises single-stranded DNA or single-stranded RNA. In some embodiments of any of the methods described herein, the single-stranded RNA is mRNA. In some embodiments of any of the methods described herein, the single-stranded DNA is genomic DNA. In some embodiments of any of the methods described herein, the capture probe comprises DNA. In some embodiments of any of the methods described herein, the capture domain comprises a poly (T) sequence. In some embodiments of any of the methods described herein, the capture domain comprises a gene-specific capture sequence. In some embodiments of any of the methods described herein, the capture probe further comprises a cleavage domain between the substrate and the spatial barcode.

In some embodiments of any of the methods described herein, the substrate further comprises a signal control region comprising one or more detectable marker(s) in known concentration(s). In some embodiments of any of the methods described herein, the one or more detectable marker(s) of the signal control region comprise(s) a fluorophore. In some embodiments of any of the methods described herein, the one or more detectable marker(s) of the signal control region is one or more copies of the first label. In some embodiments of any of the methods described herein, the one or more detectable marker(s) of the signal control region is one or more copies of the second label.

In some embodiments of any of the methods described herein, the substrate further comprises a positive control region comprising a plurality of positive control probes, wherein a positive control probe of the plurality of positive control probes comprises (i) a capture domain bound specifically to a positive control analyte and (ii) the second detectable label, wherein the positive control analyte comprises the first detectable label.

In some embodiments of any of the methods described herein, the substrate further comprises a negative control region, wherein: the negative control region comprises a plurality of negative control probes, wherein a negative control probe of the plurality of negative control probes comprises the second detectable label and the negative control probe lacks a capture domain that binds specifically to the analyte, the negative control region does not comprise a capture probe, or the negative control region comprises a second plurality of capture probes, wherein a capture probe of the second plurality of capture probes comprises (i) a capture domain that binds specifically to the analyte and (ii) the second label, and the negative control region corresponds to a location where little or no analyte has been released from the biological sample. In some embodiments of any of the methods described herein, the location where little or no analyte has been released from the biological sample corresponds to a location in the biological sample that has not been permeabilized.

Some embodiments of any of the methods described herein further include permeabilizing the biological sample prior to step (a). In some embodiments of any of the methods described herein, the location in the biological sample corresponding to the negative control region is not permeabilized. In some embodiments of any of the methods described herein, the permeabilizing comprises the use of a permeabilization reagent, wherein the permeabilization reagent comprises one or more of: an organic solvent, a detergent, and an enzyme. In some embodiments of any of the methods described herein, the organic solvent comprises acetone, ethanol, or methanol. In some embodiments of any of the methods described herein, the detergent comprises a saponin, a polyethylene oxide surfactant, a polysorbate surfactant, or sodium dodecyl sulfate (SDS). In some embodiments of any of the methods described herein, the enzyme comprises trypsin or proteinase K. In some embodiments of any of the methods described herein, permeabilizing comprises the use of electroporation, mechanical permeabilization, acoustic permeabilization, or thermal permeabilization.

In some embodiments of any of the methods described herein, the method further comprises selecting a set of permeabilization conditions for biological samples similar to the biological sample, based on the detecting in (c). In some embodiments of any of the methods described herein, the method further comprises selecting a set of capture conditions for biological samples similar to the biological sample, based on the detecting in (c).

In some embodiments of any of the methods described herein, the analyte comprises a protein. In some embodiments of any of the methods described herein, the analyte comprises the protein from the biological sample specifically bound by an analyte capture agent comprising (i) an analyte binding moiety that binds specifically to the protein, (ii) an analyte binding moiety barcode, and (ii) an analyte capture sequence that specifically binds to the capture domain of the capture probe, wherein the analyte capture sequence comprises the second label. In some embodiments of any of the methods described herein, the analyte binding moiety is an antibody or an antigen-binding fragment thereof.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section.

In some embodiments of any of the methods described herein, the substrate comprises a slide. In some embodiments of any of the methods described herein, the substrate comprises a bead.

Also provided herein are methods for detecting the capture of an analyte from a biological sample that include: (a) capturing an analyte from a biological sample on a substrate comprising a plurality of capture probes, wherein a capture probe of the plurality of capture probes comprises a capture domain that binds specifically to the analyte to form a complex; (b) detecting the complex, thereby detecting capture of the analyte from the biological sample, wherein detecting the complex does not include the use of a fluorophore, wherein the capture probe further comprises one or both of a spatial barcode and a unique molecular identifier.

Also provided herein are methods for detecting analyte migration from a biological sample to a substrate that include: (a) capturing an analyte from a biological sample on a substrate comprising a plurality of capture probes, wherein a capture probe of the plurality of capture probes comprises a capture domain that binds specifically to the analyte to form a complex; (b) detecting an amount of the complex, thereby detecting analyte migration from the biological sample to the substrate, wherein detecting the amount of the complex does not include the use of a fluorophore, wherein the capture probe further comprises one or both of a spatial barcode and a unique molecular identifier.

In some embodiments of any of the methods described herein, electrophoresis is used to drive the analyte from the biological sample towards the substrate. In some embodiments of any of the methods described herein, the detecting in (b) comprises the use of surface plasmon resonance. In some embodiments of any of the methods described herein, the surface plasmon resonance utilizes the Otto configuration. In some embodiments of any of the methods described herein, the surface plasmon resonance utilizes the Kretschmann configuration.

In some embodiments of any of the methods described herein, the analyte comprises single-stranded DNA or single-stranded RNA. In some embodiments of any of the methods described herein, the single-stranded RNA is mRNA. In some embodiments of any of the methods described herein, the single-stranded DNA is genomic DNA. In some embodiments of any of the methods described herein, the capture probe comprises DNA. In some embodiments of any of the methods described herein, the capture domain comprises a poly (T) sequence. In some embodiments of any of the methods described herein, the capture domain comprises a gene-specific capture sequence. In some embodiments of any of the methods described herein, the capture probe further comprises a cleavage domain between the substrate and the spatial barcode.

In some embodiments of any of the methods described herein, the substrate further comprises a signal control region comprising one or more detectable marker(s) in known concentration(s).

In some embodiments of any of the methods described herein, the substrate further comprises a positive control region comprising a plurality of positive control probes, wherein a positive control probe of the plurality of positive control probes comprises a capture domain that can specifically bind to a positive control analyte to form a positive control complex.

In some embodiments of any of the methods described herein, the substrate further comprises a negative control region, wherein: the negative control region comprises a plurality of negative control probes, and wherein a negative control probe of the plurality of negative control probes lacks a capture domain that can bind specifically to the analyte, the negative control region does not comprise a capture probe, or the negative control region comprises a second plurality of capture probes, wherein a capture probe of the second plurality of capture probes comprises a capture domain that binds specifically to the analyte to form a complex, and the negative control region corresponds to a location where little or no analyte has been released from the biological sample.

Some embodiments of any of the methods described herein further include permeabilizing the biological sample prior to step (a). In some embodiments of any of the methods described herein, the location in the biological sample corresponding to the negative control region is not permeabilized. In some embodiments of any of the methods described herein, the permeabilizing comprises the use of a permeabilization reagent, wherein the permeabilization reagent comprises one or more of: an organic solvent, a detergent, and an enzyme. In some embodiments of any of the methods described herein, the organic solvent comprises acetone, ethanol, or methanol. In some embodiments of any of the methods described herein, the detergent comprises a saponin, a polyethylene oxide surfactant, a polysorbate surfactant, or sodium dodecyl sulfate (SDS). In some embodiments of any of the methods described herein, the enzyme comprises trypsin or proteinase K. In some embodiments of any of the methods described herein, the permeabilizing comprises the use of electroporation, mechanical permeabilization, acoustic permeabilization, or thermal permeabilization.

Some embodiments of any of the methods described herein further include selecting a set of permeabilization conditions for biological samples similar to the biological sample, based on the detecting in (b). Some embodiments of any of the methods described herein further include selecting a set of capture conditions for biological samples similar to the biological sample, based on the detecting in (b).

In some embodiments of any of the methods described herein, the analyte comprises a protein. In some embodiments of any of the methods described herein, the analyte comprises the protein specifically bound by an analyte capture agent comprising (i) an analyte binding moiety that binds specifically to the protein, (ii) an analyte binding moiety barcode, and (ii) an analyte capture sequence that specifically binds to the capture domain of the capture probe to form a complex. In some embodiments of any of the methods described herein, the analyte binding moiety is an antibody or an antigen-binding fragment thereof.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section.

In some embodiments of any of the methods described herein, the substrate comprises a slide. In some embodiments of any of the methods described herein, the substrate comprises a bead.

Also provided herein are methods for selecting a set of capture conditions for a biological sample that include: (a) applying a first set of test capture conditions to a first portion of a biological sample, wherein the first set of test capture conditions results in the release of an analyte from the first portion of the biological sample; (b) capturing the analyte released from the first portion of the biological sample on a substrate comprising a plurality of capture probes, wherein a capture probe of the plurality of capture probes comprises a capture domain that specifically binds the analyte released from the first portion of the biological sample to form a complex; (c) contacting the complex in step (b) with a detectable agent that specifically binds to the complex; (d) detecting an amount of the detectable agent specifically bound to the complex in (c); (e) applying a second set of test capture conditions to a second portion of a biological sample, wherein the second set of test capture conditions results in the release of the analyte from the second portion of the biological sample; (f) capturing the analyte released from the second portion of the biological sample on a substrate comprising a plurality of capture probes, wherein a capture probe of the plurality of capture probes comprises a capture domain that specifically binds to the analyte released from the second portion of the biological sample to form a complex; (g) contacting the complex in step (f) with the detectable agent that specifically binds to the complex; (h) detecting an amount of the detectable agent specifically bound to the complex in (g); and (i) selecting the first or second set of test capture conditions based on a comparison of the amounts of the detectable agent specifically bound to the complex in steps (d) and (h).

Also provided herein are methods for selecting a set of capture conditions for a biological sample that include: (a) applying a first set of test capture conditions to a first portion of a biological sample, wherein the first set of test capture conditions results in the release of an analyte from the first portion of the biological sample; (b) adding a first label to the analyte released from the first portion of the biological sample; (c) capturing the analyte released from the first portion of the biological sample on a substrate comprising a plurality of capture probes, wherein a capture probe of the plurality of capture probes comprises (i) a capture domain that specifically binds to the analyte released from the first portion of the biological sample and (ii) a second label; (d) detecting the association of the first label and the second label; (e) applying a second set of test capture conditions to a second portion of the biological sample, wherein the second set of test capture conditions results in the release of the analyte from the second portion of the biological sample; (f) adding the first label to the analyte released from the second portion of the biological sample; (g) capturing the analyte released from the second portion of the biological sample on a substrate comprising a plurality of capture probes, wherein a capture probe of the plurality of labeled capture probes comprises (i) a capture domain that binds specifically to the analyte released from the second portion of the biological sample and (ii) the second label; (h) detecting the association of the first label and the second label; and (i) selecting the first or second set of test capture conditions based on a comparison of the association of the first label and the second label detected in steps (d) and (h).

Also provided herein are methods for selecting a set of capture conditions for a biological sample that include: (a) applying a first set of test capture conditions to a first portion of a biological sample, wherein the first set of test capture conditions results in the release of an analyte from the first portion of the biological sample; (b) capturing the analyte released from the first portion of the biological sample on a substrate comprising a plurality of capture probes, wherein a capture probe of the plurality of capture probes comprises a capture domain that binds specifically to the analyte released from the first portion of the biological sample to form a complex; (c) detecting a first level of the complex of step (b), wherein the detecting of the first level of the complex does not include the use of a fluorophore; (d) applying a second set of test capture conditions to a second portion of a biological sample, wherein the second set of test capture conditions results in the release of the analyte from the second portion of the biological sample; (e) capturing the analyte released from the second portion of the biological sample on a substrate comprising a plurality of capture probes, wherein a capture probe of the plurality of capture probes comprises a capture domain that binds specifically to the analyte released from the second portion of the biological sample to form a complex; (f) detecting a second level of the complex of step (e), wherein the detecting of the second level of the complex does not include the use of a fluorophore; and (g) selecting the first or second set of test capture conditions based on a comparison of the first level of the complex detected in step (c) and the second level of the complex detected in step (f).

In some embodiments of any of the methods described herein, electrophoresis is used to drive the analyte released from the first portion and/or the second portion of the biological sample towards the substrate.

In some embodiments of any of the methods described herein, the capture probe of the plurality of capture probes used to capture the analyte released from the first portion of the biological sample further comprises: a spatial barcode, a unique molecular identifier, or the spatial barcode and the unique molecular identifier.

In some embodiments of any of the methods described herein, the capture probe of the plurality of capture probes used to capture the analyte released from the second portion of the biological sample further comprises: a spatial barcode, a unique molecular identifier, or the spatial barcode and the unique molecular identifier.

In some embodiments of any of the methods described herein, the substrate further comprises a positive control region comprising a plurality of positive control probes, wherein a positive control probe of the plurality of positive control probes can specifically bind to a positive control analyte to form a positive control complex.

In some embodiments of any of the methods described herein, the substrate further comprises a negative control region, wherein: the negative control region comprises a plurality of negative control probes, and wherein a negative control probe of the plurality of negative control probes lacks a capture domain that can bind specifically to the analyte released from the first or second portion of the biological sample, the negative control region comprises no capture probes, or the negative control region comprises a second plurality of capture probes, wherein a capture probe of the second plurality of capture probes comprises capture domain that can bind specifically to the analyte released from the first or second portion of the biological sample, and the negative control region corresponds to a location where little or no analyte has been released from the first or second portion of the biological sample.

In some embodiments of any of the methods described herein, the first or second set of test capture conditions comprise a permeabilization reagent, wherein the permeabilization reagent comprises one or more of: an organic solvent, a detergent, and an enzyme. In some embodiments of any of the methods described herein, the organic solvent comprises acetone, ethanol, or methanol. In some embodiments of any of the methods described herein, the detergent comprises a saponin, a polyethylene oxide surfactant, a polysorbate surfactant, or sodium dodecyl sulfate (SDS). In some embodiments of any of the methods described herein, the enzyme comprises trypsin or proteinase K. In some embodiments of any of the methods described herein, the first or second set of test capture conditions comprise the use of electroporation, mechanical permeabilization, acoustic permeabilization, or thermal permeabilization. In some embodiments of any of the methods described herein, the first set of test capture conditions and the second set of test capture conditions differ in temperature of permeabilization. In some embodiments of any of the methods described herein, the first set of test capture conditions and the second set of test capture conditions differ in duration of exposure to the test capture conditions. In some embodiments of any of the methods described herein, the first set of test capture conditions and the second set of test capture conditions differ in identity of one or more of: organic solvent, detergent, and enzyme. In some embodiments of any of the methods described herein, the first set of test capture conditions and the second set of test capture conditions differ in concentration of one or more of: organic solvent, detergent, and enzyme.

In some embodiments of any of the methods described herein, the analyte comprises single-stranded DNA or single-stranded RNA. In some embodiments of any of the methods described herein, the single-stranded RNA is mRNA. In some embodiments of any of the methods described herein, the single-stranded DNA is genomic DNA. In some embodiments of any of the methods described herein, the capture probe comprises DNA. In some embodiments of any of the methods described herein, the capture domain comprises a poly (T) sequence. In some embodiments of any of the methods described herein, the capture domain comprises a gene-specific capture sequence.

In some embodiments of any of the methods described herein, the analyte comprises a protein. In some embodiments of any of the methods described herein, the analyte comprises a protein specifically bound by an analyte capture agent comprising (i) an analyte binding moiety that binds specifically to the protein, (ii) an analyte binding moiety barcode, and (ii) an analyte capture sequence that specifically binds to the capture domain of the capture probe to form a complex. In some embodiments of any of the methods described herein, the analyte binding moiety is an antibody or an antigen-binding fragment thereof.

In some embodiments of any of the methods described herein, the biological sample is a tissue sample. In some embodiments of any of the methods described herein, the tissue sample is a tissue section. In some embodiments of any of the methods described herein, the tissue section is a fixed tissue section. In some embodiments of any of the methods described herein, the fixed tissue section is a formalin-fixed paraffin-embedded tissue section.

In some embodiments of any of the methods described herein, the substrate comprises a slide. In some embodiments of any of the methods described herein, the substrate comprises a bead.

All publications, patents, and patent applications mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated.

The term "each," when used in reference to a collection of items, is intended to identify an individual item in the collection but does not necessarily refer to every item in the collection, unless expressly stated otherwise, or unless the context of the usage clearly indicates otherwise.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternatives to the specific embodiments described herein are also within the scope of this disclosure.

DESCRIPTION OF DRAWINGS

The following drawings illustrate certain embodiments of the features and advantages of this disclosure. These embodiments are not intended to limit the scope of the appended claims in any manner. Like reference symbols in the drawings indicate like elements.

FIG. 6A shows a schematic of an example analytical workflow in which electrophoretic migration of analytes is performed after permeabilization.

FIG. 6B shows a schematic of an example analytical workflow in which electrophoretic migration of analytes and permeabilization are performed simultaneously.

DETAILED DESCRIPTION

Figure 1:
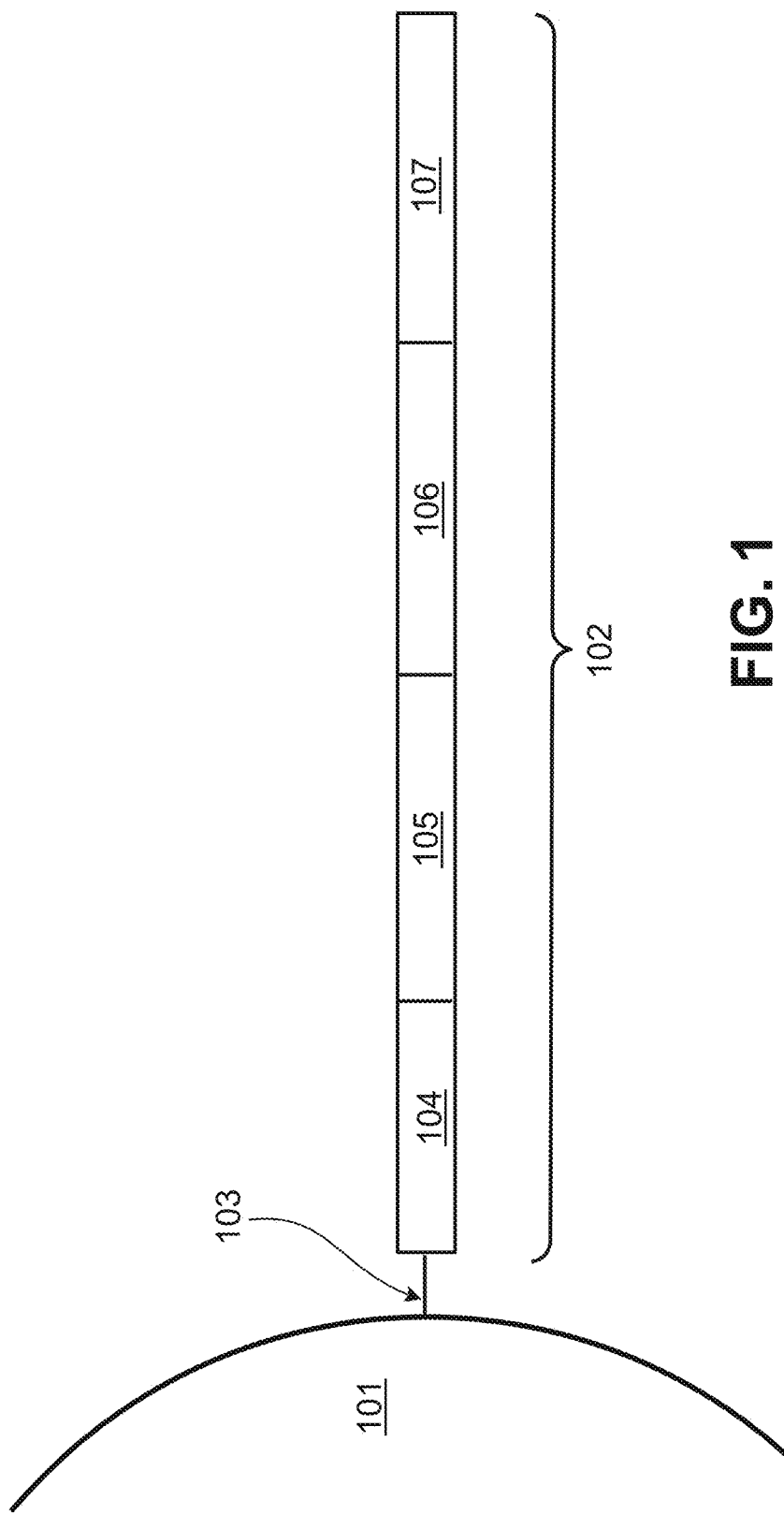
FIG. 1 is a schematic diagram showing an example of a barcoded capture probe, as described herein.

In some workflows of spatial analysis, a template switching reaction is used to further extend a capture probe which has been already extended by a reverse transcriptase using a captured analyte as a template. The action of a reverse transcriptase with terminal transferase activity can result in the inclusion of a homopolynucleotide sequence at the 3' end of the extended capture probe (e.g., a poly (C) sequence). A template switching oligo (TSO), including a hybridization region and a template region, can hybridize to the homopolynucleotide sequence and can be used as a template for second strand synthesis with a sequence complementary to the template region. The sequence complementary to the template region of the TSO can be used as a primer for second-strand synthesis. The efficiency of the hybridization of the TSO and subsequent second strand synthesis can affect the overall makeup of the spatial analysis library. In addition, the efficiency of the TSO reaction can be used to optimize various experimental conditions, such as sample prep (e.g., decrosslinking of FFPE samples, permeabilization conditions, and choice of RT enzymes). Accordingly, provided herein are methods of determining the efficiency of the TSO reaction.

In some aspects, this disclosure provides methods of detecting capture of an analyte. In some aspects, this disclosure provides methods of detecting analyte migration (e.g., from a biological sample to a substrate). Detecting capture of an analyte and/or detection of migration of an analyte can be useful when determining permeabilization conditions for a biological sample. As another example, detecting capture of an analyte and/or detection of migration of an analyte can help to determine useful capture conditions for one or more analytes from a biological sample. It will be understood that useful conditions can depend, at least in part, on the identity of a sample (e.g., the type of tissue), the sample conditions (e.g., if the sample is a fresh-frozen or FFPE sample), and/or the analyte to be captured (e.g., whether the analyte is a nucleic acid or a protein).

Spatial analysis methodologies and compositions described herein can provide a vast amount of analyte and/or expression data for a variety of analytes within a biological sample at high spatial resolution, while retaining native spatial context. Spatial analysis methods and compositions can include, e.g., the use of a capture probe including a spatial barcode (e.g., a nucleic acid sequence that provides information as to the location or position of an analyte within a cell or a tissue sample (e.g., mammalian cell or a mammalian tissue sample) and a capture domain that is capable of binding to an analyte (e.g., a protein and/or a nucleic acid) produced by and/or present in a cell. Spatial analysis methods and compositions can also include the use of a capture probe having a capture domain that captures an intermediate agent for indirect detection of an analyte. For example, the intermediate agent can include a nucleic acid sequence (e.g., a barcode) associated with the intermediate agent. Detection of the intermediate agent is therefore indicative of the analyte in the cell or tissue sample.

Non-limiting aspects of spatial analysis methodologies and compositions are described in U.S. Pat. Nos. 10,774, 374, 10,724,078, 10,480,022, 10,059,990, 10,041,949, 10,002,316, 9,879,313, 9,783,841, 9,727,810, 9,593,365, 8,951,726, 8,604,182, 7,709,198, U.S. Patent Application Publication Nos. 2020/239946, 2020/080136, 2020/0277663, 2020/024641, 2019/330617, 2019/264268, 2020/256867, 2020/224244, 2019/194709, 2019/161796, 2019/085383, 2019/055594, 2018/216161, 2018/051322, 2018/0245142, 2017/241911, 2017/089811, 2017/067096, 2017/029875, 2017/0016053, 2016/108458, 2015/000854, 2013/171621, WO 2018/091676, WO 2020/176788, Rodriques et al., Science 363 (6434): 1463-1467, 2019; Lee et al., Nat. Protoc. 10 (3): 442-458, 2015; Trejo et al., PLOS ONE 14 (2): e0212031, 2019; Chen et al., Science 348 (6233): aaa6090, 2015; Gao et al., BMC Biol. 15:50, 2017; and Gupta et al., Nature Biotechnol. 36:1197-1202, 2018; the Visium Spatial Gene Expression Reagent Kits User Guide (e.g., Rev C, dated June 2020), and/or the Visium Spatial Tissue Optimization Reagent Kits User Guide (e.g., Rev C, dated July 2020), both of which are available at the 10× Genomics Support Documentation website, and can be used herein in any combination. Further non-limiting aspects of spatial analysis methodologies and compositions are described herein.

Some general terminology that may be used in this disclosure can be found in Section (I)(b) of WO 2020/176788 and/or U.S. Patent Application Publication No. 2020/0277663. Typically, a "barcode" is a label, or identifier, that conveys or is capable of conveying information (e.g., information about an analyte in a sample, a bead, and/or a capture probe). A barcode can be part of an analyte, or independent of an analyte. A barcode can be attached to an analyte. A particular barcode can be unique relative to other barcodes. For the purpose of this disclosure, an "analyte" can include any biological substance, structure, moiety, or component to be analyzed. The term "target" can similarly refer to an analyte of interest.

The terms "detectable label," "optical label," and "label" are used interchangeably herein to refer to a directly or indirectly detectable moiety that is associated with (e.g., conjugated to) a molecule to be detected, e.g., a capture probe or analyte. The detectable label can be directly detectable by itself (e.g., radioisotope labels or fluorescent labels) or, in the case of an enzymatic label, can be indirectly detectable, e.g., by catalyzing chemical alterations of a chemical substrate compound or composition, which chemical substrate compound or composition is directly detectable. Detectable labels can be suitable for small scale detection and/or suitable for high-throughput screening. As such, suitable detectable labels include, but are not limited to, radioisotopes, fluorophores, chemiluminescent compounds, bioluminescent compounds, and dyes.

The detectable label can be qualitatively detected (e.g., optically or spectrally), or it can be quantified. Qualitative detection generally includes a detection method in which the existence or presence of the detectable label is confirmed, whereas quantifiable detection generally includes a detection method having a quantifiable (e.g., numerically reportable) value such as an intensity, duration, polarization, and/or other properties. In some embodiments, the detectable label is bound to a feature or to a capture probe associated with a feature. For example, detectably labeled features can include a fluorescent, a colorimetric, or a chemiluminescent label attached to a bead (see, for example, Rajeswari et al., J. Microbiol Methods 139:22-28, 2017, and Forcucci et al., J. Biomed Opt. 10:105010, 2015, the entire contents of each of which are incorporated herein by reference).

In some embodiments, a plurality of detectable labels can be attached to a feature, capture probe, or composition to be detected. For example, detectable labels can be incorporated during nucleic acid polymerization or amplification (e.g., Cy5®-labelled nucleotides, such as Cy5®-dCTP). Any suitable detectable label can be used. In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPYR FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DIA (4-Di-16-ASP), DiD (DilC18 (5)), DIDS, Dil (DilC18 (3)), DiO (DiOC18 (3)), DiR (DilC18 (7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARFR-1 (high pH), SNARF®-1 (low pH), Sodium Green™, SpectrumAqua®, SpectrumGreen® #1, SpectrumGreen® #2, SpectrumOrange®, SpectrumRed®, SYTOR 11, SYTOR 13, SYTOR 17, SYTO® 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66 W, YFP (Yellow Fluorescent Protein), YOYO®-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye@ 800CW (NHS Ester), WellRED D4 Dye, WellRED D3 Dye, WellRED D2 Dye, Lightcycler® 640 (NHS Ester), and Dy 750 (NHS Ester).

As mentioned above, in some embodiments, a detectable label is or includes a luminescent or chemiluminescent moiety. Common luminescent/chemiluminescent moieties include, but are not limited to, peroxidases such as horseradish peroxidase (HRP), soybean peroxidase (SP), alkaline phosphatase, and luciferase. These protein moieties can catalyze chemiluminescent reactions given the appropriate chemical substrates (e.g., an oxidizing reagent plus a chemiluminescent compound). A number of compound families are known to provide chemiluminescence under a variety of conditions. Non-limiting examples of chemiluminescent compound families include 2,3-dihydro-1,4-phthalazinedione luminol, 5-amino-6,7,8-trimethoxy- and the dimethylamino [ca]benz analog. These compounds can luminesce in the presence of alkaline hydrogen peroxide or calcium hypochlorite and base. Other examples of chemiluminescent compound families include, e.g., 2,4,5-triphenylimidazoles, para-dimethylamino and -methoxy substituents, oxalates such as oxalyl active esters, p-nitrophenyl, N-alkyl acridinum esters, luciferins, lucigenins, or acridinium esters.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral proteins (e.g., viral capsid, viral envelope, viral coat, viral accessory, viral glycoproteins, viral spike, etc.), extracellular and intracellular proteins, antibodies, and antigen binding fragments. In some embodiments, the analyte(s) can be localized to subcellular location(s), including, for example, organelles, e.g., mitochondria, Golgi apparatus, endoplasmic reticulum, chloroplasts, endocytic vesicles, exocytic vesicles, vacuoles, lysosomes, etc. In some embodiments, analyte(s) can be peptides or proteins, including without limitation antibodies and enzymes. Additional examples of analytes can be found in Section (I)(c) of WO 2020/176788 and/or U.S. Patent Application Publication No. 2020/0277663. In some embodiments, an analyte can be detected indirectly, such as through detection of an intermediate agent, for example, a ligation product or an analyte capture agent (e.g., an oligonucleotide-conjugated antibody), such as those described herein.

A "biological sample" is typically obtained from the subject for analysis using any of a variety of techniques including, but not limited to, biopsy, surgery, and laser capture microscopy (LCM), and generally includes cells and/or other biological material from the subject. In some embodiments, a biological sample can be a tissue section. In some embodiments, a biological sample can be a fixed and/or stained biological sample (e.g., a fixed and/or stained tissue section). Non-limiting examples of stains include histological stains (e.g., hematoxylin and/or eosin) and immunological stains (e.g., fluorescent stains). In some embodiments, a biological sample (e.g., a fixed and/or stained biological sample) can be imaged. Biological samples are also described in Section (I)(d) of WO 2020/176788 and/or U.S. Patent Application Publication No. 2020/0277663.

In some embodiments, a biological sample is permeabilized with one or more permeabilization reagents. For example, permeabilization of a biological sample can facilitate analyte capture. Exemplary permeabilization agents and conditions are described in Section (I)(d)(ii)(13) or the Exemplary Embodiments Section of WO 2020/176788 and/or U.S. Patent Application Publication No. 2020/0277663.

Array-based spatial analysis methods involve the transfer of one or more analytes from a biological sample to an array of features on a substrate, where each feature is associated with a unique spatial location on the array. Subsequent analysis of the transferred analytes includes determining the identity of the analytes and the spatial location of the analytes within the biological sample. The spatial location of an analyte within the biological sample is determined based on the feature to which the analyte is bound (e.g., directly or indirectly) on the array, and the feature's relative spatial location within the array.

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe includes a barcode (e.g., a spatial barcode and/or a unique molecular identifier (UMI)) and a capture domain). In some embodiments, a capture probe can include a cleavage domain and/or a functional domain (e.g., a primer-binding site, such as for next-generation sequencing (NGS)). See, e.g., Section (II)(b)(e.g., subsections (i)-(vi)) of WO 2020/176788 and/or U.S. Patent Application Publication No. 2020/0277663. Generation of capture probes can be achieved by any appropriate method, including those described in Section (II)(d)(ii) of WO 2020/176788 and/or U.S. Patent Application Publication No. 2020/0277663.

In some embodiments, more than one analyte type (e.g., nucleic acids and proteins) from a biological sample can be detected (e.g., simultaneously or sequentially) using any appropriate multiplexing technique, such as those described in Section (IV) of WO 2020/176788 and/or U.S. Patent Application Publication No. 2020/0277663.

In some embodiments, detection of one or more analytes (e.g., protein analytes) can be performed using one or more analyte capture agents. As used herein, an "analyte capture agent" refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) an analyte capture sequence. As used herein, the term "analyte binding moiety barcode" refers to a barcode that is associated with or otherwise identifies the analyte binding moiety. As used herein, the term "analyte capture sequence" refers to a region or moiety configured to hybridize to, bind to, couple to, or otherwise interact with a capture domain of a capture probe. In some cases, an analyte binding moiety barcode (or portion thereof) may be able to be removed (e.g., cleaved) from the analyte capture agent. Additional description of analyte capture agents can be found in Section (II)(b)(ix) of WO 2020/176788 and/or Section (II)(b)(viii) U.S. Patent Application Publication No. 2020/0277663.

There are at least two methods to associate a spatial barcode with one or more neighboring cells, such that the spatial barcode identifies the one or more cells, and/or contents of the one or more cells, as associated with a particular spatial location. One method is to promote analytes or analyte proxies (e.g., intermediate agents) out of a cell and towards a spatially-barcoded array (e.g., including spatially-barcoded capture probes). Another method is to cleave spatially-barcoded capture probes from an array and promote the spatially-barcoded capture probes towards and/or into or onto the biological sample.

In some cases, capture probes may be configured to prime, replicate, and consequently yield optionally barcoded extension products from a template (e.g., a DNA or RNA template, such as an analyte or an intermediate agent (e.g., a ligation product or an analyte capture agent), or a portion thereof), or derivatives thereof (see, e.g., Section (II)(b)(vii) of WO 2020/176788 and/or U.S. Patent Application Publication No. 2020/0277663 regarding extended capture probes). In some cases, capture probes may be configured to form ligation products with a template (e.g., a DNA or RNA template, such as an analyte or an intermediate agent, or portion thereof), thereby creating ligations products that serve as proxies for a template.

As used herein, an "extended capture probe" refers to a capture probe having additional nucleotides added to the terminus (e.g., 3' or 5' end) of the capture probe thereby extending the overall length of the capture probe. For example, an "extended 3' end" indicates additional nucleotides were added to the most 3' nucleotide of the capture probe to extend the length of the capture probe, for example, by polymerization reactions used to extend nucleic acid molecules including templated polymerization catalyzed by a polymerase (e.g., a DNA polymerase or a reverse transcriptase). In some embodiments, extending the capture probe includes adding to a 3' end of a capture probe a nucleic acid sequence that is complementary to a nucleic acid sequence of an analyte or intermediate agent specifically bound to the capture domain of the capture probe. In some embodiments, the capture probe is extended using reverse transcription. In some embodiments, the capture probe is extended using one or more DNA polymerases. The extended capture probes include the sequence of the capture probe and the sequence of the spatial barcode of the capture probe.

In some embodiments, extended capture probes are amplified (e.g., in bulk solution or on the array) to yield quantities that are sufficient for downstream analysis, e.g., via DNA sequencing. In some embodiments, extended capture probes (e.g., DNA molecules) act as templates for an amplification reaction (e.g., a polymerase chain reaction).

Additional variants of spatial analysis methods, including in some embodiments, an imaging step, are described in Section (II)(a) of WO 2020/176788 and/or U.S. Patent Application Publication No. 2020/0277663. Analysis of captured analytes (and/or intermediate agents or portions thereof), for example, including sample removal, extension of capture probes, sequencing (e.g., of a cleaved extended capture probe and/or a cDNA molecule complementary to an extended capture probe), sequencing on the array (e.g., using, for example, in situ hybridization or in situ ligation approaches), temporal analysis, and/or proximity capture, is described in Section (II)(g) of WO 2020/176788 and/or U.S. Patent Application Publication No. 2020/0277663. Some quality control measures are described in Section (II)(h) of WO 2020/176788 and/or U.S. Patent Application Publication No. 2020/0277663.

Spatial information can provide information of biological and/or medical importance. For example, the methods and compositions described herein can allow for: identification of one or more biomarkers (e.g., diagnostic, prognostic, and/or for determination of efficacy of a treatment) of a disease or disorder; identification of a candidate drug target for treatment of a disease or disorder; identification (e.g., diagnosis) of a subject as having a disease or disorder; identification of stage and/or prognosis of a disease or disorder in a subject; identification of a subject as having an increased likelihood of developing a disease or disorder; monitoring of progression of a disease or disorder in a subject; determination of efficacy of a treatment of a disease or disorder in a subject; identification of a patient subpopulation for which a treatment is effective for a disease or disorder; modification of a treatment of a subject with a disease or disorder; selection of a subject for participation in a clinical trial; and/or selection of a treatment for a subject with a disease or disorder.

Spatial information can provide information of biological importance. For example, the methods and compositions described herein can allow for: identification of transcriptome and/or proteome expression profiles (e.g., in healthy and/or diseased tissue); identification of multiple analyte types in close proximity (e.g., nearest neighbor analysis); determination of up- and/or down-regulated genes and/or proteins in diseased tissue; characterization of tumor microenvironments; characterization of tumor immune responses; characterization of cells types and their co-localization in tissue; and identification of genetic variants within tissues (e.g., based on gene and/or protein expression profiles associated with specific disease or disorder biomarkers).

Typically, for spatial array-based methods, a substrate functions as a support for direct or indirect attachment of capture probes to features of the array. A "feature" is an entity that acts as a support or repository for various molecular entities used in spatial analysis. In some embodiments, some or all of the features in an array are functionalized for analyte capture. Exemplary substrates are described in Section (II)(c) of WO 2020/176788 and/or U.S. Patent Application Publication No. 2020/0277663. Exemplary features and geometric attributes of an array can be found in Sections (II)(d)(i), (II)(d)(iii), and (II)(d)(iv) of WO 2020/176788 and/or U.S. Patent Application Publication No. 2020/0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) comprising capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No. 2020/0277663.

In some cases, spatial analysis can be performed by attaching and/or introducing a molecule (e.g., a peptide, a lipid, or a nucleic acid molecule) having a barcode (e.g., a spatial barcode) to a biological sample (e.g., to a cell in a biological sample). In some embodiments, a plurality of molecules (e.g., a plurality of nucleic acid molecules) having a plurality of barcodes (e.g., a plurality of spatial barcodes) are introduced to a biological sample (e.g., to a plurality of cells in a biological sample) for use in spatial analysis. In some embodiments, after attaching and/or introducing a molecule having a barcode to a biological sample, the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

In some cases, spatial analysis can be performed by detecting multiple oligonucleotides that hybridize to an analyte. In some instances, for example, spatial analysis can be performed using RNA-templated ligation (RTL). Methods of RTL have been described previously. See, e.g., Credle et al., *Nucleic Acids Res.* 2017 Aug. 21; 45 (14): e128. Typically, RTL includes hybridization of two oligonucleotides to adjacent sequences on an analyte (e.g., an RNA molecule, such as an mRNA molecule). In some instances, the oligonucleotides are DNA molecules. In some instances, one of the oligonucleotides includes at least two ribonucleic acid bases at the 3' end and/or the other oligonucleotide includes a phosphorylated nucleotide at the 5' end. In some instances, one of the two oligonucleotides includes a capture domain (e.g., a poly (A) sequence, a non-homopolymeric sequence). After hybridization to the analyte, a ligase (e.g., SplintR ligase) ligates the two oligonucleotides together, creating a ligation product. In some instances, the two oligonucleotides hybridize to sequences that are not adjacent to one another. For example, hybridization of the two oligonucleotides creates a gap between the hybridized oligonucleotides. In some instances, a polymerase (e.g., a DNA polymerase) can extend one of the oligonucleotides prior to ligation. After ligation, the ligation product is released from the analyte. In some instances, the ligation product is released using an endonuclease (e.g., RNAse H). The released ligation product can then be captured by capture probes (e.g., instead of direct capture of an analyte) on an array, optionally amplified, and sequenced, thus determining the location and optionally the abundance of the analyte in the biological sample.

During analysis of spatial information, sequence information for a spatial barcode associated with an analyte is obtained, and the sequence information can be used to provide information about the spatial distribution of the analyte in the biological sample. Various methods can be used to obtain the spatial information. In some embodiments, specific capture probes and the analytes they capture are associated with specific locations in an array of features on a substrate. For example, specific spatial barcodes can be associated with specific array locations prior to array fabrication, and the sequences of the spatial barcodes can be stored (e.g., in a database) along with specific array location information, so that each spatial barcode uniquely maps to a particular array location.

Alternatively, specific spatial barcodes can be deposited at predetermined locations in an array of features during fabrication such that at each location, only one type of spatial barcode is present so that spatial barcodes are uniquely associated with a single feature of the array. Where necessary, the arrays can be decoded using any of the methods described herein so that spatial barcodes are uniquely associated with array feature locations, and this mapping can be stored as described above.

When sequence information is obtained for capture probes and/or analytes during analysis of spatial information, the locations of the capture probes and/or analytes can be determined by referring to the stored information that uniquely associates each spatial barcode with an array feature location. In this manner, specific capture probes and captured analytes are associated with specific locations in the array of features. Each array feature location represents a position relative to a coordinate reference point (e.g., an array location, a fiducial marker) for the array. Accordingly, each feature location has an "address" or location in the coordinate space of the array.

Some exemplary spatial analysis workflows are described in the Exemplary Embodiments section of WO 2020/176788 and/or U.S. Patent Application Publication No. 2020/0277663. See, for example, the Exemplary embodiment starting with "In some non-limiting examples of the workflows described herein, the sample can be immersed . . . " of WO 2020/176788 and/or U.S. Patent Application Publication No. 2020/0277663. See also, e.g., the Visium Spatial Gene Expression Reagent Kits User Guide (e.g., Rev C, dated June 2020), and/or the Visium Spatial Tissue Optimization Reagent Kits User Guide (e.g., Rev C, dated July 2020).

In some embodiments, spatial analysis can be performed using dedicated hardware and/or software, such as any of the systems described in Sections (II)(e)(ii) and/or (V) of WO 2020/176788 and/or U.S. Patent Application Publication No. 2020/0277663, or any of one or more of the devices or methods described in Sections Control Slide for Imaging, Methods of Using Control Slides and Substrates for, Systems of Using Control Slides and Substrates for Imaging, and/or Sample and Array Alignment Devices and Methods, Informational labels of WO 2020/123320.

Suitable systems for performing spatial analysis can include components such as a chamber (e.g., a flow cell or sealable, fluid-tight chamber) for containing a biological sample. The biological sample can be mounted for example, in a biological sample holder. One or more fluid chambers can be connected to the chamber and/or the sample holder via fluid conduits, and fluids can be delivered into the chamber and/or sample holder via fluidic pumps, vacuum sources, or other devices coupled to the fluid conduits that create a pressure gradient to drive fluid flow. One or more valves can also be connected to fluid conduits to regulate the flow of reagents from reservoirs to the chamber and/or sample holder.

The systems can optionally include a control unit that includes one or more electronic processors, an input interface, an output interface (such as a display), and a storage unit (e.g., a solid state storage medium such as, but not limited to, a magnetic, optical, or other solid state, persistent, writeable and/or re-writeable storage medium). The control unit can optionally be connected to one or more remote devices via a network. The control unit (and components thereof) can generally perform any of the steps and functions described herein. Where the system is connected to a remote device, the remote device (or devices) can perform any of the steps or features described herein. The systems can optionally include one or more detectors (e.g., CCD, CMOS) used to capture images. The systems can also optionally include one or more light sources (e.g., LED-based, diode-based, lasers) for illuminating a sample, a substrate with features, analytes from a biological sample captured on a substrate, and various control and calibration media.

The systems can optionally include software instructions encoded and/or implemented in one or more of tangible storage media and hardware components such as application specific integrated circuits. The software instructions, when executed by a control unit (and in particular, an electronic processor) or an integrated circuit, can cause the control unit, integrated circuit, or other component executing the software instructions to perform any of the method steps or functions described herein.

In some cases, the systems described herein can detect (e.g., register an image) the biological sample on the array. Exemplary methods to detect the biological sample on an array are described in PCT Application No. 2020/061064 and/or U.S. patent application Ser. No. 16/951,854.

Prior to transferring analytes from the biological sample to the array of features on the substrate, the biological sample can be aligned with the array. Alignment of a biological sample and an array of features including capture probes can facilitate spatial analysis, which can be used to detect differences in analyte presence and/or level within different positions in the biological sample, for example, to generate a three-dimensional map of the analyte presence and/or level. Exemplary methods to generate a two- and/or three-dimensional map of the analyte presence and/or level are described in PCT Application No. 2020/053655 and spatial analysis methods are generally described in WO 2020/061108 and/or U.S. patent application Ser. No. 16/951,864.

In some cases, a map of analyte presence and/or level can be aligned to an image of a biological sample using one or more fiducial markers, e.g., objects placed in the field of view of an imaging system which appear in the image produced, as described in the Substrate Attributes Section, Control Slide for Imaging Section of WO 2020/123320, PCT Application No. 2020/061066, and/or U.S. patent application Ser. No. 16/951,843. Fiducial markers can be used as a point of reference or measurement scale for alignment (e.g., to align a sample and an array, to align two substrates, to determine a location of a sample or array on a substrate relative to a fiducial marker) and/or for quantitative measurements of sizes and/or distances.

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe is a conjugate (e.g., an oligonucleotide-antibody conjugate). In some embodiments, the capture probe includes a barcode (e.g., a spatial barcode and/or a unique molecular identifier (UMI)) and a capture domain.

FIG. 1 is a schematic diagram showing an example of a capture probe, as described herein. As shown, the capture probe 102 is optionally coupled to a feature 101 by a cleavage domain 103, such as a disulfide linker. The capture probe can include functional sequences that are useful for subsequent processing, such as functional sequence 104, which can include a sequencer specific flow cell attachment sequence, e.g., a P5 or P7 sequence, as well as functional sequence 106, which can include sequencing primer sequences, e.g., a R1 primer binding site, a R2 primer binding site. In some embodiments, sequence 104 is a P7 sequence and sequence 106 is a R2 primer binding site. A spatial barcode 105 can be included within the capture probe for use in barcoding the target analyte. In some embodiments, the capture probe comprises one or more additional functional sequences that can be located, for example between the spatial barcode 105 and the UMI sequence 106, between the UMI sequence 106 and the capture domain 107, or following the capture domain 107. The functional sequences can generally be selected for compatibility with any of a variety of different sequencing systems, e.g., Ion Torrent Proton or PGM, Illumina sequencing instruments, PacBio, Oxford Nanopore, etc., and the requirements thereof. In some embodiments, functional sequences can be selected for compatibility with non-commercialized sequencing systems. Examples of such sequencing systems and techniques, for which suitable functional sequences can be used, include (but are not limited to) Ion Torrent Proton or PGM sequencing, Illumina sequencing, PacBio SMRT sequencing, and Oxford Nanopore sequencing. Further, in some embodiments, functional sequences can be selected for compatibility with other sequencing systems, including non-commercialized sequencing systems.

In some embodiments, the spatial barcode 105, functional sequences 104 (e.g., flow cell attachment sequence) and 106 (e.g., sequencing primer sequences) can be common to all of the probes attached to a given feature. The spatial barcode can also include a capture domain 107 to facilitate capture of a target analyte.

As discussed above, each capture probe includes at least one capture domain. The "capture domain" can be an oligonucleotide, a polypeptide, a small molecule, or any combination thereof, that binds specifically to a desired analyte. In some embodiments, a capture domain can be used to capture or detect a desired analyte.

In some embodiments, the capture domain is a functional nucleic acid sequence configured to interact with one or more analytes, such as one or more different types of nucleic acids (e.g., RNA molecules and DNA molecules). In some embodiments, the functional nucleic acid sequence can include an N-mer sequence (e.g., a random N-mer sequence), which N-mer sequences are configured to interact with a plurality of DNA molecules. In some embodiments, the functional sequence can include a poly (T) sequence, which poly (T) sequences are configured to interact with messenger RNA (mRNA) molecules via the poly (A) tail of an mRNA transcript. In some embodiments, the functional nucleic acid sequence is the binding target of a protein (e.g., a transcription factor, a DNA binding protein, or a RNA binding protein), where the analyte of interest is a protein.

Capture probes can include ribonucleotides and/or deoxyribonucleotides as well as synthetic nucleotide residues that are capable of participating in Watson-Crick type or analogous base pair interactions. In some embodiments, the capture domain is capable of priming a reverse transcription reaction to generate cDNA that is complementary to the captured RNA molecules. In some embodiments, the capture domain of the capture probe can prime a DNA extension (polymerase) reaction to generate DNA that is complementary to the captured DNA molecules. In some embodiments, the capture domain can template a ligation reaction between the captured DNA molecules and a surface probe that is directly or indirectly immobilized on the substrate. In some embodiments, the capture domain can be ligated to one strand of the captured DNA molecules. For example, SplintR ligase along with RNA or DNA sequences (e.g., degenerate RNA) can be used to ligate a single-stranded DNA or RNA to the capture domain. In some embodiments, ligases with RNA-templated ligase activity, e.g., SplintR ligase, T4 RNA ligase 2 or KOD ligase, can be used to ligate a single-stranded DNA or RNA to the capture domain. In some embodiments, a capture domain includes a splint oligonucleotide. In some embodiments, a capture domain captures a splint oligonucleotide.

In some embodiments, the capture domain is located at the 3' end of the capture probe and includes a free 3' end that can be extended, e.g., by template dependent polymerization, to form an extended capture probe as described herein. In some embodiments, the capture domain includes a nucleotide sequence that is capable of hybridizing to nucleic acid, e.g., RNA or other analyte, present in the cells of the biological sample contacted with the array. In some embodiments, the capture domain can be selected or designed to bind selectively or specifically to a target nucleic acid. For example, the capture domain can be selected or designed to capture mRNA by way of hybridization to the mRNA poly (A) tail. Thus, in some embodiments, the capture domain includes a poly (T) DNA oligonucleotide, e.g., a series of consecutive deoxythymidine residues linked by phosphodiester bonds, which is capable of hybridizing to the poly (A) tail of mRNA. In some embodiments, the capture domain can include nucleotides that are functionally or structurally analogous to a poly (T) tail. For example, a poly (U) oligonucleotide or an oligonucleotide included of deoxythymidine analogues. In some embodiments, the capture domain includes at least 10, 11, 12, 13, 14, 15, 16, 17, 18, 19, or 20 nucleotides. In some embodiments, the capture domain includes at least 25, 30, or 35 nucleotides.

In some embodiments, a capture probe includes a capture domain having a sequence that is capable of binding to mRNA and/or genomic DNA. For example, the capture probe can include a capture domain that includes a nucleic acid sequence (e.g., a poly (T) sequence) capable of binding to a poly (A) tail of an mRNA and/or to a poly (A) homopolymeric sequence present in genomic DNA. In some embodiments, a homopolymeric sequence is added to an mRNA molecule or a genomic DNA molecule using a terminal transferase enzyme in order to produce an analyte that has a poly (A) or poly (T) sequence. For example, a poly (A) sequence can be added to an analyte (e.g., a fragment of genomic DNA) thereby making the analyte capable of capture by a poly (T) capture domain.

In some embodiments, random sequences, e.g., random hexamers or similar sequences, can be used to form all or a part of the capture domain. For example, random sequences can be used in conjunction with poly (T)(or poly (T) analogue) sequences. Thus, where a capture domain includes a poly (T)(or a "poly (T)-like") oligonucleotide, it can also include a random oligonucleotide sequence (e.g., "poly (T)-random sequence" probe). This can, for example, be located 5' or 3' of the poly (T) sequence, e.g., at the 3' end of the capture domain. The poly (T)-random sequence probe can facilitate the capture of the mRNA poly (A) tail. In some embodiments, the capture domain can be an entirely random sequence. In some embodiments, degenerate capture domains can be used.

In some embodiments, a pool of two or more capture probes form a mixture, where the capture domain of one or more capture probes includes a poly (T) sequence and the capture domain of one or more capture probes includes random sequences. In some embodiments, a pool of two or more capture probes form a mixture where the capture domain of one or more capture probes includes poly (T)-like sequence and the capture domain of one or more capture probes includes random sequences. In some embodiments, a pool of two or more capture probes form a mixture where the capture domain of one or more capture probes includes a poly (T)-random sequences and the capture domain of one or more capture probes includes random sequences. In some embodiments, probes with degenerate capture domains can be added to any of the preceding combinations listed herein. In some embodiments, probes with degenerate capture domains can be substituted for one of the probes in each of the pairs described herein.

The capture domain can be based on a particular gene sequence or particular motif sequence or common/conserved sequence, that it is designed to capture (i.e., a sequence-specific capture domain). Thus, in some embodiments, the capture domain is capable of binding selectively to a desired sub-type or subset of nucleic acid, for example a particular type of RNA, such as mRNA, IRNA, tRNA, SRP RNA, tmRNA, snRNA, snoRNA, SmY RNA, scaRNA, gRNA, RNase P, RNase MRP, TERC, SL RNA, aRNA, cis-NAT, crRNA, lncRNA, miRNA, piRNA, siRNA, shRNA, tasiRNA, rasiRNA, 7SK, eRNA, ncRNA or other types of RNA. In a non-limiting example, the capture domain can be capable of binding selectively to a desired subset of ribonucleic acids, for example, microbiome RNA, such as 16S rRNA.

In some embodiments, a capture domain includes an "anchor" or "anchoring sequence", which is a sequence of nucleotides that is designed to ensure that the capture domain hybridizes to the intended analyte. In some embodiments, an anchor sequence includes a sequence of nucleotides, including a 1-mer, 2-mer, 3-mer or longer sequence. In some embodiments, the short sequence is random. For example, a capture domain including a poly (T) sequence can be designed to capture an mRNA. In such embodiments, an anchoring sequence can include a random 3-mer (e.g., GGG) that helps ensure that the poly (T) capture domain hybridizes to an mRNA. In some embodiments, an anchoring sequence can be VN, N, or NN. Alternatively, the sequence can be designed using a specific sequence of nucleotides. In some embodiments, the anchor sequence is at the 3' end of the capture domain. In some embodiments, the anchor sequence is at the 5' end of the capture domain.

In some embodiments, capture domains of capture probes are blocked prior to contacting the biological sample with the array, and blocking probes are used when the nucleic acid in the biological sample is modified prior to its capture on the array. In some embodiments, the blocking probe is used to block or modify the free 3' end of the capture domain. In some embodiments, blocking probes can be hybridized to the capture probes to mask the free 3' end of the capture domain, e.g., hairpin probes, partially double stranded probes, or complementary sequences. In some embodiments, the free 3' end of the capture domain can be blocked by chemical modification, e.g., addition of an azidomethyl group as a chemically reversible capping moiety such that the capture probes do not include a free 3' end. Blocking or modifying the capture probes, particularly at the free 3' end of the capture domain, prior to contacting the biological sample with the array, prevents modification of the capture probes, e.g., prevents the addition of a poly (A) tail to the free 3' end of the capture probes.

Non-limiting examples of 3' modifications include dideoxy C-3' (3'-ddC), 3' inverted dT, 3' C3 spacer, 3'Amino, and 3' phosphorylation. In some embodiments, the nucleic acid in the biological sample can be modified such that it can be captured by the capture domain. For example, an adaptor sequence (including a binding domain capable of binding to the capture domain of the capture probe) can be added to the end of the nucleic acid, e.g., fragmented genomic DNA. In some embodiments, this is achieved by ligation of the adaptor sequence or extension of the nucleic acid. In some embodiments, an enzyme is used to incorporate additional nucleotides at the end of the nucleic acid sequence, e.g., a poly (A) tail. In some embodiments, the capture probes can be reversibly masked or modified such that the capture domain of the capture probe does not include a free 3' end. In some embodiments, the 3' end is removed, modified, or made inaccessible so that the capture domain is not susceptible to the process used to modify the nucleic acid of the biological sample, e.g., ligation or extension.

In some embodiments, the capture domain of the capture probe is modified to allow the removal of any modifications of the capture probe that occur during modification of the nucleic acid molecules of the biological sample. In some embodiments, the capture probes can include an additional sequence downstream of the capture domain, e.g., 3' to the capture domain, namely a blocking domain.

In some embodiments, the capture domain of the capture probe can be a non-nucleic acid domain. Examples of suitable capture domains that are not exclusively nucleic-acid based include, but are not limited to, proteins, peptides, aptamers, antigens, antibodies, and molecular analogs that mimic the functionality of any of the capture domains described herein.

Each capture probe can optionally include at least one cleavage domain. The cleavage domain represents the portion of the probe that is used to reversibly attach the probe to an array feature, as will be described further herein. Further, one or more segments or regions of the capture probe can optionally be released from the array feature by cleavage of the cleavage domain. As an example, spatial barcodes and/or universal molecular identifiers (UMIs) can be released by cleavage of the cleavage domain.

As used herein, an "analyte capture agent" (also referred to previously at times as a "cell labelling" agent") refers to an agent that interacts with an analyte (e.g., an analyte in a sample) and with a capture probe (e.g., a capture probe attached to a substrate) to identify the analyte. In some embodiments, the analyte capture agent includes an analyte binding moiety and a capture agent barcode domain.

Figure 2:
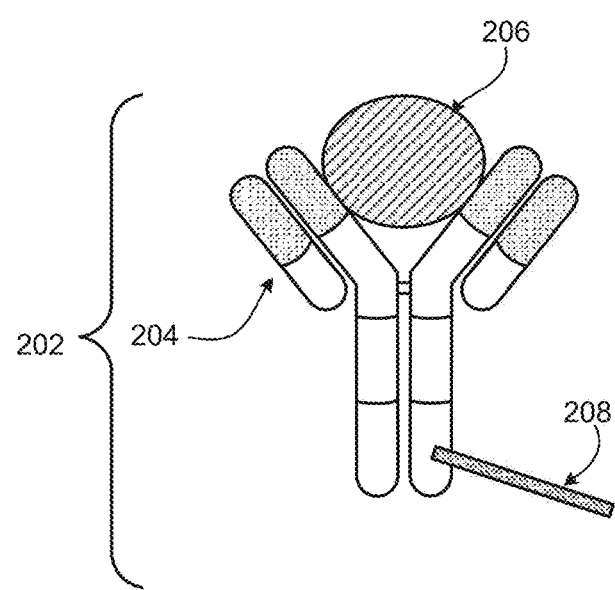
FIG. 2 is a schematic diagram of an exemplary analyte capture agent.

FIG. 2 is a schematic diagram of an exemplary analyte capture agent 202 comprised of an analyte binding moiety 204 and a capture agent barcode domain 208. An analyte binding moiety 204 is a molecule capable of binding to an analyte 206 and interacting with a spatially-barcoded capture probe. The analyte binding moiety can bind to the analyte 206 with high affinity and/or with high specificity. The analyte capture agent can include a capture agent barcode domain 208, a nucleotide sequence (e.g., an oligonucleotide), which can hybridize to at least a portion or an entirety of a capture domain of a capture probe. The analyte binding moiety 204 can include a polypeptide and/or an aptamer (e.g., an oligonucleotide or peptide molecule that binds to a specific target analyte). The analyte binding moiety 204 can include an antibody or antibody fragment (e.g., an antigen-binding fragment).

As used herein, the term "analyte binding moiety" refers to a molecule or moiety capable of binding to a macromolecular constituent (e.g., an analyte, e.g., a biological analyte). In some embodiments of any of the spatial profiling methods described herein, the analyte binding moiety of the analyte capture agent that binds to a biological analyte can include, but is not limited to, an antibody, or an epitope binding fragment thereof, a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The analyte binding moiety can bind to the macromolecular constituent (e.g., analyte) with high affinity and/or with high specificity. The analyte binding moiety can include a nucleotide sequence (e.g., an oligonucleotide), which can correspond to at least a portion or an entirety of the analyte binding moiety. The analyte binding moiety can include a polypeptide and/or an aptamer (e.g., a polypeptide and/or an aptamer that binds to a specific target molecule, e.g., an analyte). The analyte binding moiety can include an antibody or antibody fragment (e.g., an antigen-binding fragment) that binds to a specific analyte (e.g., a polypeptide).

In some embodiments, an analyte binding moiety of an analyte capture agent includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte capture agents comprising a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte capture agents are the same. In some embodiments in which the plurality of analytes includes a single species of analyte, the analyte binding moieties of the plurality of analyte capture agents are the different (e.g., members of the plurality of analyte capture agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In some embodiments, analyte capture agents are capable of binding to analytes present inside a cell. In some embodiments, analyte capture agents are capable of binding to cell surface analytes that can include, without limitation, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction. In some embodiments, the analyte capture agents are capable of binding to cell surface analytes that are post-translationally modified. In such embodiments, analyte capture agents can be specific for cell surface analytes based on a given state of posttranslational modification (e.g., phosphorylation, glycosylation, ubiquitination, nitrosylation, methylation, acetylation or lipidation), such that a cell surface analyte profile can include posttranslational modification information of one or more analytes.

In some embodiments, the analyte capture agent includes a capture agent barcode domain that is conjugated or otherwise attached to the analyte binding moiety. In some embodiments, the capture agent barcode domain is covalently-linked to the analyte binding moiety. In some embodiments, a capture agent barcode domain is a nucleic acid sequence. In some embodiments, a capture agent barcode domain includes an analyte binding moiety barcode and an analyte capture sequence.

As used herein, the term "analyte binding moiety barcode" refers to a barcode that is associated with or otherwise identifies the analyte binding moiety. In some embodiments, by identifying an analyte binding moiety and its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein. For example, an analyte capture agent that is specific to one type of analyte can have coupled thereto a first capture agent barcode domain (e.g., that includes a first analyte binding moiety barcode), while an analyte capture agent that is specific to a different analyte can have a different capture agent barcode domain (e.g., that includes a second barcode analyte binding moiety barcode) coupled thereto. In some aspects, such a capture agent barcode domain can include an analyte binding moiety barcode that permits identification of the analyte binding moiety to which the capture agent barcode domain is coupled. The selection of the capture agent barcode domain can allow significant diversity in terms of sequence, while also being readily attachable to most analyte binding moieties (e.g., antibodies or aptamers) as well as being readily detected, (e.g., using sequencing or array technologies).

In some embodiments, the capture agent barcode domain of an analyte capture agent includes an analyte capture sequence. As used herein, the term "analyte capture sequence" refers to a region or moiety configured to hybridize to, bind to, couple to, or otherwise interact with a capture domain of a capture probe. In some embodiments, an analyte capture sequence includes a nucleic acid sequence that is complementary to or substantially complementary to the capture domain of a capture probe such that the analyte capture sequence hybridizes to the capture domain of the capture probe. In some embodiments, an analyte capture sequence comprises a poly (A) nucleic acid sequence that hybridizes to a capture domain that comprises a poly (T) nucleic acid sequence. In some embodiments, an analyte capture sequence comprises a poly (T) nucleic acid sequence that hybridizes to a capture domain that comprises a poly (A) nucleic acid sequence. In some embodiments, an analyte capture sequence comprises a non-homopolymeric nucleic acid sequence that hybridizes to a capture domain that comprises a non-homopolymeric nucleic acid sequence that is complementary (or substantially complementary) to the non-homopolymeric nucleic acid sequence of the analyte capture region.

In some embodiments of any of the methods described herein that employ an analyte capture agent, the capture agent barcode domain can be directly coupled to the analyte binding moiety, or they can be attached to a bead, molecular lattice, e.g., a linear, globular, cross-slinked, or other polymer, or other framework that is attached or otherwise associated with the analyte binding moiety, which allows attachment of multiple capture agent barcode domains to a single analyte binding moiety. Attachment (coupling) of the capture agent barcode domains to the analyte binding moieties can be achieved through any of a variety of direct or indirect, covalent or non-covalent associations or attachments. For example, in the case of a capture agent barcode domain coupled to an analyte binding moiety that includes an antibody or antigen-binding fragment, such capture agent barcode domains can be covalently attached to a portion of the antibody or antigen-binding fragment using chemical conjugation techniques (e.g., Lightning-Link® antibody labelling kits available from Innova Biosciences). In some embodiments, a capture agent barcode domain can be coupled to an antibody or antigen-binding fragment using non-covalent attachment mechanisms (e.g., using biotinylated antibodies and oligonucleotides or beads that include one or more biotinylated linker(s), coupled to oligonucleotides with an avidin or streptavidin linker.) Antibody and oligonucleotide biotinylation techniques can be used, and are described for example in Fang et al., *Nucleic Acids Res*. (2003), 31 (2): 708-715, the entire contents of which are incorporated by reference herein. Likewise, protein and peptide biotinylation techniques have been developed and can be used, and are described for example in U.S. Pat. No. 6,265,552, the entire contents of which are incorporated by reference herein. Furthermore, click reaction chemistry such as a methyltetrazine-PEG5-NHS ester reaction, a TCO-PEG4-NHS ester reaction, or the like, can be used to couple capture agent barcode domains to analyte binding moieties. The reactive moiety on the analyte binding moiety can also include amine for targeting aldehydes, amine for targeting maleimide (e.g., free thiols), azide for targeting click chemistry compounds (e.g., alkynes), biotin for targeting streptavidin, phosphates for targeting EDC, which in turn targets active ester (e.g., $NH_2$). The reactive moiety on the analyte binding moiety can be a chemical compound or group that binds to the reactive moiety on the analyte binding moiety. Exemplary strategies to conjugate the analyte binding moiety to the capture agent barcode domain include the use of commercial kits (e.g., Solulink, Thunder link), conjugation of mild reduction of hinge region and maleimide labelling, stain-promoted click chemistry reaction to labeled amides (e.g., copper-free), and conjugation of periodate oxidation of sugar chain and amine conjugation. In the cases where the analyte binding moiety is an antibody, the antibody can be modified prior to or contemporaneously with conjugation of the oligonucleotide. For example, the antibody can be glycosylated with a chemical substrate-permissive mutant of β-1,4-galactosyltransferase, GalT (Y289L) and azide-bearing uridine diphosphate-N-acetylgalactosamine analog uridine diphosphate-GalNAz. The modified antibody can be conjugated to an oligonucleotide with a dibenzocyclooctyne-PEG4-NHS group. In some embodiments, certain steps (e.g., COOH activation (e.g., EDC) and homobifunctional cross linkers) can be avoided to prevent the analyte binding moieties from conjugating to themselves. In some embodiments of any of the spatial profiling methods described herein, the analyte capture agent (e.g., analyte binding moiety coupled to an oligonucleotide) can be delivered into the cell, e.g., by transfection (e.g., using transfectamine, cationic polymers, calcium phosphate or electroporation), by transduction (e.g., using a bacteriophage or recombinant viral vector), by mechanical delivery (e.g., magnetic beads), by lipid (e.g., 1,2-dioleoyl-sn-glycero-3-phosphocholine (DOPC)), or by transporter proteins. An analyte capture agent can be delivered into a cell using exosomes. For example, a first cell can be generated that releases exosomes comprising an analyte capture agent. An analyte capture agent can be attached to an exosome membrane. An analyte capture agent can be contained within the cytosol of an exosome. Released exosomes can be harvested and provided to a second cell, thereby delivering the analyte capture agent into the second cell. An analyte capture agent can be releasable from an exosome membrane before, during, or after delivery into a cell. In some embodiments, the cell is permeabilized to allow the analyte capture agent to couple with intracellular constituents (such as, without limitation, intracellular proteins, metabolites, and nuclear membrane proteins). Following intracellular delivery, analyte capture agents can be used to analyze intracellular constituents as described herein.

In some embodiments of any of the methods described herein, the capture agent barcode domain coupled to an analyte capture agent can include modifications that render it non-extendable by a polymerase. In some embodiments, when binding to a capture domain of a capture probe or nucleic acid in a sample for a primer extension reaction, the capture agent barcode domain can serve as a template, not a primer. When the capture agent barcode domain also includes a barcode (e.g., an analyte binding moiety barcode), such a design can increase the efficiency of molecular barcoding by increasing the affinity between the capture agent barcode domain and unbarcoded sample nucleic acids, and eliminate the potential formation of adaptor artifacts. In some embodiments, the capture agent barcode domain can include a random N-mer sequence that is capped with modifications that render it non-extendable by a polymerase. In some cases, the composition of the random N-mer sequence can be designed to maximize the binding efficiency to free, unbarcoded ssDNA molecules. The design can include a random sequence composition with a higher GC content, a partial random sequence with fixed G or C at specific positions, the use of guanosines, the use of locked nucleic acids, or any combination thereof.

A modification for blocking primer extension by a polymerase can be a carbon spacer group of different lengths or a dideoxynucleotide. In some embodiments, the modification can be an abasic site that has an apurine or apyrimidine structure, a base analog, or an analogue of a phosphate backbone, such as a backbone of N-(2-aminoethyl)-glycine linked by amide bonds, tetrahydrofuran, or 1', 2'-Dideoxyribose. The modification can also be a uracil base, 2'OMe modified RNA, C3-18 spacers (e.g., structures with 3-18 consecutive carbon atoms, such as C3 spacer), ethylene glycol multimer spacers (e.g., spacer 18 (hexa-ethyleneglycol spacer), biotin, di-deoxynucleotide triphosphate, ethylene glycol, amine, or phosphate.

In some embodiments of any of the spatial profiling methods described herein, the capture agent barcode domain coupled to the analyte binding moiety includes a cleavable domain. For example, after the analyte capture agent binds to an analyte (e.g., a cell surface analyte), the capture agent barcode domain can be cleaved and collected for downstream analysis according to the methods as described herein. In some embodiments, the cleavable domain of the capture agent barcode domain includes a U-excising element that allows the species to release from the bead. In some embodiments, the U-excising element can include a single-stranded DNA (ssDNA) sequence that contains at least one uracil. The species can be attached to a bead via the ssDNA sequence. The species can be released by a combination of uracil-DNA glycosylase (e.g., to remove the uracil) and an endonuclease (e.g., to induce an ssDNA break). If the endonuclease generates a 5' phosphate group from the cleavage, then additional enzyme treatment can be included in downstream processing to eliminate the phosphate group, e.g., prior to ligation of additional sequencing handle elements, e.g., Illumina full P5 sequence, partial P5 sequence, full R1 sequence, and/or partial R1 sequence.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety (ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte capture agent comprising an analyte binding moiety that binds to the cell surface protein and an analyte binding moiety barcode that identifies that analyte binding moiety, and the cell can be subjected to spatial analysis (e.g., any of the variety of spatial analysis methods described herein). For example, the analyte capture agent bound to the cell surface protein can be bound to a capture probe (e.g., a capture probe on an array), which capture probe includes a capture domain that interacts with an analyte capture sequence present on the capture agent barcode domain of the analyte capture agent. All or part of the capture agent barcode domain (including the analyte binding moiety barcode) can be copied with a polymerase using a 3' end of the capture domain as a priming site, generating an extended capture probe that includes the all or part of complementary sequence that corresponds to the capture probe (including a spatial barcode present on the capture probe) and a copy of the analyte binding moiety barcode.

In some embodiments of any of the spatial profiling methods described herein, the capture agent barcode domains released from the analyte capture agents can then be subjected to sequence analysis to identify which analyte capture agents were bound to analytes. Based upon the capture agent barcode domains that are associated with a feature (e.g., a feature at a particular location) on a spatial array and the presence of the analyte binding moiety barcode sequence, an analyte profile can be created for a biological sample. Profiles of individual cells or populations of cells can be compared to profiles from other cells, e.g., 'normal' cells, to identify variations in analytes, which can provide diagnostically relevant information. In some embodiments, these profiles can be useful in the diagnosis of a variety of disorders that are characterized by variations in cell surface receptors, such as cancer and other disorders.

Figure 3:
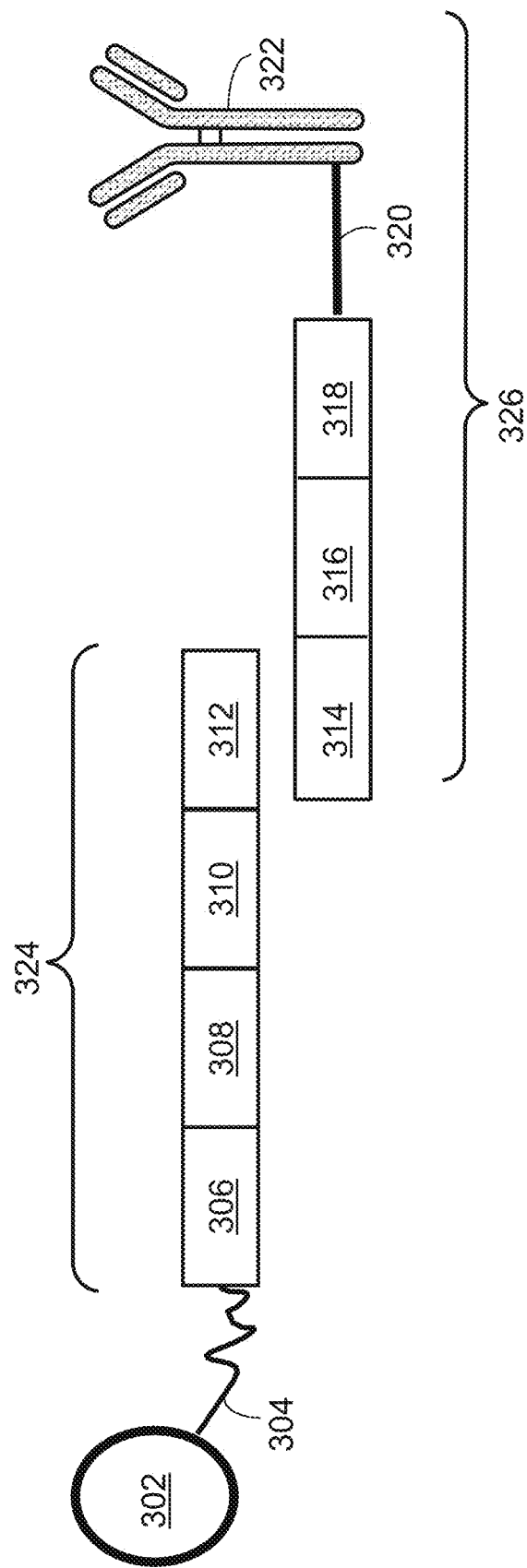
FIG. 3 is a schematic diagram depicting an exemplary interaction between a feature-immobilized capture probe 324 and an analyte capture agent 326.

FIG. 3 is a schematic diagram depicting an exemplary interaction between a feature-immobilized capture probe 324 and an analyte capture agent 326. The feature-immobilized capture probe 324 can include a spatial barcode 308 as well as one or more functional sequences 306 and 310, as described elsewhere herein. The capture probe can also include a capture domain 312 that is capable of binding to an analyte capture agent 326. The analyte capture agent 326 can include a functional sequence 318, capture agent barcode domain 316, and an analyte capture sequence 314 that is capable of binding to the capture domain 312 of the capture probe 324. The analyte capture agent can also include a linker 320 that allows the capture agent barcode domain 316 to couple to the analyte binding moiety 322.

Example 1—Methods of Determining Efficiency of a Template Switch Oligonucleotide (TSO) Reaction and Tissue Processing In some workflows of spatial analysis, a template switching reaction is used to further extend a capture probe which has been already extended by a reverse transcriptase using a captured analyte as a template, thereby providing a mechanism for subsequence second strand synthesis of the cDNA. The action of a reverse transcriptase with terminal transferase activity can result in the inclusion of a homopolynucleotide sequence at the 3' end of the extended capture probe (e.g., a poly (C) sequence). A template switching oligonucleotide (TSO), including a hybridization region and a template region, can be hybridized to the homopolynucleotide sequence and used as a primer for second-strand synthesis. The efficiency of the hybridization of the TSO and the extension of the capture probe with the sequence complementary to the template region (e.g., the TSO reaction) can affect the overall makeup of the spatial analysis library. In addition, the efficiency of the TSO reaction can be used to optimize various experimental conditions, such as sample prep (e.g., decrosslinking of FFPE samples, permeabilization conditions, and choice of RT enzymes). Accordingly, provided herein are methods of determining the efficiency of the TSO reaction.

Provided herein are methods that include the following steps: (a) contacting a biological sample with a plurality of capture probes, wherein a capture probe of the plurality comprises a capture domain, wherein the capture domain is positioned at a 3' end of the capture probe; (b) releasing one or more target analyte(s) from the biological sample, wherein a target analyte released from the biological sample is specifically bound by the capture domain of the capture probe; (c) extending the 3' end of the capture probe using the bound target analyte as a template; (d) adding to the 3' end of the capture probe a first homopolynucleotide sequence, thereby generating a first strand; (e) generating a second strand that comprises in a 5' to a 3' direction: a conjugated first agent, a second homopolynucleotide sequence, and a sequence corresponding to a portion of the bound target analyte, wherein the first homopolynucleotide sequence hybridizes to the second homopolynucleotide sequence, and the step of generating the second strand comprises the use of a partially-double stranded template switching oligonucleotide sensor comprising: (i) a first oligonucleotide comprising a conjugated second agent at its 3' end, (ii) a second oligonucleotide comprising the conjugated first agent at its 5' end and the second homopolynucleotide sequence at its 3' end, wherein the second oligonucleotide has a single-stranded overhang at its 3' end comprising the second homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (f) measuring presence or absence of fluorescence signal upon release of the first oligonucleotide from the second oligonucleotide by extension of a 3' end of the first strand using the second oligonucleotide as a template.

In some embodiments of any of the methods described herein, the first homopolynucleotide sequence and/or second homopolynucleotide sequence, can include about 3 to about 20 contiguous homopolynucleotides (e.g., 3, 4, 5, 6, 7, 8, 9, 10, 11, 12, 13, 14, 15, 16, 17, 18, 19, or 20 contiguous homopolynucleotides, or about 3 to about 18 contiguous homopolynucleotides, about 3 to about 16 contiguous homopolynucleotides, about 3 to about 14 contiguous homopolynucleotides, about 3 to about 12 contiguous homopolynucleotides, about 3 to about 10 contiguous homopolynucleotides, about 3 to about 8 contiguous homopolynucleotides, about 3 to about 6 contiguous homopolynucleotides, about 6 to about 20 contiguous homopolynucleotides, about 6 to about 18 contiguous homopolynucleotides, about 6 to about 16 contiguous homopolynucleotides, about 6 to about 14 contiguous homopolynucleotides, about 6 to about 12 contiguous homopolynucleotides, about 6 to about 10 contiguous homopolynucleotides, about 6 to about 8 contiguous homopolynucleotides, about 8 to about 20 contiguous homopolynucleotides, about 8 to about 18 contiguous homopolynucleotides, about 8 to about 16 contiguous homopolynucleotides, about 8 to about 14 contiguous homopolynucleotides, about 8 to about 12 contiguous homopolynucleotides, about 8 to about 10 contiguous homopolynucleotides, about 10 to about 20 contiguous homopolynucleotides, about 10 to about 18 contiguous homopolynucleotides, about 10 to about 16 contiguous homopolynucleotides, about 10 to about 14 contiguous homopolynucleotides, about 10 to about 12 contiguous homopolynucleotides, about 12 to about 20 contiguous homopolynucleotides, about 12 to about 18 contiguous homopolynucleotides, about 12 to about 16 contiguous homopolynucleotides, about 12 to about 14 contiguous homopolynucleotides, about 14 to about 20 contiguous homopolynucleotides, about 14 to about 18 contiguous homopolynucleotides, about 14 to about 16 contiguous homopolynucleotides, about 16 to about 20 contiguous homopolynucleotides, about 16 to about 18 contiguous homopolynucleotides, or about 18 to about 20 contiguous homopolynucleotides).

In some embodiments of any of the methods described herein, a homopolynucleotide sequence may be a poly (A), poly (T), poly (U), poly (G), or poly (C) sequence. For instance, the first homopolynucleotide sequence is a poly (C) sequence and the second homopolynucleotide sequence is a poly (G) sequence; the first homopolynucleotide sequence is a poly (G) sequence and the second homopolynucleotide sequence is a poly (C) sequence; the first homopolynucleotide sequence is a poly (A) sequence and the second homopolynucleotide sequence is a poly (T) sequence; the first homopolynucleotide sequence is a poly (T) sequence and the second homopolynucleotide sequence is a poly (A) sequence; the first homopolynucleotide sequence is a poly (U) and the second homopolynucleotide sequence is a poly (A) sequence; or the first homopolynucleotide sequence is a poly (A) and the second homopolynucleotide sequence is a poly (U) sequence.

In some embodiments of any of the methods described herein, the target analyte can be a nucleic acid. A target nucleic acid can be DNA (e.g., genomic DNA, methylated DNA, specific methylated DNA sequences, fragmented DNA, mitochondrial DNA, in situ synthesized PCR products, and RNA/DNA hybrids). A target nucleic acid can be RNA, e.g., coding and non-coding RNAs. In some embodiments, an RNA analyte can include messenger RNA (mRNA), ribosomal RNA (rRNA), transfer RNA (tRNA), microRNA (miRNA), and viral RNA. The RNA analyte can be a transcript (e.g. present in a tissue section). The RNA analyte can be small (e.g., less than 200 nucleotides in length) or large (e.g., RNA greater than 200 nucleotides in length). Small RNAs include 5.8S ribosomal RNA (rRNA), 5S rRNA, transfer RNA (tRNA), micro RNA (miRNA), small interfering RNA (siRNA), small nucleolar RNA (snoRNAs), piwi-interacting RNA (piRNA), tRNA-derived small RNA (tsRNA), and small rDNA-derived RNA (srRNA). The RNA analyte can be double-stranded RNA or single-stranded RNA. The RNA analyte can be circular RNA. The RNA analyte can be a bacterial rRNA (e.g., 16s rRNA or 23s rRNA). The RNA analyte can be a viral RNA, for example from a RNA virus (i.e., a retrovirus, a coronavirus, a rhinovirus, a filovirus, etc.)

In some embodiments of any of the methods described herein, wherein when the target analyte is a nucleic acid, the target nucleic acid can include at least 1, at least 2, at least 3, at least 4, at least 5, at least 6, at least 7, at least 8, at least 9, or at least 10 disease-causing mutations (e.g., cancer-causing mutations). In some embodiments, the target nucleic acid can include a polymorphism (e.g., a single nucleotide polymorphism), a gene amplification, a chromosomal translocation, a chromosomal insertion or deletion or a splicing splice variant.

In some embodiments of any of the methods described herein, the plurality of capture probes are affixed (i.e., attached) to an array. In some embodiments of any of the methods described herein, the array comprises a slide (e.g., a flat solid surface, a well of a microtiter plate, or a glass or plastic microscope slide) or a bead.

In some embodiments, the use of a fluorescence, or Förster, resonance energy transfer (FRET), mechanism is used to detect and/or determine the efficiency of the TSO reaction in captured analyte processing. Briefly, the overall reaction of a first fluorophore excitation, transfer and emission of energy to a second fluorophore is the basis of FRET. FRET is a mechanism based in the energy transfer between two light-sensitive molecules (Cheng, Ping-Chin (2006). "The Contrast Formation in Optical Microscopy". In Pawley, James B. (ed.). Handbook of Biological Confocal Microscopy (3rd ed.). New York, NY: Springer. pp. 162-206). For example, a donor fluorophore, in its electronic excited state, can transfer energy to an acceptor fluorophore through nonradiative intermolecular dipole-dipole coupling (Sekar RB and Periasamy A, "Fluorescence resonance energy transfer (FRET) microscopy imaging of live cell protein localizations" J Cell Biol. 2003; 160 (5): 629-633) as long as the absorption spectrum of the acceptor fluorophore is within the excitation spectrum of the donor fluorophore. The efficiency of this energy transfer is inversely proportional to the sixth power of the distance between donor and acceptor, making FRET extremely sensitive to small changes in distance (Harris, DC., "Applications of Spectrophotometry" Quantitative Chemical Analysis (8th ed., 2010). New York: W. H. Freeman and Co. pp. 419-44; Förster T. "Delocalized excitation and excitation transfer" New York (1965): Academic Press Part III Action of light and organic crystals pp. 93-137). Measurements of FRET efficiency can be used to determine if two fluorophores are within a certain distance of each other (Zheng, Jie (2006). "Spectroscopy-Based Quantitative Fluorescence Resonance Energy Transfer Analysis". In Stockand, James D.; Shapiro, Mark S. (eds.). Ion Channels: Methods and Protocols. Methods in Molecular Biology. 337. Totowa, NJ: Humana Press. pp. 65-77; and Shrestha, Dilip et al., "Understanding FRET as a research tool for cellular studies" International journal of molecular sciences vol. 16,4 6718-56. 25 Mar. 2015), each of which is incorporated by reference herein in its entirety. A FRET mechanism, in its energy transfer, can result in the acceptor fluorophore emitting light. Conversely, if a donor fluorophore is removed from proximity to the acceptor fluorophore the energy transfer can cease thereby light emission from the acceptor fluorophore is greatly minimized or effectively not detectable over background fluorescence.

Alternatively, fluorescence from an acceptor fluorophore can be "quenched" by a quenching molecule in proximity to the acceptor fluorophore. Typically, a fluorophore is promoted to an excited state at a particular wavelength wherein the excited fluorophore returns to the ground state after emitting light. However, in the presence of a quencher molecule, either another fluorophore or chemical molecule, the excited fluorophore can transfer its energy to the quencher molecule without light being emitted. As such, a quencher FRET mechanism depends on the emission spectrum of the donor fluorophore effectively overlapping with the absorption spectrum of the quencher or acceptor molecule. A fluorescence quencher typically returns to the ground state through a nonradiactive decay pathway without light emission, for example by emitting heat instead of light, ergo a FRET mechanism where light is not emitted. Importantly, when the quencher molecule is not in proximity to the donor fluorophore the quench is relieved, and the donor fluorophore emits light for detection. In some embodiments, a quencher molecule useful in methods described herein has minimal or no native fluorescence. Such a quencher molecule, oftentimes called a "dark" quencher (i.e., has no inherent fluorescence), contributes limited fluorescence to background fluorescence, thereby allowing for increased sensitivity in detecting and/or determining the efficiency of the TSO reaction.

The release of fluorescence (or presence of fluorescence) due to the release/absence of a fluorescence quencher can be captured by fluorescence microscopy imaging (Sekar RB and Periasamy A, "Fluorescence resonance energy transfer (FRET) microscopy imaging of live cell protein localizations" J Cell Biol. 2003; 160 (5): 629-633). More specifically, in some instances where the first conjugated agent is a fluorophore and the second conjugated agent is a fluorescence quencher, the release of the quencher indicates that the TSO reaction has occurred. Alternatively, in some instances the absence or ceasing of fluorescence indicates that the TSO reaction has occurred. For example, where the first conjugated agent is a donor fluorophore and the second conjugated agent is an acceptor fluorophore; or the first conjugated agent is an acceptor fluorophore and the second conjugated agent is a donor fluorophore.

In embodiments described herein, the fluorescent molecules and/or quencher molecules are attached to the same DNA molecule such that a FRET mechanism is enabled. In some embodiments of any of the methods described herein, the first conjugated agent is a fluorophore and the second conjugated agent is a fluorescence quencher. Alternatively, the first conjugated agent may be a fluorescence quencher and the second conjugated agent is a fluorophore. In some examples provided herein, the fluorophore comprises a xanthene moiety. In some examples, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DIA (4-Di-16-ASP), DiD (DilC18 (5)), DIDS, Dil (DilC18 (3)), DiO (DiOC18 (3)), DiR (DilC18 (7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARF®-1 (low pH), Sodium Green™, SpectrumAqua®, SpectrumGreen® #1, SpectrumGreen® #2, SpectrumOrange®, SpectrumRed®, SYTOR 11, SYTOR 13, SYTOR 17, SYTOR 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66 W, YFP (Yellow Fluorescent Protein), YOYOR-1/YO-PROR-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, 9, QSY® 21, QSYR 35, IRDye® QC-1, Iowa black® FQ, Iowa black® RQ, acrylamide, a dabcyl group, and any derivatives thereof). It will be understood that the selection of a fluorescence quencher will be related to the fluorophore to be quenched.

In some examples, the fluorescence quencher is a black hole quencher (BHQ). In some examples, the quencher is Blackberry Quencher (BBQ650), Deep Dark Quencher 1 and 2 (DDQ-1, DDQ-2), DABCYL, ECLIPSE, IOWA BLACK FQ, IOWA BLACK RQ, IR Dye-QC1, BHQ-0, BHQ-1, BHQ-2, BHQ-3, QSY-7, or QSY-21. Suitable fluorophores for the noted quenchers are listed below in Table 1.

TABLE 1

Exemplary quencher/fluorophore pairs

| Examples of Quencher | Absorption Range/ Absorption maximum | Examples of Fluorophores |
|---|---|---|
| Black Hole BHQ 1 | 480-600 nm/534 nm | Alexa Fluor 488-A, Oregon Green 488-X, Fluorescein, Rhodamine Green-X, Alexa Fluor 532, Cy3, BODIPY 558/568, Alexa Fluor 546, TAMRA |
| Black Hole BHQ 2 | 480-680 nm/579 nm | Cy3, BODIPY 558/568, Alexa Fluor 546, TAMRA, ROX, Alexa Fluor 594, Texas Red-X, BODIPY 630/650-X, Cy5, Alexa Fluor 647 |
| Black Hole BHQ 3 | 570-740 nm/672 nm | Texas Red-X, BODIPY 630/650-X, Cy5, Alexa Fluor 647, IRDye 680, IRDye 700DX, Cy5.5 |
| Deep Dark Quencher DDQ I | 380-500 nm/440 nm | FAM, ATTO 532, Rhodamine 6G, Yakima Yellow |
| Deep Dark Quencher DDQ II | 550-570 nm/630 nm | Cy3, Cy5, ROX, Dragonfly Orange |
| DABCYL (dark quencher) | 425-530 nm/474 nm | Coumarin, Alexa Fluor 488-A, Oregon Green 488-X, Fluorescein |
| ECLIPSE (dark quencher) | 390-625 nm/522 nm | Marina Blue, Acridine, Edans, Coumarin, BODIPY 493/503, Cy2, BODIPY FL-X |
| IOWA BLACK FQ (dark quencher) | 420-620 nm/531 nm | Fluorescein, Cy2, FITC, CY3, Rhodamine, Texas Red, Alexa Fluor 430/488/500/514/532/546/555/568/594/610/633/635 |
| IOWA BLACK RQ (dark quencher) | 500-700 nm/656 nm | Texas Red, Cy5 |
| IR Dye-QC1 | 500-800 nm/737 nm | Fluorescein, Rhodamine Green-X, Alexa Fluor 532, Cy3, BODIPY 558/568, Alexa Fluor 546, TAMRA, ROX, Alexa Fluor 594, Texas Red-X, BODIPY 630/650-X, Cy5, Alexa Fluor 647, IRDye 680, IRDye 700DX, Cy5.5, Alexa Fluor 750, IRDye 800CW, IRDye 800 |
| Carboxylic acid, succinimidyl ester (QSY-7) | 500-600 nm/575 nm | Fluorescein, Rhodamine Green-X, Alexa Fluor 532, Cy3, BODIPY 558/568, Alexa Fluor 546, TAMRA, ROX |
| Carboxylic acid, succinimidyl ester (QSY-21) | 575-720 nm/675 nm | BODIPY 558/568, Alexa Fluor 546, TAMRA, ROX, Alexa Fluor 594, Texas Red-X, BODIPY 630/650-X, Cy5, Alexa Fluor 647 |
| Blackberry Quencher (BBQ650) | 550-750 nm/650 nm | Alexa Fluor 660, Cy5.5, Alexa Fluor 680, Alexa Fluor 700, Alexa Fluor 750 |

ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

In some examples, the fluorophore is FAM, TET, HEX/JOE, Cy3, Cy5, TAMRA, ROX, LC Red, fluorescein or other dyes that emit in the green-pink range, Texas Red or other dyes that emit in the near IR and IR range.

In some embodiments, the fluorescence quencher is, for example, one of the following: TAMRA, Black Berry Quencher-650, ECLIPSE™, DyQ® 1, DyQ® 2, DyQ® 3, DyQ® 4, DyQ® 425, DyQ® 505, DyQ® 660, DyQ® 661, DyQ® 700, Black Hole Quencher®-0, Black Hole Quencher®-1, Black Hole Quencher®-2, Black Hole Quencher®-3, Black Hole Quencher®-10, QSY® 7, QSYR Thus, the presence of a fluorescent quencher in close proximity to a matched fluorophore will greatly diminish fluorescence of the fluorophore, such that when the quencher is released fluorescence will increase.

In some embodiments of any of the methods described herein, the first conjugated agent is a donor fluorophore and the second conjugated agent is an acceptor fluorophore. Alternatively, the first conjugated agent is an acceptor fluorophore and the second conjugated agent is a donor fluorophore. The acceptor fluorophore and the donor fluorophore can function in a fluorescence (or Förster) resonance energy transfer (FRET)-system.

In some embodiments of any of the methods described herein, the presence of fluorescence indicates the efficiency of the template switching reaction. More particularly, if the reaction occurs then fluorescence is emitted. Thus, fluorescence intensity is an indirect measure of how often the template switching reaction occurs, the efficiency of the reaction.

In some embodiments of any of the methods described herein, fluorescence intensity can be measured using fluorescence microscopy (e.g., confocal microscopy, total internal reflection fluorescence microscopy). In some embodiments, the method of fluorescence microscopy can be total internal reflection fluorescence microscopy (e.g., TIRF). When using TIRF, a substrate that allows substantial transmission of light (e.g., a glass or quartz slide) is generally selected. Typically, TIRF allows for the detection of one or more labels within a range of more than 1 nm and less than 400 nm (e.g., 1 to 2, 1 to 3, 1 to 4, 1 to 5, 2 to 3, 2 to 4, 2 to 5, 3 to 4, 3 to 5, 4 to 5, 5 to 10, 5 to 15, 5 to 20, 5 to 25, 5 to 30, 5 to 35, 5 to 40, 5 to 45, 5 to 50, 10 to 15, 10 to 20, 10 to 25, 10 to 30, 10 to 35, 10 to 40, 10 to 45, 10 to 50, 15 to 20, 15 to 25, 15 to 30, 15 to 35, 15 to 40, 15 to 45, 15 to 50, 20 to 25, 20 to 30, 20 to 35, 20 to 40, 20 to 45, 20 to 50, 25 to 30, 25 to 35, 25 to 40, 25 to 45, 25 to 50, 30 to 35, 30 to 40, 30 to 45, 30 to 50, 35 to 40, 35 to 45, 35 to 50, 40 to 45, 40 to 50, 45 to 50, 50 to 60, 50 to 70, 50 to 80, 50 to 90, 50 to 100, 60 to 70, 60 to 80, 60 to 90, 60 to 100, 70 to 80, 70 to 90, 70 to 100, 80 to 90, 80 to 100, 90 to 100, 100 to 150, 100 to 200, 100 to 250, 100 to 300, 100 to 350, 100 to 400, 150 to 200, 150 to 250, 150 to 300, 150 to 350, 150 to 400, 200 to 250, 200 to 300, 200 to 350, 200 to 400, 250 to 300, 250 to 350, 250 to 400, 300 to 350, 300 to 400, 350 to 400 nm) away from the substrate (see, e.g., Mattheyses, A. L., Simon, S. M., & Rappoport, J. Z. (2010). Imaging with total internal reflection fluorescence microscopy for the cell biologist. Journal of cell science, 123 (21), 3621-3628., incorporated herein by reference in its entirety). This can allow, for example, selective detection of the template switching reaction when in proximity to the substrate, potentially reducing any background signal.

In some embodiments of any of the methods described herein, the biological sample can be a tissue sample or tissue section. For instance, in some embodiments, the biological sample is a fixed tissue, or a formalin-fixed paraffin-embedded (FFPE) tissue sample, or is a fresh, frozen tissue section.

In some embodiments of any of the methods described herein, the biological sample can be stained or imaged by techniques known in the art. Some embodiments of these methods can further include staining and/or imaging the biological sample. In some embodiments, the staining can include the use of an optical label as described herein, including, but not limited to, fluorescent, radioactive, chemiluminescent, calorimetric, or colorimetric detectable labels. In some embodiments, staining can include the use of a fluorescent antibody directed to a target analyte (e.g., cell surface or intracellular proteins) in the biological sample. In some embodiments, staining can include the use an immunohistochemistry stain directed to a target analyte (e.g., cell surface or intracellular proteins) in the biological sample. In some embodiments, staining can include the use of a chemical stain, such as hematoxylin and eosin (H&E) or periodic acid-schiff (PAS). In some embodiments, significant time (e.g., days, months, or years) can elapse between staining and/or imaging the biological sample and performing any of the methods described herein.

In some embodiments of any of the methods described herein, the capture probe further includes a spatial barcode positioned 5' to the capture domain. In these embodiments, the methods can further include determining (i) all or a portion of the sequence of the captured target analyte, or a complement thereof, and (ii) all or a portion of the spatial barcode, or a complement thereof. In some embodiments, using the determined sequences of (i) and (ii) to identify the location of the target analyte in the biological sample.

In some embodiments of any of the methods described herein, the method as described above includes an additional step, which includes comparing the measured presence or absence of fluorescence in step (f) to a control value. In some examples, the control value is fluorescence measured in a control method comprising performance of steps (a) through (f), except the control method differs in condition(s) and/or reagent(s) used to perform one or more of steps (a) through (f). Briefly the control method may differ at any step of the method described above (i.e., 1) tissue preparation, which may include fixing, staining, and/or imaging, 2) tissue permeabilization, 3) reverse transcription, 4) PCR, or any other step that may be included). For instance, the control method utilizes different condition(s) to perform step (a). In another instance, the control method utilizes different condition(s) and/or reagent(s) to perform step (b). In some examples, step (b), which includes releasing one or more target analyte(s) from the biological sample, wherein a target analyte released from the biological sample is specifically bound by the capture domain of the capture probe, includes permeabilizing the biological sample. Therefore, in some instances, the control method utilizes different condition(s) and/or reagent(s) for permeabilizing the biological sample. In some examples, the control method utilizes different condition(s) and/or reagent(s) to perform step (c). In some instances, the control method utilizes different enzyme(s) to perform step (c). In some examples, the control method utilizes different conditions and/or reagent(s) to perform step (d). In other examples, the control method utilizes different enzyme(s) to perform step (d). In some embodiments, the control method utilizes different condition(s) and/or reagent(s) to perform step (e).

Figure 4:
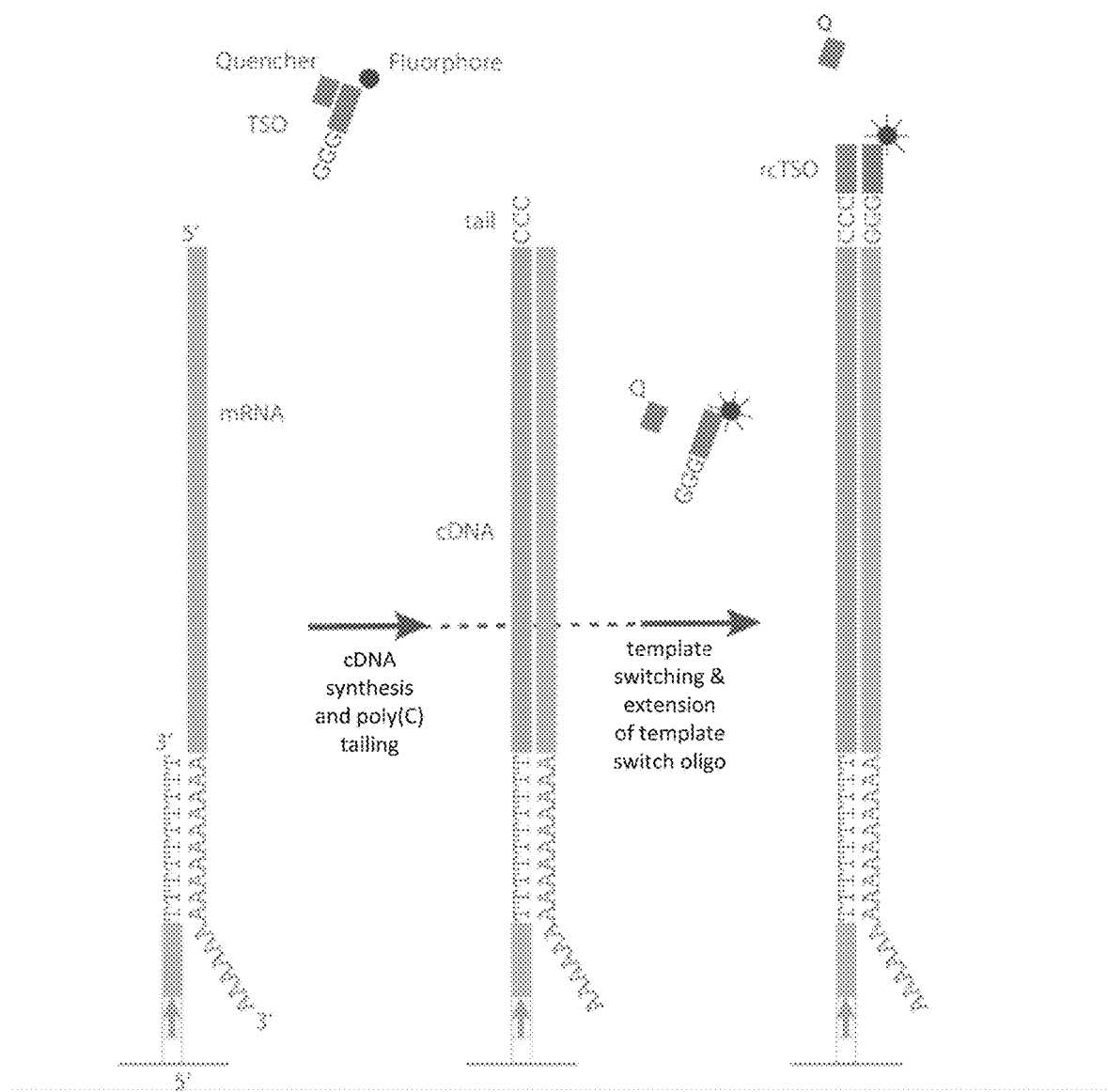
FIG. 4 shows a schematic illustrating exemplary steps for determining the success of C tailing of a cDNA created by extension of the capture probe using a target analyte as a template, the 2) success of attachment of the template switching oligonucleotide to the C tailed cDNA after the poly (A) tail (AAAAAAAAAAAAAAAA; SEQ ID NO: 1) of a target analyte (e.g., mRNA) has been captured by the capture domain (TTTTTTTTTT; SEQ ID NO: 2) of the capture probe.

An exemplary embodiment is shown in FIG. 4. FIG. 4 shows a workflow schematic illustrating exemplary, non-limiting, non-exhaustive steps for detecting target analytes (e.g., mRNA) released from the biological sample and the TSO hybridization to the C tailed cDNA. Messenger RNA is captured by capture probes comprising a capture domain (e.g., a poly (T)) sequence printed on a glass slide. Post analyte capture, cDNA is generated using the captured mRNA as a template. A homopolynucleotide sequence is added to the cDNA strand (e.g. a poly (C) tail). A partially double-stranded, labeled, template switching oligonucleotide sensor is hybridized to the homopolynucleotide sequence. The partially-double stranded template switching oligonucleotide sensor comprises: (i) a first oligonucleotide comprising a conjugated second agent at its 3' end, (ii) a second oligonucleotide comprising the conjugated first agent at its 5' end and the second homopolynucleotide sequence at its 3' end, wherein the second oligonucleotide has a single-stranded overhang at its 3' end comprising the second homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore. If the template switching oligonucleotide sensor anneals to the poly (C) tail, the first agent and the second agent are unable to conjugate to one another, thereby fluorescence is emitted. Fluorescent intensity can, for example, be measured using standard fluorescent microscopy or a slide scanner that is capable of fluorescence detection.

Also provided herein are methods including the following steps: (a) contacting a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) contacting a biological sample with a plurality of capture probes, wherein a capture probe of the plurality comprises a capture domain, wherein the capture domain that binds specifically to the analyte capture sequence, wherein the capture domain is positioned at a 3' end of the capture probe; (c) releasing one or more target analyte(s) from the biological sample, wherein the analyte capture sequence of the analyte capture agent selective bound to the target analyte released from the biological sample is specifically bound by the capture domain of the capture probe; (d) extending the 3' end of the capture probe using the analyte binding moiety barcode as a template; (e) adding to the 3' end of the capture probe a first homopolynucleotide sequence, thereby generating a first strand; (f) generating a second strand that comprises in a 5' to a 3' direction: a conjugated first agent, a second homopolynucleotide sequence, and a sequence corresponding to the analyte binding moiety barcode, wherein the first homopolynucleotide sequence hybridizes to the second homopolynucleotide sequence, and the step of generating the second strand comprises the use of a partially-double stranded template switching oligonucleotide sensor comprising: (i) a first oligonucleotide comprising a conjugated second agent at its 3' end, (ii) a second oligonucleotide comprising the conjugated first agent at its 5' end and the second homopolynucleotide sequence at its 3' end, wherein the second oligonucleotide has a single-stranded overhang at its 3' end comprising the second homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (g) measuring presence or absence of fluorescence upon release of the first oligonucleotide from the second oligonucleotide by extension of a 3' end of the first strand using the second oligonucleotide as a template.

In some embodiments of any of the methods described herein, the first homopolynucleotide sequence and/or second homopolynucleotide sequence, can include about 3 to about 20 contiguous homopolynucleotides (e.g., 3, 4, 5, 6, 7, 8, 9, 10, 11, 12, 13, 14, 15, 16, 17, 18, 19, or 20 contiguous homopolynucleotides, or about 3 to about 18 contiguous homopolynucleotides, about 3 to about 16 contiguous homopolynucleotides, about 3 to about 14 contiguous homopolynucleotides, about 3 to about 12 contiguous homopolynucleotides, about 3 to about 10 contiguous homopolynucleotides, about 3 to about 8 contiguous homopolynucleotides, about 3 to about 6 contiguous homopolynucleotides, about 6 to about 20 contiguous homopolynucleotides, about 6 to about 18 contiguous homopolynucleotides, about 6 to about 16 contiguous homopolynucleotides, about 6 to about 14 contiguous homopolynucleotides, about 6 to about 12 contiguous homopolynucleotides, about 6 to about 10 contiguous homopolynucleotides, about 6 to about 8 contiguous homopolynucleotides, about 8 to about 20 contiguous homopolynucleotides, about 8 to about 18 contiguous homopolynucleotides, about 8 to about 16 contiguous homopolynucleotides, about 8 to about 14 contiguous homopolynucleotides, about 8 to about 12 contiguous homopolynucleotides, about 8 to about 10 contiguous homopolynucleotides, about 10 to about 20 contiguous homopolynucleotides, about 10 to about 18 contiguous homopolynucleotides, about 10 to about 16 contiguous homopolynucleotides, about 10 to about 14 contiguous homopolynucleotides, about 10 to about 12 contiguous homopolynucleotides, about 12 to about 20 contiguous homopolynucleotides, about 12 to about 18 contiguous homopolynucleotides, about 12 to about 16 contiguous homopolynucleotides, about 12 to about 14 contiguous homopolynucleotides, about 14 to about 20 contiguous homopolynucleotides, about 14 to about 18 contiguous homopolynucleotides, about 14 to about 16 contiguous homopolynucleotides, about 16 to about 20 contiguous homopolynucleotides, about 16 to about 18 contiguous homopolynucleotides, or about 18 to about 20 contiguous homopolynucleotides).

In some embodiments of any of the methods described herein, a homopolynucleotide sequence may be a poly (A), poly (T), poly (U), poly (G), or poly (C) sequence. For instance, the first homopolynucleotide sequence is a poly (C) sequence and the second homopolynucleotide sequence is a poly (G) sequence; the first homopolynucleotide sequence is a poly (G) sequence and the second homopolynucleotide sequence is a poly (C) sequence; the first homopolynucleotide sequence is a poly (A) sequence and the second homopolynucleotide sequence is a poly (T) sequence; the first homopolynucleotide sequence is a poly (T) sequence and the second homopolynucleotide sequence is a poly (A) sequence; the first homopolynucleotide sequence is a poly (U) and the second homopolynucleotide sequence is a poly (A) sequence; or the first homopolynucleotide sequence is a poly (A) and the second homopolynucleotide sequence is a poly (U) sequence.

In some embodiments of any of the methods described herein, the target analyte may be a protein (e.g., an intracellular protein or an extracellular protein). Therefore, in some embodiments, the analyte binding moiety is an antibody or an antigen-binding fragment thereof.

In some embodiments of any of the methods described herein, the plurality of capture probes are affixed (i.e., attached) to an array. In some embodiments of any of the methods described herein, the array comprises a slide (e.g., a flat solid surface, a well of a microtiter plate, or a glass or plastic microscope slide) or a bead.

In some embodiments of any of the methods described herein, the capture probe further includes a spatial barcode positioned 5' to the capture domain. In these embodiments, the methods can further include determining (i) all or a portion of the sequence of the captured target analyte, or a complement thereof, and (ii) all or a portion of the spatial barcode, or a complement thereof. In some embodiments, using the determined sequences of (i) and (ii) to identify the location of the target analyte in the biological sample.

In some embodiments of any of the methods described herein, the first conjugated agent is a fluorophore and the second conjugated agent is a fluorescence quencher. Alternatively, the first conjugated agent may be a quencher and the second conjugated agent is a fluorophore. In some examples provided herein, the fluorophore comprises a xanthene moiety. In some examples, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

In some examples, the fluorophore can be any of the exemplary fluorophores described herein. In some examples, the fluorescence quencher can be any of the exemplary fluorescence quenchers described herein. Non-limiting examples of pairs of fluorophores and fluorophore quenchers are described herein.

In some embodiments of any of the methods described herein, the first conjugated agent is a donor fluorophore and the second conjugated agent is an acceptor fluorophore. Alternatively, the first conjugated agent is an acceptor fluorophore and the second conjugated agent is a donor fluorophore. The acceptor fluorophore and the donor fluorophore function in a fluorescence resonance energy transfer (FRET)-system. FRET is a mechanism describing energy transfer between two light-sensitive molecules (fluorophores).

In some embodiments of any of the methods described herein, fluorescence indicates the efficiency of the template switching reaction. More particularly, if the reaction occurs then fluorescence is emitted. Thus, fluorescence intensity is an indirect measure of how often the template switching reaction occurs.

In some embodiments of any of the methods described herein, fluorescence intensity can be measured using fluorescence microscopy (e.g., confocal microscopy, total internal reflection fluorescence microscopy). In some embodiments, the method of fluorescence microscopy can be total internal reflection fluorescence microscopy (e.g., TIRF). When using TIRF, a substrate that allows substantial transmission of light (e.g., a glass or quartz slide) is generally selected. Typically, TIRF allows for the detection of one or more labels within a range of more than 1 nm and less than 400 nm (e.g., 1 to 2, 1 to 3, 1 to 4, 1 to 5, 2 to 3, 2 to 4, 2 to 5, 3 to 4, 3 to 5, 4 to 5, 5 to 10, 5 to 15, 5 to 20, 5 to 25, 5 to 30, 5 to 35, 5 to 40, 5 to 45, 5 to 50, 10 to 15, 10 to 20, 10 to 25, 10 to 30, 10 to 35, 10 to 40, 10 to 45, 10 to 50, 15 to 20, 15 to 25, 15 to 30, 15 to 35, 15 to 40, 15 to 45, 15 to 50, 20 to 25, 20 to 30, 20 to 35, 20 to 40, 20 to 45, 20 to 50, 25 to 30, 25 to 35, 25 to 40, 25 to 45, 25 to 50, 30 to 35, 30 to 40, 30 to 45, 30 to 50, 35 to 40, 35 to 45, 35 to 50, 40 to 45, 40 to 50, 45 to 50, 50 to 60, 50 to 70, 50 to 80, 50 to 90, 50 to 100, 60 to 70, 60 to 80, 60 to 90, 60 to 100, 70 to 80, 70 to 90, 70 to 100, 80 to 90, 80 to 100, 90 to 100, 100 to 150, 100 to 200, 100 to 250, 100 to 300, 100 to 350, 100 to 400, 150 to 200, 150 to 250, 150 to 300, 150 to 350, 150 to 400, 200 to 250, 200 to 300, 200 to 350, 200 to 400, 250 to 300, 250 to 350, 250 to 400, 300 to 350, 300 to 400, 350 to 400 nm) away from the substrate. This can allow, for example, selective detection of the template switching reaction when in proximity to the substrate, potentially reducing any background signal.

In some embodiments of any of the methods described herein, the biological sample can be a tissue sample or tissue section. For instance, in some embodiments, the biological sample is a fixed tissue, or a formalin-fixed paraffin-embedded (FFPE) tissue sample, or is a fresh, frozen tissue section.

In some embodiments of any of the methods described herein, the biological sample can be stained or imaged by techniques known in the art. Some embodiments of these method can further include staining and/or imaging the biological sample. In some embodiments, the staining can include the use of an optical label as described herein, including, but not limited to, fluorescent, radioactive, chemiluminescent, calorimetric, or colorimetric detectable labels.

In some embodiments, staining can include the use of a fluorescent antibody directed to a target analyte (e.g., cell surface or intracellular proteins) in the biological sample. In some embodiments, staining can include the use an immunohistochemistry stain directed to a target analyte (e.g., cell surface or intracellular proteins) in the biological sample. In some embodiments, staining can include the use of a chemical stain, such as hematoxylin and eosin (H&E) or periodic acid-schiff (PAS). In some embodiments, significant time (e.g., days, months, or years) can elapse between staining and/or imaging the biological sample and performing any of the methods described herein.

In some embodiments of any of the methods described herein, the method as described above includes an additional step, which includes comparing the measured presence or absence of fluorescence in step (g) to a control value. In some examples, the control value is fluorescence measured in a control method comprising performance of steps (a) through (g), except the control method differs in condition(s) and/or reagent(s) used to perform one or more of steps (a) through (g). Briefly the control method may differ at any step of the method described above (e.g., 1) tissue preparation, which may include fixing, staining, and/or imaging, 2) tissue permeabilization, 3) reverse transcription, 4) PCR, or any other step that may be included). For instance, the control method utilizes different condition(s) to perform step (a). In another instance, the control method utilizes different condition(s) and/or reagent(s) to perform step (b). In some examples, step (b), which includes releasing one or more target analyte(s) from the biological sample, wherein a target analyte released from the biological sample is specifically bound by the capture domain of the capture probe, includes permeabilizing the biological sample. Therefore, in some instances, the control method utilizes different condition(s) and/or reagent(s) for permeabilizing the biological sample. In some examples, the control method utilizes different condition(s) and/or reagent(s) to perform step (c). In some instances, the control method utilizes different enzyme(s) to perform step (c). In some examples, the control method utilizes different conditions and/or reagent(s) to perform step (d). In other examples, the control method utilizes different enzyme(s) to perform step (d). In some embodiments, the control method utilizes different condition(s) and/or reagent(s) to perform step (e). In some embodiments, the control method utilizes different condition(s) and/or reagent(s) to perform step (f).

Example 2—Reaction Mixtures and Kits

Also provided herein are reaction mixtures that include reagents necessary to carry out any of the methods described herein. For example, provided herein are reaction mixtures that include: (a) a plurality of capture probes, wherein a capture probe of the plurality comprises a capture domain, wherein the capture domain is positioned at a 3' end of the capture probe; and (b) a partially-double stranded template switching oligonucleotide sensor comprising: (i) a first oligonucleotide comprising a conjugated first agent at its 3' end, (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Also provided herein are reaction mixtures that include: (a) a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) a plurality of capture probes, wherein a capture probe of the plurality comprises a capture domain, wherein the capture domain binds specifically to the analyte capture sequence and the capture domain is positioned at a 3' end of the capture probe; and (c) a partially-double stranded template switching oligonucleotide sensor comprising: (i) a first oligonucleotide comprising a conjugated first agent at its 3' end, (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Also provided herein are kits which include the reaction mixtures described above that include reagents necessary to carry out any of the methods described herein. For instance, a kit including: (a) a plurality of capture probes, wherein a capture probe of the plurality comprises a capture domain, wherein the capture domain is positioned at a 3' end of the capture probe; and (b) a partially-double stranded template switching oligonucleotide sensor comprising: (i) a first oligonucleotide comprising a conjugated first agent at its 3' end, (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Also provided herein are kits that include: (a) a plurality of analyte capture agents to the biological sample, wherein an analyte capture agent of the plurality of analyte capture agents comprises an analyte binding moiety barcode, an analyte capture sequence, and an analyte binding moiety that binds specifically to the target analyte; (b) a plurality of capture probes, wherein a capture probe of the plurality comprises a capture domain, wherein the capture domain binds specifically to the analyte capture sequence and the capture domain is positioned at a 3' end of the capture probe; and (c) a partially-double stranded template switching oligonucleotide sensor comprising: (i) a first oligonucleotide comprising a conjugated first agent at its 3' end, (ii) a second oligonucleotide comprising a conjugated second agent at its 5' end and a homopolynucleotide sequence at its 3' end, wherein the second oligonucleotide has a single-stranded overhang at its 3' end comprising the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

In some embodiments of any of the reaction mixtures or kits described herein, the plurality of capture probes are affixed (i.e., attached) to an array. In some embodiments of any of the methods described herein, the array comprises a slide (e.g., a flat solid surface, a well of a microtiter plate, or a glass or plastic microscope slide) or a bead (e.g., bead arrays can be created, for example by impregnating beads with different concentrations of fluorescent dye, or through barcoding technology, such as those, developed by Illumina, Inc.).

In some embodiments of any of the reaction mixtures or kits described herein, the capture probe further includes a spatial barcode positioned 5' to the capture domain.

In some embodiments of any of the reaction mixtures or kits described herein, the first conjugated agent is a fluorophore and the second conjugated agent is a fluorescence quencher. Alternatively, the first conjugated agent may be a quencher and the second conjugated agent is a fluorophore. In some examples provided herein, the fluorophore comprises a xanthene moiety. In some examples, the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

In some examples, the fluorophore can be any of the exemplary fluorophores described herein. In some examples, the fluorescence quencher can be any of the exemplary fluorescence quenchers described herein. Non-limiting examples of pairs of fluorophores and fluorophore quenchers are described herein.

In some embodiments of any of the reaction mixtures or kits described herein, the first conjugated agent is a donor fluorophore and the second conjugated agent is an acceptor fluorophore. Alternatively, the first conjugated agent is an acceptor fluorophore and the second conjugated agent is a donor fluorophore.

In some embodiments of any of the reaction mixtures or kits described herein, the first homopolynucleotide sequence and/or second homopolynucleotide sequence, can include about 3 to about 20 contiguous homopolynucleotides (e.g., 3, 4, 5, 6, 7, 8, 9, 10, 11, 12, 13, 14, 15, 16, 17, 18, 19, or 20 contiguous homopolynucleotides, or about 3 to about 18 contiguous homopolynucleotides, about 3 to about 16 contiguous homopolynucleotides, about 3 to about 14 contiguous homopolynucleotides, about 3 to about 12 contiguous homopolynucleotides, about 3 to about 10 contiguous homopolynucleotides, about 3 to about 8 contiguous homopolynucleotides, about 3 to about 6 contiguous homopolynucleotides, about 6 to about 20 contiguous homopolynucleotides, about 6 to about 18 contiguous homopolynucleotides, about 6 to about 16 contiguous homopolynucleotides, about 6 to about 14 contiguous homopolynucleotides, about 6 to about 12 contiguous homopolynucleotides, about 6 to about 10 contiguous homopolynucleotides, about 6 to about 8 contiguous homopolynucleotides, about 8 to about 20 contiguous homopolynucleotides, about 8 to about 18 contiguous homopolynucleotides, about 8 to about 16 contiguous homopolynucleotides, about 8 to about 14 contiguous homopolynucleotides, about 8 to about 12 contiguous homopolynucleotides, about 8 to about 10 contiguous homopolynucleotides, about 10 to about 20 contiguous homopolynucleotides, about 10 to about 18 contiguous homopolynucleotides, about 10 to about 16 contiguous homopolynucleotides, about 10 to about 14 contiguous homopolynucleotides, about 10 to about 12 contiguous homopolynucleotides, about 12 to about 20 contiguous homopolynucleotides, about 12 to about 18 contiguous homopolynucleotides, about 12 to about 16 contiguous homopolynucleotides, about 12 to about 14 contiguous homopolynucleotides, about 14 to about 20 contiguous homopolynucleotides, about 14 to about 18 contiguous homopolynucleotides, about 14 to about 16 contiguous homopolynucleotides, about 16 to about 20 contiguous homopolynucleotides, about 16 to about 18 contiguous homopolynucleotides, or about 18 to about 20 contiguous homopolynucleotides).

In some embodiments of any of the reaction mixtures or kits described herein, a homopolynucleotide sequence may be a poly (A), poly (T), poly (U), poly (G), or poly (C) sequence. For instance, the first homopolynucleotide sequence is a poly (C) sequence and the second homopolynucleotide sequence is a poly (G) sequence; the first homopolynucleotide sequence is a poly (G) sequence and the second homopolynucleotide sequence is a poly (C) sequence; the first homopolynucleotide sequence is a poly (A) sequence and the second homopolynucleotide sequence is a poly (T) sequence; the first homopolynucleotide sequence is a poly (T) sequence and the second homopolynucleotide sequence is a poly (A) sequence; the first homopolynucleotide sequence is a poly (U) and the second homopolynucleotide sequence is a poly (A) sequence; or the first homopolynucleotide sequence is a poly (A) and the second homopolynucleotide sequence is a poly (U) sequence.

In some embodiments of any of the reaction mixtures or kits described herein, the reaction mixture or kit may additionally include a terminal deoxynucleotidyl transferase, a reverse transcriptase, and/or a DNA polymerase.

Figure 5A:
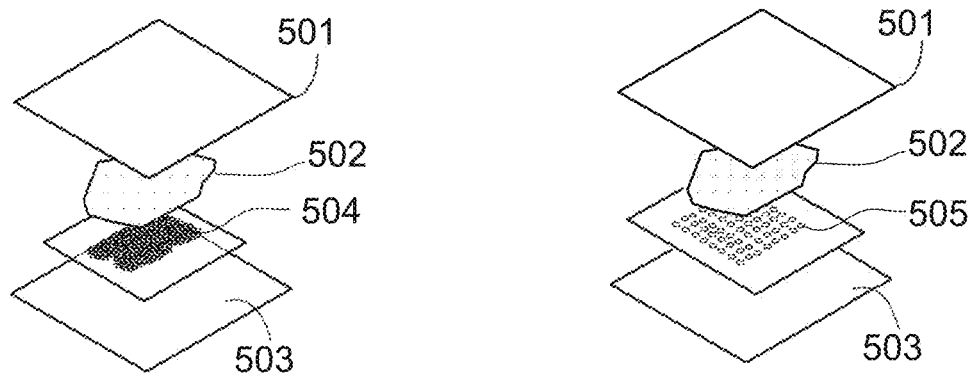
FIGS. 5A and 5B are schematics illustrating expanded FIG. 5A and side views FIG. 5B of an electrophoretic transfer system configured to direct transcript analytes toward a spatially-barcoded capture probe array.
Figure 5B:
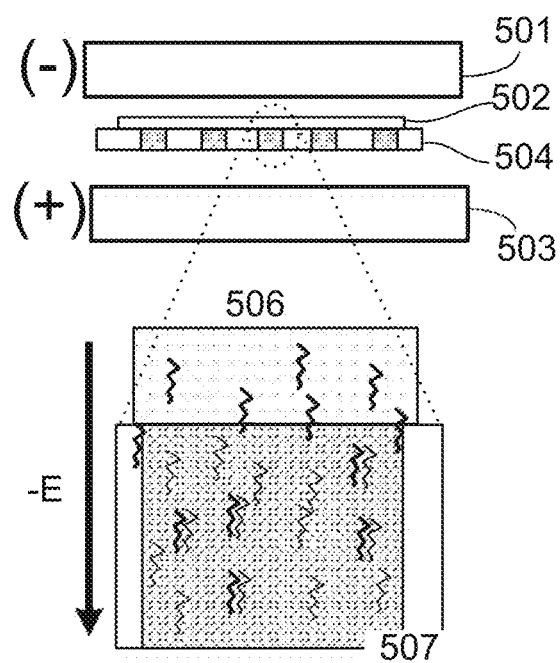

Schematics illustrating an electrophoretic transfer system configured to direct nucleic acid analytes (e.g., mRNA transcripts) toward a spatially-barcoded capture probe array are shown in FIG. 5A and FIG. 5B. In this exemplary configuration of an electrophoretic system, a sample 502 is sandwiched between the cathode 501 and the spatially-barcoded capture probe array 504, 505, and the spatially-barcoded capture probe array 504, 505 is sandwiched between the sample 502 and the anode 503, such that the sample 502, 506 is in contact with the spatially-barcoded capture probes 507. When an electric field is applied to the electrophoretic transfer system, negatively charged nucleic acid analytes 506 will be pulled toward the positively charged anode 503 and into the spatially-barcoded array 504, 505 containing the spatially-barcoded capture probes 507. The spatially-barcoded capture probes 507 interact with the nucleic acid analytes (e.g., mRNA transcripts hybridize to spatially-barcoded nucleic acid capture probes forming DNA/RNA hybrids) 506, making the analyte capture more efficient. The electrophoretic system set-up may change depending on the target analyte. For example, proteins may be positive, negative, neutral, or polar depending on the protein as well as other factors (e.g., isoelectric point, solubility, etc.). The skilled practitioner has the knowledge and experience to arrange the electrophoretic transfer system to facilitate capture of a particular target analyte.

In some of the methods described herein, an analyte in a biological sample (e.g., in a cell or tissue section) can be transported (e.g., passively or actively) to a capture probe (e.g., a capture probe affixed to a substrate (e.g., a substrate or bead)).

For example, analytes can be transported to a capture probe (e.g., an immobilized capture probe) using an electric field (e.g., using electrophoresis), pressure, fluid flow, gravity, temperature, and/or a magnetic field. For example, analytes can be transported through, e.g., a gel (e.g., hydrogel), a fluid, or a permeabilized cell, to a capture probe (e.g., an immobilized capture probe) using a pressure gradient, a chemical concentration gradient, a temperature gradient, and/or a pH gradient. For example, analytes can be transported through a gel (e.g., hydrogel), a fluid, or a permeabilized cell, to a capture probe (e.g., an immobilized capture probe).

In some examples, an electrophoretic field can be applied to analytes to facilitate migration of analytes towards a capture probe. In some examples, a sample containing analytes contacts a substrate having capture probes fixed on the substrate (e.g., a slide, cover slip, or bead), and an electric current is applied to promote the directional migration of charged analytes towards capture probes on a substrate. An electrophoresis assembly (e.g., an electrophoretic chamber), where a biological sample is in contact with a cathode and capture probes (e.g., capture probes fixed on a substrate), and where the capture probes are in contact with the biological sample and an anode, can be used to apply the current.

In some embodiments, methods utilizing an active capture method can employ a conductive substrate (e.g., any of the conductive substrates described herein). In some embodiments, a conductive substrate includes paper, a hydrogel film, or a glass slide having a conductive coating. In some embodiments, a conductive substrate (e.g., any of the conductive substrates described herein) includes one or more capture probes.

FIGS. 6A and 6B show different example analytical workflows of active capture methods using an electric field (e.g., using electrophoresis). In some examples, a biological sample 602 (e.g., a tissue sample) can be in contact with a first substrate 604. In some embodiments, first substrate 604 can have one or more coatings (e.g., any of the conductive substrates described herein) on its surface. Non-limiting examples of coatings include, nucleic acids (e.g., RNA) and conductive oxides (e.g., indium tin oxide). In some embodiments, first substrate 604 can have a functionalization chemistry on its surface. In the examples shown in FIGS. 6A and 6B, first substrate 604 is overlaid with a first coating 606, and first coating 606 (e.g., a conductive coating) is further overlaid with a second coating 608. In some embodiments, first coating 606 is an indium tin oxide (ITO) coating. In some embodiments, second coating 608 is a lawn of capture probes (e.g., any of the capture probes described herein). In some embodiments, a substrate can include an ITO coating. In some embodiments, a substrate can include capture probes or capture probes attached to features on the substrate.

Biological sample 602 and second coating 608 (e.g., a lawn of capture probes) can be in contact with a permeabilization solution 610. Non-limiting examples of permeabilization solutions include, enzymes (e.g., proteinase K, pepsin, and collagenase), detergents (e.g., sodium dodecyl sulfate (SDS), polyethylene glycol tert-octylphenyl ether, polysorbate 80, and polysorbate 20), ribonuclease inhibitors, buffers optimized for electrophoresis, buffers optimized for permeabilization, buffers optimized for hybridization, or combinations thereof. Permeabilization reagents can also include but are not limited to a dried permeabilization reagent, a permeabilization buffer, a buffer without a permeabilization reagent, a permeabilization gel, and a permeabilization solution. In some examples, biological samples (e.g., tissue samples) can be permeabilized first and then be subjected to electrophoresis.

FIG. 6A shows an example analytical workflow including a first step 612 in which biological sample 602 can be permeabilized prior to subjecting the sample 602 to electrophoresis. Any of the permeabilization methods disclosed herein can be used during first step 612. Biological sample 602 includes an analyte 614. In some embodiments, the analyte 614 is a negatively charged analyte. First substrate 604 can include a capture probe 616 that is fixed or attached to the first substrate 604 or attached to features (e.g., beads) 618 on the substrate. In some embodiments, capture probe 616 can include any of the capture probes disclosed herein. In some embodiments, first substrate 602 does not include features and instead, capture probes 616 are directly attached to the substrate surface. In some embodiments, the capture probe 616 is positively charged.

In step 620, after permeabilization of biological sample 602 concludes, the sample 602 can be subjected to electrophoresis. During electrophoresis, the biological sample 602 is subjected to an electric field that can be generated by sandwiching biological sample 602 between the first substrate 604 and a second substrate 622, connecting each substrate to a cathode and an anode, respectively, and running an electric current through the substrates. The application of the electric field "-E" causes the analyte 604 (e.g., a negatively charged analyte) to migrate towards the substrate 604 and capture probe 616 (e.g., a positively charged capture probe) in the direction of the arrows shown in FIG. 6A. In some embodiments, the analyte 614 migrates towards the capture probe 616 for a distance "h." In some embodiments, the analyte 614 migrates towards a capture probe 616 through one or more permeabilized cells within the permeabilized biological sample (e.g., from an original location in a permeabilized cell to a final location in or close to the capture probe 616). Second substrate 622 can include the first coating 606 (e.g., a conductive coating), thereby allowing electric field "-E" to be generated.

In some embodiments, the analyte 614 is a protein or a nucleic acid. In some embodiments, the analyte 614 is a negatively charged protein or a nucleic acid. In some embodiments, the analyte 614 is a positively charged protein or a nucleic acid. In some embodiments, the capture probe 616 is a protein or a nucleic acid. In some embodiments, the capture probe 616 is a positively charged protein or a nucleic acid. In some embodiments, the capture probe 616 is a negatively charged protein or a nucleic acid. In some embodiments, the analyte 614 is a negatively charged transcript. In some embodiments, the analyte 614 is a poly (A) transcript. In some embodiments, the capture probe 616 is attached to a feature in a feature array. In some embodiments, permeabilization reagent 610 can be in contact with sample 602, first substrate 604 second substrate 622, or any combination thereof.

FIG. 6B shows an example analytical workflow in which biological sample 602 can be permeabilized and subjected to electrophoresis simultaneously. In some embodiments, simultaneous permeabilization and electrophoresis of biological sample 602 can decrease the total duration of the analytical workflow translating into a more efficient workflow.

In some embodiments, the permeabilization reaction is conducted at a chilled temperature (e.g., about 4° C.). In some embodiments, conducting the permeabilization reaction at a chilled temperature controls the enzyme activity of the permeabilization reaction. In some embodiments, the permeabilization reaction is conducted at a chilled temperature in order to prevent drift and/or diffusion of the analyte 614 from an original location (e.g., a location in a cell of the biological sample 602) until a user is ready to initiate the permeabilization reaction. In some embodiments, the permeabilization reaction is conducted at a warm temperature (e.g., a temperature ranging from about 15° C. to about 36° C. or more) in order to initiate and/or increase the rate of the permeabilization reaction. In some embodiments, once electrophoresis is applied and/or the permeabilization reaction is heated, the permeabilization reaction allows for analyte migration from an original location (e.g., a location in a cell of the biological sample 602) to the capture probe 616 anchored to the first substrate 604.

Example 3—Detecting Capture of an Analyte

In some embodiments, methods of detecting capture of an analyte and/or detection of migration of an analyte can include use of one or more labels. For example, methods of detecting capture of an analyte and/or detection of migration of an analyte can include use of one label. In some embodiments, a label can be a detectable agent that binds specifically to a complex of an analyte from a biological sample and a capture probe. As another example, methods of detecting capture of an analyte and/or detection of migration of an analyte can include use of a first label and a second label.

In some embodiments, a label (e.g., detectable agent, a first label or a second label) can include a nucleic acid stain. In some cases, a nucleic acid stain can form a complex with the major groove of double stranded DNA, RNA, or an RNA-DNA duplex (e.g., hydroxystilbamidine). In some cases, a nucleic acid stain can form a complex with the minor groove of double stranded DNA, RNA, or an RNA-DNA duplex (e.g., DAPI, acridine orange). In some cases, a nucleic acid stain can be an intercalating dye capable of binding between sequential base pairs of double stranded DNA or RNA (e.g., berberine, ethidium bromide, proflavine, daunomycin, doxorubicin, propidium iodide, 4',6-diamidino-2-phenylindole, oxazole yellow, SYBR Green, or thalidomide). In some cases, the nucleic acid stain can form a complex to the phosphor backbone of double- or single-stranded DNA or RNA.

In some embodiments, a label (e.g., detectable agent, a first label or a second label) can include a fluorophore (e.g., 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DiA (4-Di-16-ASP), DiD (DilC18 (5)), DIDS, Dil (DilC18 (3)), DiO (DiOC18 (3)), DiR (DilC18 (7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARF®-1 (high pH), SNARF®-1 (low pH), Sodium Green™, SpectrumAqua®, SpectrumGreen® #1, SpectrumGreen® #2, SpectrumOrange®, SpectrumRed®, SYTOR 11, SYTOR 13, SYTOR 17, SYTOR 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66 W, YFP (Yellow Fluorescent Protein), YOYOR-1/YO-PROR-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), or Dy 750 (NHS Ester), and any derivatives thereof). In some embodiments, a fluorophore can be a quantum dot (e.g., Qdot).

In some embodiments, a label (e.g., detectable agent, a first label or a second label) can include a fluorescence quencher (e.g., TAMRA, Black Berry Quencher-650, ECLIPSE™, DyQ® 1, DyQ® 2, DyQ® 3, DyQ® 4, DyQ® 425, DyQ® 505, DyQ® 660, DyQ® 661, DyQ® 700, Black Hole Quencher®-0, Black Hole Quencher®-1, Black Hole Quencher®-2, Black Hole Quencher®-3, Black Hole Quencher®-10, QSYR 7, QSYR 9, QSY® 21, QSY® 35, IRDye® QC-1, Iowa black® FQ, Iowa black® RQ, acrylamide, a dabcyl group, and any derivatives thereof). It will be understood that the selection of a fluorescence quencher will be related to the fluorophore to be quenched. In some methods that include two labels, a first label can be a fluorophore capable of stimulated fluorescent emission of a first wavelength. In some such embodiments, a second label can be a molecule capable of absorbing the fluorescent emission of a first wavelength and dissipating the energy as heat. That is, in some embodiments, when a first label and a second label are in proximity, the second label can absorb the first stimulated fluorescent emission and enter an energetic state and then dissipate the energy as heat. In some cases, the reduced fluorescent emission of the first wavelength can be detected to determine proximity of the two labels. In some embodiments, the increased heat can then be detected to determine proximity of the two labels (see, e.g., Le Reste, L., Hohlbein, J., Gryte, K., & Kapanidis, A. N. (2012). Characterization of dark quencher chromophores as nonfluorescent acceptors for single-molecule FRET. Biophysical journal, 102 (11), 2658-2668., incorporated herein by reference in its entirety).

In some embodiments, a label (e.g., a detectable agent, a first label or a second label) can include an antibody or antigen-binding fragment thereof. For example, an antibody can bind to DNA-DNA duplexes, RNA-RNA duplexes, DNA-RNA duplexes, or a combination thereof (e.g., via a major or minor groove) to form a complex. In some embodiments, an antibody or antigen-binding fragment thereof can bind to a duplexed nucleic acid having a certain sequence (e.g., a particular gene sequence or another sequence of interest) to form a complex. In some embodiments, an antibody or antigen-binding fragment thereof can be detectible. In some embodiments, an antibody or antigen-binding fragment thereof can be conjugated, directly or indirectly, to a fluorophore (e.g., any of the fluorophores described herein, such as Alexa Fluor, Coumarin, Cy3, Cy5, fluorescein, cyanine, tetramethylrhodamine, Texas Red, allophycocyanin, R-Phycoerythrin, or derivatives of any thereof). In some embodiments, an antibody or antigen-binding fragment thereof can be conjugated, directly or indirectly, to a fluorescence quencher. In some embodiments, an antibody or antigen-binding fragment thereof can be conjugated, directly or indirectly, to a quantum dot (e.g., Qdot). In some embodiments, an antibody or antigen-binding fragment thereof label can be detectible by addition of another reagent (e.g., another antibody or antigen-binding fragment thereof).

In some embodiments, a label (e.g., a detectable agent, a first label or a second label) can include an aptamer (e.g., an oligonucleotide or peptide aptamer). In some embodiments, an aptamer can bind to DNA-DNA duplexes, RNA-RNA duplexes, DNA-RNA duplexes, or a combination thereof (e.g., via a major or minor groove) to form a complex. In some embodiments, an aptamer can bind to a duplexed nucleic acid having a certain sequence (e.g., a particular gene sequence or another sequence of interest) to form a complex. In some embodiments, the aptamer can be an oligonucleotide (e.g., DNA, RNA). In some embodiments, the aptamer can be a peptide (e.g., amino acid chain). In some embodiments, the peptide can be shorter than about fifty amino acids (e.g., 10 amino acids, 20 amino acids, 30 amino acids, 40 amino acids, 50 amino acids). In some embodiments, an aptamer can be detectible. In some embodiments, an aptamer can be conjugated, directly or indirectly, to a fluorophore. In some embodiments, an aptamer can be conjugated, directly or indirectly, to a fluorescence quencher. In some embodiments, an aptamer can be conjugated, directly or indirectly, to a quantum dot (e.g., Qdot)(see, e.g., Lakhin, A. V., Tarantul, V. Z., & Gening, L. (2013). Aptamers: problems, solutions and prospects. *Acta Naturae*, 5(4(19), incorporated herein by reference in its entirety).

In some embodiments of the methods described herein, a label (e.g., a detectable agent, a first label or a second label) can be added to an analyte to from a biological sample. In some embodiments, a capture probe can include a label. In some embodiments, a first label can be added to an analyte and a capture probe can include a second label. In some embodiments, the labels are of the same type (as a non-limiting example, both the first label and the second label can include fluorophores). In some embodiments, the labels are of different types (as a non-limiting example, the first label can include a fluorophore and the second label can include a quantum dot or vice-versa). In some embodiments, a label can be added in the synthesis of an analyte or a capture probe (e.g., through the use of one or more labeled (e.g., fluorophore-labeled or quencher-labeled) monomers (e.g., nucleic acid or peptide monomers). In some embodiments, a label can be added to an analyte or to a capture probe through maleimide conjugation (e.g., cysteine residue labeling). In some embodiments, a label can be added to an analyte or to a capture probe through succinimidyl-ester conjugation (e.g., N-terminal amine labeling). In some embodiments, a label can be added through peptide conjugation (e.g., thioester labeling). In some embodiments, a label can be added through biotinylation (e.g., streptavidin-fluorophore labeling) (see, e.g., Toseland CP. Fluorescent labeling and modification of proteins. *J Chem Biol.* 2013; 6 (3): 85-95. Published 2013 Apr. 13, incorporated herein by reference in its entirety).

In some embodiments of methods that include a first label and a second label, a first label can be a fluorophore and a second label a quencher (e.g., TAMRA, Black Berry Quencher-650, ECLIPSE™, DyQ® 1, DyQ® 2, DyQ® 3, DyQ® 4, DyQ® 425, DyQ® 505, DyQ® 660, DyQ® 661, DyQ® 700, Black Hole Quencher®-0, Black Hole Quencher®-1, Black Hole Quencher®-2, Black Hole Quencher®-3, Black Hole Quencher®-10, QSYR 7, QSYR 9, QSY® 21, QSY® 35, IRDye® QC-1, Iowa black® FQ, Iowa black® RQ, acrylamide, or a dabcyl group) of the fluorophore, or vice-versa. It will be understood that the selection of a donor fluorophore and an acceptor quencher will depend on the emission wavelength of the donor fluorophore and the absorption wavelength of the acceptor quencher. In some embodiments, the quencher (e.g., a second label or a first label) can form a complex with the fluorophore thereby preventing the fluorophore from absorbing stimulating photon emissions. In some embodiments, a fluorophore (e.g., a first label or a second label) can be stimulated to an energetic state causing fluorescent emission (e.g., fluorescence). When the fluorophore (e.g., the first label or the second label) and the quencher (e.g., the second label or the first label, respectively) are in proximity, the quencher can, in some cases, absorb the fluorescent emission from the fluorophore. Fluorescence emission (or a reduction thereof) can be used to detect the association of the first label and the second label, thereby detecting capture of an analyte from a biological sample (see, e.g., Marras S A. Selection of fluorophore and quencher pairs for fluorescent nucleic acid hybridization probes. *Methods Mol Biol.* 2006; 335:3-16, and (2006) Quenching of Fluorescence. In: Lakowicz J. R. (eds) Principles of Fluorescence Spectroscopy. Springer, Boston, MA, each of which is incorporated herein by reference in its entirety).

In some embodiments of methods that include a first label and a second label, the first label and the second label can undergo Förster resonance energy transfer (FRET). A first label can be a donor fluorophore and a second label an acceptor fluorophore, or vice-versa. The donor fluorophore can be stimulated to an energetic state causing a fluorescent emission of a first wavelength (e.g., fluorescence). It will be understood that the selection of a donor fluorophore and an acceptor fluorophore will depend on the emission wavelength of the donor fluorophore and the absorption wavelength of the acceptor fluorophore. When the two labels are in proximity, the second label can absorb the photon of the first wavelength and enter an energetic state causing a fluorescent emission of a second wavelength. Fluorescence emission of the second wavelength can be used to detect the association of the first label and the second label, thereby detecting capture of an analyte from a biological sample (see, e.g., Piston D W, Kremers G J. Fluorescent protein FRET: the good, the bad and the ugly. *Trends in biochemical sciences.* 2007 Sep. 1; 32 (9): 407-414, and Massey, Melissa, W. Russ Algar, and Ulrich J. Krull. Fluorescence resonance energy transfer (FRET) for DNA biosensors: FRET pairs and Förster distances for various dye-DNA conjugates. *Analytica chimica acta* 568.1-2 (2006): 181-189, each of which incorporated herein by reference in its entirety).

In any of the methods described herein, analyte capture can be performed using a passive capture method or an active capture method as described herein. In some embodiments of any of the methods described herein, an analyte from a biological sample can be driven towards an array using electrophoresis.

In some embodiments, a fluorescent emission of a label can be detected through fluorescence microscopy (e.g. confocal microscopy, total internal reflection fluorescence microscopy). In some embodiments, the method of fluorescence microscopy can be total internal reflection fluorescence microscopy (e.g., TIRF). When using TIRF, a substrate that allows substantial transmission of light (e.g., a glass or quartz slide) is generally selected. Typically, TIRF allows for the detection of one or more labels within a range of more than 1 nm and less than 400 nm (e.g., 1 to 2, 1 to 3, 1 to 4, 1 to 5, 2 to 3, 2 to 4, 2 to 5, 3 to 4, 3 to 5, 4 to 5, 5 to 10, 5 to 15, 5 to 20, 5 to 25, 5 to 30, 5 to 35, 5 to 40, 5 to 45, 5 to 50, 10 to 15, 10 to 20, 10 to 25, 10 to 30, 10 to 35, 10 to 40, 10 to 45, 10 to 50, 15 to 20, 15 to 25, 15 to 30, 15 to 35, 15 to 40, 15 to 45, 15 to 50, 20 to 25, 20 to 30, 20 to 35, 20 to 40, 20 to 45, 20 to 50, 25 to 30, 25 to 35, 25 to 40, 25 to 45, 25 to 50, 30 to 35, 30 to 40, 30 to 45, 30 to 50, 35 to 40, 35 to 45, 35 to 50, 40 to 45, 40 to 50, 45 to 50, 50 to 60, 50 to 70, 50 to 80, 50 to 90, 50 to 100, 60 to 70, 60 to 80, 60 to 90, 60 to 100, 70 to 80, 70 to 90, 70 to 100, 80 to 90, 80 to 100, 90 to 100, 100 to 150, 100 to 200, 100 to 250, 100 to 300, 100 to 350, 100 to 400, 150 to 200, 150 to 250, 150 to 300, 150 to 350, 150 to 400, 200 to 250, 200 to 300, 200 to 350, 200 to 400, 250 to 300, 250 to 350, 250 to 400, 300 to 350, 300 to 400, 350 to 400 nm) away from the substrate (see, e.g., Mattheyses, A. L., Simon, S. M., & Rappoport, J. Z. (2010). Imaging with total internal reflection fluorescence microscopy for the cell biologist. *Journal of Cell Science*, 123 (21), 3621-3628., incorporated herein by reference in its entirety). This can allow, for example, selective detection of a label (e.g. a detectable moiety) only when in proximity to the substrate, which can be indicative of complex formation, depending on the labeling strategy.

In some embodiments, the method of TIRF can use an inverted objective to stimulate and detect the fluorescent emissions of a label or a pair of labels. In some implementations of this method, incident light is directed through the inverted objective and into the substrate (e.g., slide) on which capture probes are present. The incident light undergoes total internal reflection in the substrate and is returned to the objective. When the incident light undergoes total internal reflection, an evanescent electromagnetic field is created within a range of a face of the substrate. Generally, the range can be more than 1 nm and less than 400 nm (e.g., 1 to 2, 1 to 3, 1 to 4, 1 to 5, 2 to 3, 2 to 4, 2 to 5, 3 to 4, 3 to 5, 4 to 5, 5 to 10, 5 to 15, 5 to 20, 5 to 25, 5 to 30, 5 to 35, 5 to 40, 5 to 45, 5 to 50, 10 to 15, 10 to 20, 10 to 25, 10 to 30, 10 to 35, 10 to 40, 10 to 45, 10 to 50, 15 to 20, 15 to 25, 15 to 30, 15 to 35, 15 to 40, 15 to 45, 15 to 50, 20 to 25, 20 to 30, 20 to 35, 20 to 40, 20 to 45, 20 to 50, 25 to 30, 25 to 35, 25 to 40, 25 to 45, 25 to 50, 30 to 35, 30 to 40, 30 to 45, 30 to 50, 35 to 40, 35 to 45, 35 to 50, 40 to 45, 40 to 50, 45 to 50, 50 to 60, 50 to 70, 50 to 80, 50 to 90, 50 to 100, 60 to 70, 60 to 80, 60 to 90, 60 to 100, 70 to 80, 70 to 90, 70 to 100, 80 to 90, 80 to 100, 90 to 100, 100 to 150, 100 to 200, 100 to 250, 100 to 300, 100 to 350, 100 to 400, 150 to 200, 150 to 250, 150 to 300, 150 to 350, 150 to 400, 200 to 250, 200 to 300, 200 to 350, 200 to 400, 250 to 300, 250 to 350, 250 to 400, 300 to 350, 300 to 400, 350 to 400 nm). The evanescent electromagnetic field can stimulate fluorescent emission from one or more labels (e.g., one or more fluorophores). Directly (e.g., through the use of a single fluorophore label or a fluorophore/quencher system) or indirectly (e.g., through the use of FRET) stimulated photons can then be captured and detected by the inverted objective.

In some embodiments, the method of TIRF can use an objective in combination with a prism to stimulate and detect the fluorescent emissions of one or more labels (e.g., one or more fluorophores). In some implementations of this method, incident light is directed through a prism, for example, a prism on which a substrate rests, or a prism in proximity to a surface of a substrate. The incident light undergoes total internal reflection in the prism and an evanescent electromagnetic field is created, extending in a range of distance from a face of the prism. The range can be between about 1 nm and 400 nm (e.g., 1 to 2, 1 to 3, 1 to 4, 1 to 5, 2 to 3, 2 to 4, 2 to 5, 3 to 4, 3 to 5, 4 to 5, 5 to 10, 5 to 15, 5 to 20, 5 to 25, 5 to 30, 5 to 35, 5 to 40, 5 to 45, 5 to 50, 10 to 15, 10 to 20, 10 to 25, 10 to 30, 10 to 35, 10 to 40, 10 to 45, 10 to 50, 15 to 20, 15 to 25, 15 to 30, 15 to 35, 15 to 40, 15 to 45, 15 to 50, 20 to 25, 20 to 30, 20 to 35, 20 to 40, 20 to 45, 20 to 50, 25 to 30, 25 to 35, 25 to 40, 25 to 45, 25 to 50, 30 to 35, 30 to 40, 30 to 45, 30 to 50, 35 to 40, 35 to 45, 35 to 50, 40 to 45, 40 to 50, 45 to 50, 50 to 60, 50 to 70, 50 to 80, 50 to 90, 50 to 100, 60 to 70, 60 to 80, 60 to 90, 60 to 100, 70 to 80, 70 to 90, 70 to 100, 80 to 90, 80 to 100, 90 to 100, 100 to 150, 100 to 200, 100 to 250, 100 to 300, 100 to 350, 100 to 400, 150 to 200, 150 to 250, 150 to 300, 150 to 350, 150 to 400, 200 to 250, 200 to 300, 200 to 350, 200 to 400, 250 to 300, 250 to 350, 250 to 400, 300 to 350, 300 to 400, 350 to 400 nm). The evanescent electromagnetic field stimulates fluorescent emission from one or more labels. The stimulated fluorescent emissions are then captured and detected by the objective.

Figure 7:
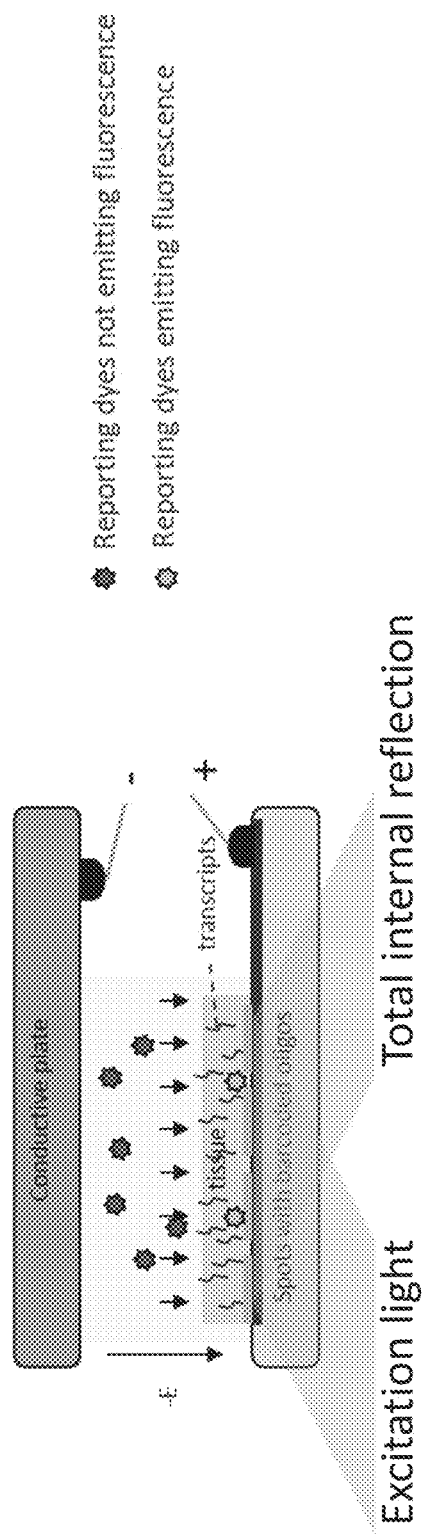
FIG. 7 shows an exemplary configuration of total internal reflection fluorescence (TIRF)-based detection of electrophoretic capture.

Exemplary detection of capture of an analyte from a biological sample using TIRF and electrophoretic capture is shown in FIG. 7.

FIG. 7 shows that exemplary electrophoretic capture can be assessed using a local fluorescence signal. In methods employing TIRF, evanescent light is available to excite the fluorescence reporting dyes. In FIG. 7, a biological sample, such as a tissue sample (e.g., a permeabilized biological sample) is present on an array of capture probes (e.g., spots with barcoded oligos) present on a substrate (e.g., a LP slide). An analyte (e.g., a transcript) from the biological sample is driven towards the array using electrophoresis, and the analyte is captured by a capture probe (e.g., barcoded oligo) to form a complex. A detectable agent binds specifically to the complex to form a detectable complex. To stimulate local fluorescence signal near the solid substrate, total internal reflection fluorescence is used. The substrate allows substantial transmission and reflection of light (e.g., the solid substrate can be made of glass or quartz). Incident excitation light is shown directed into the substrate at an angle such that the light undergoes total internal reflection and can be reflected back out of the substrate. The total internal reflection can create an evanescent electromagnetic field in a region above the surface of the substrate capable of stimulating fluorescent emission (e.g., fluorescence) from the detectable agent in a region that is near the solid substrate. Only detectable complexes within the region can undergo fluorescent emission.

In some embodiments, a fluorescent emission of a label can be detected through fluorimetry. In some embodiments, the fluorimetry method can be a filter fluorimeter (e.g., microplate reader or a NanoDrop instrument). In some implementations of this method, incident light is directed into a volume containing one or more labels (e.g., one or more fluorophores and/or one or more quenchers). The incident light causes stimulated fluorescent emission of a second wavelength from one or more labels. A filter (e.g., long pass) can be used to isolate the incident light from the stimulated fluorescent emission. The stimulated fluorescent emission is then detected by a detector. In some embodiments, the fluorimetry instrument can be a spectrofluorimeter (e.g., fluorimeter (e.g., microplate reader)). Using a spectrofluorimeter, incident light can be directed into a volume containing one or more labels. The incident light causes stimulated fluorescent emission from one or more labels (e.g., one or more fluorophores and/or one or more quenchers). A diffraction grating can then be used to isolate the incident light from the stimulated fluorescent emission. Directly (e.g., though the use of a single fluorophore label or a fluorophore/quencher system) or indirectly (e.g., through the use of FRET) stimulated photons can then be detected by a detector.

In some embodiments, methods of detecting capture of an analyte can use detection of a moiety, property, or other parameter that does not involve an optical label.

In some embodiments of methods that do not include an optical label (e.g., do not include the use of a label), the formation of a complex can be detected by the adsorption of a target analyte onto a surface through surface plasmon resonance (e.g., SPR). See, e.g., Bocková, Markéta, et al. "Advances in surface plasmon resonance imaging and microscopy and their biological applications." *Annual*

*Review of Analytical Chemistry* 12 (2019): 151-176., incorporated herein by reference in its entirety.

In some embodiments, capture probes can be present on a face of a substrate (e.g., a glass slide) including a metal film (e.g., copper, aluminum, gold) on a face of the substrate opposite the face of the substrate with the capture probes to form a metallized face of the substrate. The depth of the metal film can be in the range of about 1 nm to about 10 nm. For example, the depth can be 1 to 2, 1 to 3, 1 to 4, 1 to 5, 1 to 6, 1 to 7, 1 to 8, 1 to 9, 1 to 10, 2 to 3, 2 to 4, 2 to 5, 2 to 6, 2 to 7, 2 to 8, 2 to 9, 2 to 10, 3 to 4, 3 to 5, 3 to 6, 3 to 7, 3 to 8, 3 to 9, 3 to 10, 4 to 5, 4 to 6, 4 to 7, 4 to 8, 4 to 9, 4 to 10, 5 to 6, 5 to 7, 5 to 8, 5 to 9, 5 to 10, 6 to 7, 6 to 8, 6 to 9, 6 to 10, 7 to 8, 7 to 9, 7 to 10, 8 to 9, 8 to 10, or 9 to 10 nm.

In some embodiments, a dielectric prism is then contacted to the metallized face of the substrate (e.g., the Kretschmann configuration). In some embodiments, the dielectric prism is placed at a distance from the metallized face of the substrate (e.g., the Otto configuration). The distance the dielectric prism can be placed from the metallized face of the substrate can be in the range of about 1 nm to about 50 nm. For example, the range can be 1 to 10, 1 to 20, 1 to 30, 1 to 40, 1 to 50, 10 to 20, 10 to 30, 10 to 40, 10 to 50, 20 to 30, 20 to 40, 20 to 50, 30 to 40, 30 to 50, 40 to 50 nm. Incident light can then be directed into the dielectric prism. The incident light undergoes total internal reflection in the dielectric prism and an evanescent electromagnetic field is created within a range of the face of the prism. The evanescent electromagnetic field excites an electromagnetic surface wave (e.g., surface plasmon polariton) in the metallized face of the substrate. A second beam of incident light is then directed onto the metallized face of the substrate and undergoes reflection. A fraction of the second beam of incident light is selectively absorbed by the electromagnetic surface wave and the reflected beam of incident light can be monitored for an absorption spectrum. Formation of a complex between an analyte from a biological sample and a capture probe can change the electromagnetic surface wave thereby changing the detected absorption spectrum.

In some embodiments of methods that do not include an optical label (e.g., do not include the use of a label), the formation of a complex can be detected through atomic force microscopy (e.g., AFM).

In some embodiments, capture probes can be present on a substrate (e.g., a glass slide). An analyte from a biological sample can form a complex with the capture probes on the substrate. The complex on the substrate can then be dehydrated (e.g., to remove buffer). The dehydrated complex on the substrate can then be placed upon a stage capable of translation in the x, y, and z directions. A cantilever with a sharp tip carried by a first support can then be placed in proximity to the substrate and can be oscillated by a ceramic piezoelectric element. A detector (e.g., interferometer) can be used to measure the deflection of the cantilever. The cantilever with a sharp tip can then be brought into contact with the dehydrated complex on the substrate. The stage with the substrate can then be moved along an x-y grid (e.g., raster scanned) and the height of the glass slide comprising the analytes in complex with the capture probes can be measured. The measured height can be in the range of about 0.1 nm to 100 nm or more. The range can be 0.1 to 0.2, 0.1 to 0.3, 0.1 to 0.4, 0.1 to 0.5, 0.1 to 0.6, 0.1 to 0.7, 0.1 to 0.8, 0.1 to 0.9, 0.1 to 1, 0.2 to 0.3, 0.2 to 0.4, 0.2 to 0.5, 0.2 to 0.6, 0.2 to 0.7, 0.2 to 0.8, 0.2 to 0.9, 0.2 to 1, 0.3 to 0.4, 0.3 to 0.5, 0.3 to 0.6, 0.3 to 0.7, 0.3 to 0.8, 0.3 to 0.9, 0.3 to 1, 0.4 to 0.5, 0.4 to 0.6, 0.4 to 0.7, 0.4 to 0.8, 0.4 to 0.9, 0.4 to 1, 0.5 to 0.6, 0.5 to 0.7, 0.5 to 0.8, 0.5 to 0.9, 0.5 to 1, 0.6 to 0.7, 0.6 to 0.8, 0.6 to 0.9, 0.6 to 1, 0.7 to 0.8, 0.7 to 0.9, 0.7 to 1, 0.8 to 0.9, 0.8 to 1, 0.9 to 1, 1 to 10, 10 to 20, 10 to 30, 10 to 40, 10 to 50, 10 to 60, 10 to 70, 10 to 80, 10 to 90, or 10 to 100, 20 to 30, 20 to 40, 20 to 50, 20 to 60, 20 to 70, 20 to 80, 20 to 90, or 20 to 100, 30 to 40, 30 to 50, 30 to 60, 30 to 70, 30 to 80, 30 to 90, or 30 to 100, 40 to 50, 40 to 60, 40 to 70, 40 to 80, 40 to 90, or 40 to 100, 50 to 60, 50 to 70, 50 to 80, 50 to 90, or 50 to 100, 60 to 70, 60 to 80, 60 to 90, or 60 to 100, 70 to 80, 70 to 90, or 70 to 100, 80 to 90, or 80 to 100, 90 to 100 nm. The capture of analytes can be detected by large changes in the measured height of the glass slide comprising the analytes in complex with the capture probes (see, e.g., San Paulo A, García R. High-resolution imaging of antibodies by tapping-mode atomic force microscopy: attractive and repulsive tip-sample interaction regimes. Biophys J. 2000; 78 (3): 1599-1605, incorporated herein by reference in its entirety).

In some embodiments, of any of the methods described herein, a capture probe can include a spatial barcode, a unique molecular identifier (UMI), or both a spatial barcode and a UMI. In some embodiments a capture probe can lack a spatial barcode, a UMI, or both a spatial barcode and a UMI. In some embodiments, a capture probe can be attached to the substrate via its 5' end.

In some embodiments, a substrate can include one or more fiducial markers (e.g., any of the fiducial markers described herein).

In some embodiments, a substrate can include a signal control region comprising one or more detectable markers in known concentration(s). Without being bound by any particular theory, it is believed that having one or more detectable markers in known concentration(s) can help to quantify an amount of analyte captured by the capture probes. In some embodiments, a detectable marker can include one or more of the label(s) used for detection of a complex between the capture probe and the analyte.

A substrate can also include, in some embodiments, a positive control region, a negative control region, or both a positive control region and a negative control region. A positive control region can, in some cases, include a plurality of positive control capture probes, where a positive control capture probe of the plurality of positive control capture probes includes a capture domain that can bind to a positive control analyte. In some embodiments, a positive control analyte (e.g., a solution containing mRNA) can be applied to a positive control region to form a complex, for example, either before or after a biological sample is permeabilized to release an analyte. In some embodiments, a positive control capture probe can include a label, for example, when FRET or fluorescence quenching is used to detect complex formation. In some embodiments, a positive control capture probe can lack a label, for example, when an intercalating dye or SPR is used to detect complex formation.

A negative control region can be implemented in a number of ways. In some embodiments, a negative control region can include a plurality of negative control probes, where a negative control probe of the plurality of negative control probes lacks a capture domain to specifically bind an analyte. In some embodiments, a negative control region can lack capture probes. In some embodiments, a negative control region can include a plurality of capture probes, where a capture probe of the plurality of capture probes includes a capture domain that can specifically bind to the analyte to form a complex (e.g., the capture probes of the negative control region can be the same as the capture probes of a region intended to capture an analyte), but the negative control region can correspond to a location where little or no analyte is released from the biological sample. For example, in some embodiments, a negative control region can correspond to part of a substrate where a biological sample is not permeabilized (e.g., no permeabilization reagent(s) is/are applied to the biological sample).

In some embodiments, methods described herein can allow for the selection of a set of capture conditions (e.g., including permeabilization conditions) for a biological sample. For example, any of the methods described herein for detecting capture of an analyte from a biological sample can be performed twice (e.g., on a first portion of the biological sample and a second portion of the biological sample), each time detecting a level of complex formation between an analyte from a biological sample and a capture probe and/or other parameters. The two levels of complex formation and/or the other parameters can be compared, and a set of capture conditions can be selected for biological samples similar to the biological sample in the selection experiment.

For example, provided herein is a method for selecting a set of capture conditions for a biological sample, the method including (a) applying a first set of test capture conditions to a first portion of a biological sample, wherein the first set of test capture conditions results in the release of an analyte from the first portion of the biological sample, (b) capturing the analyte released from the first portion of the biological sample on a substrate including a plurality of capture probes, wherein a capture probe of the plurality of capture probes includes a capture domain that binds specifically the analyte released from the first portion of the biological sample to form a complex, (c) contacting the complex in step (b) with a detectable agent that binds specifically to the complex, (d) detecting an amount of the detectable agent specifically bound to the complex in (c), (e) applying a second set of test capture conditions to a second portion of a biological sample, wherein the second set of test capture conditions results in the release of the analyte from the second portion of the biological sample, (f) capturing the analyte released from the second portion of the biological sample on a substrate including a plurality of capture probes, wherein a capture probe of the plurality of capture probes includes a capture domain that binds specifically to the analyte released from the second portion of the biological sample to form a complex, (g) contacting the complex in step (f) with the detectable agent that binds specifically to the complex, (h) detecting an amount of the detectable agent specifically bound to the complex in (g), (i) selecting the first or second set of test capture conditions based on a comparison of the amounts of the detectable agent specifically bound to the complex in steps (d) and (h).

As another example, provided herein is a method for selecting a set of capture conditions for a biological sample, the method including (a) applying a first set of test capture conditions to a first portion of a biological sample, wherein the first set of test capture conditions results in the release of an analyte from the first portion of the biological sample, (b) adding a first label to the analyte released from the first portion of the biological sample, (c) capturing the analyte released from the first portion of the biological sample on a substrate including a plurality of capture probes, wherein a capture probe of the plurality of capture probes includes (i) a capture domain that binds specifically to the analyte released from the first portion of the biological sample and (ii) a second label, (d) detecting the association of the first label and the second label, (e) applying a second set of capture conditions to a second portion of the biological sample, wherein the second set of capture conditions results in the release of the analyte from the second portion of the biological sample, (f) adding the first label to the analyte released from the second portion of the biological sample, (g) capturing the analyte released from the second portion of the biological sample on a substrate including a plurality of capture probes, wherein a capture probe of the plurality of labeled capture probes includes (i) a capture domain that binds specifically to the analyte released from the second portion of the biological sample and (ii) the second label, (h) detecting the association of the first label and the second label, and (i) selecting the first or second set of test capture conditions based on a comparison of the association of the first label and the second label detected in steps (d) and (h).

Also provided herein is a method for selecting a set of capture conditions for a biological sample, the method including (a) applying a first set of test capture conditions to a first portion of a biological sample, wherein the first set of test capture conditions results in the release of an analyte from the first portion of the biological sample, (b) capturing the analyte released from the first portion of the biological sample on a substrate including a plurality of capture probes, wherein a capture probe of the plurality of capture probes includes a capture domain that binds specifically to the analyte released from the first portion of the biological sample to form a complex, (c) detecting a first level of the complex of step (b), wherein the detecting of the first level of the complex does not include the use of a fluorophore, (d) applying a second set of test capture conditions to a second portion of a biological sample, wherein the second set of test capture conditions results in the release of the analyte from the second portion of the biological sample, (e) capturing the analyte released from the second portion of the biological sample on a substrate including a plurality of capture probes, wherein a capture probe of the plurality of capture probes includes a capture domain that binds specifically to the analyte released from the second portion of the biological sample to form a complex, (f) detecting a second level of the complex of step (e), wherein the detecting of the second level of the complex does not include the use of a fluorophore, and (g) selecting the first or second set of test capture conditions based on a comparison of the first level of the complex detected in step (c) and the second level of the complex detected in step (f).

Selection of a set of capture conditions (e.g., test capture conditions) can be based on any appropriate parameter(s) of interest. In some embodiments, the parameter of interest can include, but is not limited to, quantity of capture (e.g. analyte capture), a level of a signal (e.g. fluorescence), spatial inaccuracies (e.g., from analyte lateral diffusion) or any combination thereof. In some embodiments, a parameter of interest (e.g., total capture of analyte) can be maximized. In some embodiments, a parameter of interest (e.g., total capture of analyte or lateral diffusion of an analyte) can be set to a target value, target range, or target threshold. In some embodiments, a parameter of interest (e.g., lateral diffusion of an analyte) can be minimized. Aspects of a set of capture conditions can be varied to determine the effect of such variation on the parameter(s) of interest. For example, if parameter of interest is quantity of analyte capture, at least two (e.g., at least 3, at least 4, at least 5, at least 6, or more) sets of capture conditions can be compared. The sets of capture conditions can be varied in any appropriate aspect, including any of the aspects described herein.

In some cases, a parameter of interest is maximized. In such cases, the parameter of interest for each of the sets of capture conditions (e.g., test capture conditions) can be compared, and the set of capture conditions that results in the maximum amount of the parameter of interest can be selected, e.g., for use with biological samples similar to the biological sample used in the selection experiment.

In some cases, a parameter of interest is minimized. In such cases, the parameter of interest for each of the sets of capture conditions (e.g., test capture conditions) can be compared, and the set of capture conditions that results in the minimum amount of the parameter of interest can be selected, e.g., for use with biological samples similar to the biological sample used in the selection experiment.

In some cases, a parameter of interest is targeted to a range. In such cases, the parameter of interest for each of the sets of capture conditions (e.g., test capture conditions) can be compared, and a set of capture conditions that results in the amount of the parameter of interest within the targeted range can be selected, e.g., for use with biological samples similar to the biological sample used in the selection experiment.

In some cases, a parameter of interest is targeted to be greater than a minimum threshold. In such cases, the parameter of interest for each of the sets of capture conditions (e.g., test capture conditions) can be compared, and a set of capture conditions that results in the amount of the parameter of interest that is greater than the minimum threshold can be selected, e.g., for use with biological samples similar to the biological sample used in the selection experiment.

In some cases, a parameter of interest is targeted to a value. In such cases, the parameter of interest for each of the sets of capture conditions (e.g., test capture conditions) can be compared, and a set of capture conditions that results in the amount of the parameter of interest that meets (or is closest to) the value can be selected, e.g., for use with biological samples similar to the biological sample used in the selection experiment.

In some cases, a parameter of interest is targeted to be below a maximum threshold. In such cases, the parameter of interest for each of the sets of capture conditions (e.g., test capture conditions) can be compared, and a set of capture conditions that results in the amount of the parameter of interest that is below a maximum threshold can be selected, e.g., for use with biological samples similar to the biological sample used in the selection experiment.

A set of capture conditions (e.g., test capture conditions) for a biological sample can include reagents. The reagents selected for a set of capture conditions for a biological sample can include, but is not limited to, reagents such as salts, organic solvents (e.g., acetone, ethanol, methanol), a cross-linking agent (e.g., paraformaldehyde), a detergent (e.g., saponin, polyethylene oxide surfactant, a polysorbate surfactant, sodium dodecyl sulfate), an enzyme (e.g., trypsin, proteinase K), or any combination thereof, in any appropriate concentration, such as any of the concentrations described herein.

For example, a salt can be present at a concentration of about 20 g/100 ml of a permeabilization buffer or less, such as about 15g/100 ml, 10g/100 ml, 9g/100 ml, 8g/100 ml, 7g/100 ml, 6g/100 ml, 5g/100 ml or less, e.g., about 4g, 3g, 2g or 1g/100 ml.

For a further example, organic solvents can be present at a concentration of at least 1% v/v (e.g., at least 1%, 5%, 10%, 15%, 20%, 25%, 30%, 35%, 40%, 45%, 50%, 55%, 60%, 65%, 70%, 75%, 80%, 85%, 90%, or 95% v/v organic solvent).

For a further example, a detergent can be present at a concentration of greater than 1.0 w/v % (e.g., greater than about 2.0 w/v %, greater than about 3.0 w/v %, greater than about 4.0 w/v %, greater than about 5.0 w/v %, greater than about 6.0 w/v %, greater than about 7.0 w/v %, greater than about 8.0 w/v %, greater than about 9.0 w/v %, greater than about 10.0 w/v %, greater than about 11.0 w/v %, greater than about 12.0 w/v %, or greater than about 13.0 w/v %).

For a further example, an enzyme (e.g., trypsin, proteinase K) can be present at a concentration of about 1 w/v % to about 14 w/v % (e.g., about 1 to about 2% w/v, about 1 to about 3% w/v, about 1 to about 4% w/v, about 1 to about 5% w/v, about 1 to about 6% w/v, about 1 to about 7% w/v, about 1 to about 8% w/v, about 1 to about 9% w/v, about 1 to about 10% w/v, about 1 to about 11% w/v, about 1 to about 12% w/v, about 1 to about 13% w/v, about 1 to about 14% w/v, about 2 to about 3% w/v, about 2 to about 4% w/v, about 2 to about 5% w/v, about 2 to about 6% w/v, about 2 to about 7% w/v, about 2 to about 8% w/v, about 2 to about 9% w/v, about 2 to about 10% w/v, about 2 to about 11% w/v, about 2 to about 12% w/v, about 2 to about 13% w/v, about 2 to about 14% w/v, about 3 to about 4% w/v, about 3 to about 5% w/v, about 3 to about 6% w/v, about 3 to about 7% w/v, about 3 to about 8% w/v, about 3 to about 9% w/v, about 3 to about 10% w/v, about 3 to about 11% w/v, about 3 to about 12% w/v, about 3 to about 13% w/v, about 3 to about 14% w/v, about 4 to about 5% w/v, about 4 to about 6% w/v, about 4 to about 7% w/v, about 4 to about 8% w/v, about 4 to about 9% w/v, about 4 to about 10% w/v, about 4 to about 11% w/v, about 4 to about 12% w/v, about 4 to about 13% w/v, about 4 to about 14% w/v, about 5 to about 6% w/v, about 5 to about 7% w/v, about 5 to about 8% w/v, about 5 to about 9% w/v, about 5 to about 10% w/v, about 5 to about 11% w/v, about 5 to about 12% w/v, about 5 to about 13% w/v, about 5 to about 14% w/v, about 6 to about 7% w/v, about 6 to about 8% w/v, about 6 to about 9% w/v, about 6 to about 10% w/v, about 6 to about 11% w/v, about 6 to about 12% w/v, about 6 to about 13% w/v, about 6 to about 14% w/v, about 7 to about 8% w/v, about 7 to about 9% w/v, about 7 to about 10% w/v, about 7 to about 11% w/v, about 7 to about 12% w/v, about 7 to about 13% w/v, about 7 to about 14% w/v, about 8 to about 9% w/v, about 8 to about 10% w/v, about 8 to about 11% w/v, about 8 to about 12% w/v, about 8 to about 13% w/v, about 8 to about 14% w/v, about 9 to about 10% w/v, about 9 to about 11% w/v, about 9 to about 12% w/v, about 9 to about 13% w/v, about 9 to about 14% w/v, about 10 to about 11% w/v, about 10 to about 12% w/v, about 10 to about 13% w/v, about 10 to about 14% w/v, about 11 to about 12% w/v, about 11 to about 13% w/v, about 11 to about 14% w/v, about 12 to about 13% w/v, about 12 to about 14% w/v, about 13 to about 14% w/v).

A set of capture conditions (e.g., test capture conditions) for a biological sample can include temperature of permeabilization. The temperature of permeabilization selected for a set of capture conditions for a biological sample can include, but is not limited to, temperatures from about 4° C. to about 70° C. (e.g., about 4° C. to about 5° C., about 4° C. to about 6° C., about 4° C. to about 7° C., about 4° C. to about 8° C., about 4° C. to about 9° C., about 4° C. to about 10° C., about 5° C. to about 6° C., about 5° C. to about 7° C., about 5° C. to about 8° C., about 5° C. to about 9° C., about 5° C. to about 10° C., about 6° C. to about 7° C., about 6° C. to about 8° C., about 6° C. to about 9° C., about 6° C. to about 10° C., about 7° C. to about 8° C., about 7° C. to about 9° C., about 7° C. to about 10° C., about 8° C. to about 9° C., about 8° C. to about 10° C., about 9° C. to about 10° C., about 10° C. to about 20° C., about 10° C. to about 30° C., about 10° C. to about 40° C., about 10° C. to about 50°

C., about 10° C. to about 60° C., about 10° C. to about 70° C., about 20° C. to about 30° C., about 20° C. to about 40° C., about 20° C. to about 50° C., about 20° C. to about 60° C., about 20° C. to about 70° C., about 30° C. to about 40° C., about 30° C. to about 50° C., about 30° C. to about 60° C., about 30° C. to about 70° C., about 40° C. to about 50° C., about 40° C. to about 60° C., about 40° C. to about 70° C., about 50° C. to about 60° C., about 50° C. to about 70° C., about 60° C. to about 70° C.). In some embodiments, the temperature can be about 35° C. to about 40° C.

A set of capture conditions (e.g., test capture conditions) for a biological sample can include time of permeabilization. The time of permeabilization selected for a set of capture conditions for a biological sample can include, but is not limited to, times from about 10 s to about 300 min or more (e.g., 10 to 20 s, 10 to 30 s, 10 to 40 s, 10 to 50 s, 10 to 60 s, 20 to 30 s, 20 to 40 s, 20 to 50 s, 20 to 60 s, 30 to 40 s, 30 to 50 s, 30 to 60 s, 40 to 50 s, 40 to 60 s, 50 to 60 s, 1 to 2 min, 1 to 3 min, 1 to 4 min, 1 to 5 min, 1 to 6 min, 1 to 7 min, 1 to 8 min, 1 to 9 min, 1 to 10 min, 2 to 3 min, 2 to 4 min, 2 to 5 min, 2 to 6 min, 2 to 7 min, 2 to 8 min, 2 to 9 min, 2 to 10 min, 3 to 4 min, 3 to 5 min, 3 to 6 min, 3 to 7 min, 3 to 8 min, 3 to 9 min, 3 to 10 min, 4 to 5 min, 4 to 6 min, 4 to 7 min, 4 to 8 min, 4 to 9 min, 4 to 10 min, 5 to 6 min, 5 to 7 min, 5 to 8 min, 5 to 9 min, 5 to 10 min, 6 to 7 min, 6 to 8 min, 6 to 9 min, 6 to 10 min, 7 to 8 min, 7 to 9 min, 7 to 10 min, 8 to 9 min, 8 to 10 min, 9 to 10 min, 10 to 20 min, 10 to 30 min, 10 to 40 min, 10 to 50 min, 10 to 60 min, 20 to 30 min, 20 to 40 min, 20 to 50 min, 20 to 60 min, 30 to 40 min, 30 to 50 min, 30 to 60 min, 40 to 50 min, 40 to 60 min, 50 to 60 min, 60 to 90 min, 60 to 120 min, 60 to 180 min, 60 to 240 min, 60 to 300 min, 90 to 120 min, 90 to 180 min, 90 to 240 min, 90 to 300 min, 120 to 180 min, 120 to 240 min, 120 to 300 min, 180 to 240 min, 180 to 300 min, 240 to 300 min or more). In some embodiments, a time selected for a set of capture conditions for a biological sample can be 3 minutes, 6 minutes, 12 minutes, 18 minutes, 24 minutes, or 30 minutes.

A set of capture conditions (e.g., test capture conditions) for a biological sample can include electroporation time. The electroporation time selected for a set of capture conditions for a biological sample can include, but is not limited to, times from about 10 s to about 300 min or more (e.g., 10 to 20 s, 10 to 30 s, 10 to 40 s, 10 to 50 s, 10 to 60 s, 20 to 30 s, 20 to 40 s, 20 to 50 s, 20 to 60 s, 30 to 40 s, 30 to 50 s, 30 to 60 s, 40 to 50 s, 40 to 60 s, 50 to 60 s, 1 to 2 min, 1 to 3 min, 1 to 4 min, 1 to 5 min, 1 to 6 min, 1 to 7 min, 1 to 8 min, 1 to 9 min, 1 to 10 min, 2 to 3 min, 2 to 4 min, 2 to 5 min, 2 to 6 min, 2 to 7 min, 2 to 8 min, 2 to 9 min, 2 to 10 min, 3 to 4 min, 3 to 5 min, 3 to 6 min, 3 to 7 min, 3 to 8 min, 3 to 9 min, 3 to 10 min, 4 to 5 min, 4 to 6 min, 4 to 7 min, 4 to 8 min, 4 to 9 min, 4 to 10 min, 5 to 6 min, 5 to 7 min, 5 to 8 min, 5 to 9 min, 5 to 10 min, 6 to 7 min, 6 to 8 min, 6 to 9 min, 6 to 10 min, 7 to 8 min, 7 to 9 min, 7 to 10 min, 8 to 9 min, 8 to 10 min, 9 to 10 min, 10 to 20 min, 10 to 30 min, 10 to 40 min, 10 to 50 min, 10 to 60 min, 20 to 30 min, 20 to 40 min, 20 to 50 min, 20 to 60 min, 30 to 40 min, 30 to 50 min, 30 to 60 min, 40 to 50 min, 40 to 60 min, 50 to 60 min, 60 to 90 min, 60 to 120 min, 60 to 180 min, 60 to 240 min, 60 to 300 min, 90 to 120 min, 90 to 180 min, 90 to 240 min, 90 to 300 min, 120 to 180 min, 120 to 240 min, 120 to 300 min, 180 to 240 min, 180 to 300 min, 240 to 300 min or more).

A set of capture conditions (e.g., test capture conditions) for a biological sample can include electroporation field strength. The electroporation field strength selected for a set of capture conditions for a biological sample can include, but is not limited to, electroporation field strengths from 100 V/cm to 30 kV/cm or more (e.g., 100 to 200 V/cm, 100 to 300 V/cm, 100 to 400 V/cm, 100 to 500 V/cm, 100 to 600 V/cm, 100 to 700 V/cm, 100 to 800 V/cm, 100 to 900 V/cm, 100 to 1000 V/cm, 200 to 300 V/cm, 200 to 400 V/cm, 200 to 500 V/cm, 200 to 600 V/cm, 200 to 700 V/cm, 200 to 800 V/cm, 200 to 900 V/cm, 200 to 1000 V/cm, 300 to 400 V/cm, 300 to 500 V/cm, 300 to 600 V/cm, 300 to 700 V/cm, 300 to 800 V/cm, 300 to 900 V/cm, 300 to 1000 V/cm, 400 to 500 V/cm, 400 to 600 V/cm, 400 to 700 V/cm, 400 to 800 V/cm, 400 to 900 V/cm, 400 to 1000 V/cm, 500 to 600 V/cm, 500 to 700 V/cm, 500 to 800 V/cm, 500 to 900 V/cm, 500 to 1000 V/cm, 600 to 700 V/cm, 600 to 800 V/cm, 600 to 900 V/cm, 600 to 1000 V/cm, 700 to 800 V/cm, 700 to 900 V/cm, 700 to 1000 V/cm, 800 to 900 V/cm, 800 to 1000 V/cm, 900 to 1000 V/cm, 1 to 5 kV/cm, 1 to 10 kV/cm, 1 to 15 kV/cm, 1 to 20 kV/cm, 1 to 25 kV/cm, 1 to 30 kV/cm, 5 to 10 kV/cm, 5 to 15 kV/cm, 5 to 20 kV/cm, 5 to 25 kV/cm, 5 to 30 kV/cm, 10 to 15 kV/cm, 10 to 20 kV/cm, 10 to 25 kV/cm, 10 to 30 kV/cm, 15 to 20 kV/cm, 15 to 25 kV/cm, 15 to 30 kV/cm, 20 to 25 kV/cm, 20 to 30 kV/cm, 25 to 30 kV/cm or more).

A set of capture conditions (e.g., test capture conditions) for a biological sample can include acoustic permeabilization time. The acoustic permeabilization time selected for a set of capture conditions for a biological sample can include, but is not limited to, times from 10 s to 300 min or more (e.g., 10 to 20 s, 10 to 30 s, 10 to 40 s, 10 to 50 s, 10 to 60 s, 20 to 30 s, 20 to 40 s, 20 to 50 s, 20 to 60 s, 30 to 40 s, 30 to 50 s, 30 to 60 s, 40 to 50 s, 40 to 60 s, 50 to 60 s, 1 to 2 min, 1 to 3 min, 1 to 4 min, 1 to 5 min, 1 to 6 min, 1 to 7 min, 1 to 8 min, 1 to 9 min, 1 to 10 min, 2 to 3 min, 2 to 4 min, 2 to 5 min, 2 to 6 min, 2 to 7 min, 2 to 8 min, 2 to 9 min, 2 to 10 min, 3 to 4 min, 3 to 5 min, 3 to 6 min, 3 to 7 min, 3 to 8 min, 3 to 9 min, 3 to 10 min, 4 to 5 min, 4 to 6 min, 4 to 7 min, 4 to 8 min, 4 to 9 min, 4 to 10 min, 5 to 6 min, 5 to 7 min, 5 to 8 min, 5 to 9 min, 5 to 10 min, 6 to 7 min, 6 to 8 min, 6 to 9 min, 6 to 10 min, 7 to 8 min, 7 to 9 min, 7 to 10 min, 8 to 9 min, 8 to 10 min, 9 to 10 min, 10 to 20 min, 10 to 30 min, 10 to 40 min, 10 to 50 min, 10 to 60 min, 20 to 30 min, 20 to 40 min, 20 to 50 min, 20 to 60 min, 30 to 40 min, 30 to 50 min, 30 to 60 min, 40 to 50 min, 40 to 60 min, 50 to 60 min, 60 to 90 min, 60 to 120 min, 60 to 180 min, 60 to 240 min, 60 to 300 min, 90 to 120 min, 90 to 180 min, 90 to 240 min, 90 to 300 min, 120 to 180 min, 120 to 240 min, 120 to 300 min, 180 to 240 min, 180 to 300 min, 240 to 300 min or more)

A set of capture conditions (e.g., test capture conditions) for a biological sample can include acoustic permeabilization power intensity. The acoustic permeabilization power intensity selected for a set of capture conditions for a biological sample can include, but is not limited to, power intensities from 10 W/cm$^2$ to 30 kW/cm$^2$ (e.g., 100 to 200 W/cm$^2$, 100 to 300 W/cm$^2$, 100 to 400 W/cm$^2$, 100 to 500 W/cm$^2$, 100 to 600 W/cm$^2$, 100 to 700 W/cm$^2$, 100 to 800 W/cm$^2$, 100 to 900 W/cm$^2$, 100 to 1000 W/cm$^2$, 200 to 300 W/cm$^2$, 200 to 400 W/cm$^2$, 200 to 500 W/cm$^2$, 200 to 600 W/cm$^2$, 200 to 700 W/cm$^2$, 200 to 800 W/cm$^2$, 200 to 900 W/cm$^2$, 200 to 1000 W/cm$^2$, 300 to 400 W/cm$^2$, 300 to 500 W/cm$^2$, 300 to 600 W/cm$^2$, 300 to 700 W/cm$^2$, 300 to 800 W/cm$^2$, 300 to 900 W/cm$^2$, 300 to 1000 W/cm$^2$, 400 to 500 W/cm$^2$, 400 to 600 W/cm$^2$, 400 to 700 W/cm$^2$, 400 to 800 W/cm$^2$, 400 to 900 W/cm$^2$, 400 to 1000 W/cm$^2$, 500 to 600 W/cm$^2$, 500 to 700 W/cm$^2$, 500 to 800 W/cm$^2$, 500 to 900 W/cm$^2$, 500 to 1000 W/cm$^2$, 600 to 700 W/cm$^2$, 600 to 800 W/cm$^2$, 600 to 900 W/cm$^2$, 600 to 1000 W/cm$^2$, 700 to 800 W/cm$^2$, 700 to 900 W/cm$^2$, 700 to 1000 W/cm$^2$, 800 to 900

W/cm², 800 to 1000 W/cm², 900 to 1000 W/cm², 1 to 5 kW/cm², 1 to 10 kW/cm², 1 to 15 kW/cm², 1 to 20 kW/cm², 1 to 25 kW/cm², 1 to 30 kW/cm², 5 to 10 kW/cm², 5 to 15 kW/cm², 5 to 20 kW/cm², 5 to 25 kW/cm², 5 to 30 kW/cm², 10 to 15 kW/cm², 10 to 20 kW/cm², 10 to 25 kW/cm², 10 to 30 kW/cm², 15 to 20 kW/cm², 15 to 25 kW/cm², 15 to 30 kW/cm², 20 to 25 kW/cm², 20 to 30 kW/cm², 25 to 30 kW/cm² or more).

A set of capture conditions (e.g., test capture conditions) for a biological sample can include thermal permeabilization temperature. The thermal permeabilization temperature selected for a set of capture conditions for a biological sample can include, but is not limited to, thermal permeabilization temperatures from 40° C. to 100° C. (e.g., 40° C. to 50° C., 40° C. to 60° C., 40° C. to 70° C., 40° C. to 80° C., 40° C. to 90° C., 40° C. to 100° C., 50° C. to 60° C., 50° C. to 70° C., 50° C. to 80° C., 50° C. to 90° C., 50° C. to 100° C., 60° C. to 70° C., 60° C. to 80° C., 60° C. to 90° C., 60° C. to 100° C., 70° C. to 80° C., 70° C. to 90° C., 70° C. to 100° C., 80° C. to 90° C., 80° C. to 100° C., 90° C. to 100° C.).

A set of capture conditions (e.g., test capture conditions) for a biological sample can include thermal permeabilization time. The thermal permeabilization time selected for a set of capture conditions for a biological sample can include, but is not limited to, thermal permeabilization times from 10 s to 300 m or more (e.g., 10 to 20 s, 10 to 30 s, 10 to 40 s, 10 to 50 s, 10 to 60 s, 20 to 30 s, 20 to 40 s, 20 to 50 s, 20 to 60 s, 30 to 40 s, 30 to 50 s, 30 to 60 s, 40 to 50 s, 40 to 60 s, 50 to 60 s, 1 to 2 min, 1 to 3 min, 1 to 4 min, 1 to 5 min, 1 to 6 min, 1 to 7 min, 1 to 8 min, 1 to 9 min, 1 to 10 min, 2 to 3 min, 2 to 4 min, 2 to 5 min, 2 to 6 min, 2 to 7 min, 2 to 8 min, 2 to 9 min, 2 to 10 min, 3 to 4 min, 3 to 5 min, 3 to 6 min, 3 to 7 min, 3 to 8 min, 3 to 9 min, 3 to 10 min, 4 to 5 min, 4 to 6 min, 4 to 7 min, 4 to 8 min, 4 to 9 min, 4 to 10 min, 5 to 6 min, 5 to 7 min, 5 to 8 min, 5 to 9 min, 5 to 10 min, 6 to 7 min, 6 to 8 min, 6 to 9 min, 6 to 10 min, 7 to 8 min, 7 to 9 min, 7 to 10 min, 8 to 9 min, 8 to 10 min, 9 to 10 min, 10 to 20 min, 10 to 30 min, 10 to 40 min, 10 to 50 min, 10 to 60 min, 20 to 30 min, 20 to 40 min, 20 to 50 min, 20 to 60 min, 30 to 40 min, 30 to 50 min, 30 to 60 min, 40 to 50 min, 40 to 60 min, 50 to 60 min, 60 to 90 min, 60 to 120 min, 60 to 180 min, 60 to 240 min, 60 to 300 min, 90 to 120 min, 90 to 180 min, 90 to 240 min, 90 to 300 min, 120 to 180 min, 120 to 240 min, 120 to 300 min, 180 to 240 min, 180 to 300 min, 240 to 300 min or more).

The set of capture conditions (e.g., test capture conditions) for a biological sample can include probe density. The probe density selected for a set of capture conditions for a biological sample can include, but is not limited to, probe densities greater than or equal to about 500 sites per 1 mm2. In some embodiments, the surface has a density of discrete sites of about 100, about 200, about 300, about 400, about 500, about 600, about 700, about 800, about 900, about 1,000, about 2,000, about 3,000, about 4,000, about 5,000, about 6,000, about 7,000, about 8,000, about 9,000, about 10,000, about 20,000, about 40,000, about 60,000, about 80,000, about 100,000, or about 500,000 sites per 1 mm2. In some embodiments, the surface has a density of discrete sites of at least about 200, at least about 300, at least about 400, at least about 500, at least about 600, at least about 700, at least about 800, at least about 900, at least about 1,000, at least about 2,000, at least about 3,000, at least about 4,000, at least about 5,000, at least about 6,000, at least about 7,000, at least about 8,000, at least about 9,000, at least about 10,000, at least about 20,000, at least about 40,000, at least about 60,000, at least about 80,000, at least about 100,000, or at least about 500,000 sites per 1 mm2.

The set of capture conditions (e.g., test capture conditions) for a biological sample can include capture sequences. The capture sequence selected for a set of capture conditions for a biological sample can include, but is not limited to, capture sequences including poly (T) nucleic acid sequences, poly (A) nucleic acid sequences, non-homopolymeric nucleic acid sequences, or a gene-specific nucleic acid sequence.

Exemplary Embodiments

Embodiment 1 is a method including: (a) contacting a biological sample with a plurality of capture probes, wherein a capture probe of the plurality includes a capture domain, wherein the capture domain is positioned at a 3' end of the capture probe; (b) releasing one or more target analyte(s) from the biological sample, wherein a target analyte released from the biological sample is specifically bound by the capture domain of the capture probe; (c) extending the 3' end of the capture probe using the bound target analyte as a template thereby creating an extended capture probe complementary to the bound target analyte; (d) adding to the 3' end of the extended capture probe a first homopolynucleotide sequence; (e) generating a second strand that includes in a 5' to a 3' direction: a conjugated first agent, a second homopolynucleotide sequence, and a sequence corresponding to a portion of the bound target analyte, wherein the first homopolynucleotide sequence hybridizes to the second homopolynucleotide sequence, and the step of generating the second strand includes the use of a partially-double stranded template switching oligonucleotide sensor including: (i) a first oligonucleotide including a conjugated second agent at its 3' end, (ii) a second oligonucleotide including the conjugated first agent at its 5' end and the second homopolynucleotide sequence at its 3' end, wherein the second oligonucleotide has a single-stranded overhang at its 3' end, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (f) measuring presence or absence of fluorescence upon release of the first oligonucleotide from the second oligonucleotide by extension of a 3' end of the first strand using the second oligonucleotide as a template.

Embodiment 2 is the method of embodiment 1, wherein the target analyte is RNA.

Embodiment 3 is the method of embodiment 2, wherein the RNA is an mRNA.

Embodiment 4 is the method of embodiment 1, wherein the target analyte is DNA.

Embodiment 5 is the method of embodiment 4, wherein the DNA is genomic DNA.

Embodiment 6 is the method of embodiment 5, wherein the genomic DNA includes a mutation or a single nucleotide polymorphism.

Embodiment 7 is the method of any one of embodiments 1-6, wherein the plurality of capture probes are attached to an array.

Embodiment 8 is the method of embodiment 7, wherein the array includes a slide.

Embodiment 9 is the method of embodiment 7, wherein the array is a bead array.

Embodiment 10 is the method of any one of embodiments 1-9, wherein the capture probe further includes a spatial barcode positioned 5' to the capture domain.

Embodiment 11 is the method of embodiment 10, further including determining (i) all or a portion of a nucleic acid sequence corresponding to the target analyte, or a complement thereof, and (ii) all or a portion of a nucleic acid sequence corresponding to the spatial barcode, or a complement thereof.

Embodiment 12 is the method of embodiment 11, further including using the determined sequences of (i) and (ii) to identify the location of the target analyte in the biological sample.

Embodiment 13 is the method of any one of embodiments 1-12, wherein the first conjugated agent is a fluorophore and the second conjugated agent is a fluorescence quencher.

Embodiment 14 is the method of any one of embodiments 1-12, wherein the first conjugated agent is a fluorescence quencher and the second conjugated agent is a fluorophore.

Embodiment 15 is the method of embodiment 13 or 14, wherein the fluorophore includes a xanthene moiety.

Embodiment 16 is the method of embodiment 13 or 14, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 17 is the method of any one of embodiments 13-16, wherein the quencher is a black hole quencher (BHQ).

Embodiment 18 is the method of any one of embodiments 13-16, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 19 is the method of any one of embodiments 1-12, wherein the first conjugated agent is a donor fluorophore and the second conjugated agent is an acceptor fluorophore.

Embodiment 20 is the method of any one of embodiments 1-12, wherein the first conjugated agent is an acceptor fluorophore and the second conjugated agent is a donor fluorophore.

Embodiment 21 is the method of any one of embodiments 1-20, wherein the biological sample is a tissue sample.

Embodiment 22 is the method of embodiment 21, wherein the tissue sample is a tissue section.

Embodiment 23 is the method of embodiment 22, wherein the tissue section is a fixed tissue section.

Embodiment 24 is the method of embodiment 23, wherein the fixed tissue section is a formalin-fixed paraffin-embedded tissue section.

Embodiment 25 is the method of embodiment 22, wherein the tissue section is a fresh, frozen tissue section.

Embodiment 26 is the method of any one of embodiments 1-25, wherein the first homopolynucleotide sequence is a poly (C) sequence and the second homopolynucleotide sequence is a poly (G) sequence.

Embodiment 27 is the method of any one of embodiments 1-25, wherein the first homopolynucleotide sequence is a poly (G) sequence and the second homopolynucleotide sequence is a poly (C) sequence.

Embodiment 28 is the method of any one of embodiments 1-25, wherein the first homopolynucleotide sequence is a poly (A) sequence and the second homopolynucleotide sequence is a poly (T) sequence.

Embodiment 29 is the method of any one of embodiments 1-25, wherein the first homopolynucleotide sequence is a poly (T) sequence and the second homopolynucleotide sequence is a poly (A) sequence.

Embodiment 30 is the method of any one of embodiments 1-29, wherein step (b) includes permeabilizing the biological sample.

Embodiment 31 is the method of any one of embodiments 1-30, further including comparing the measured presence or absence of fluorescence in step (f) to a control value.

Embodiment 32 is the method of embodiment 31, wherein the control value is fluorescence measured in a control method including performance of steps (a) through (f), except the control method differs in condition(s) and/or reagent(s) used to perform one or more of steps (a) through (f).

Embodiment 33 is the method of embodiment 32, wherein the control method utilizes different condition(s) to perform step (a).

Embodiment 34 is the method of embodiment 32, wherein the control method utilizes different condition(s) and/or reagent(s) to perform step (b).

Embodiment 35 is the method of embodiment 34, wherein the step (b) includes permeabilizing the biological sample.

Embodiment 36 is the method of embodiment 35, wherein the control method utilizes different condition(s) and/or reagent(s) for permeabilizing the biological sample.

Embodiment 37 is the method of embodiment 32, wherein the control method utilizes different condition(s) and/or reagent(s) to perform step (c).

Embodiment 38 is the method of embodiment 37, wherein the control method utilizes different enzyme(s) to perform step (c).

Embodiment 39 is the method of embodiment 32, wherein the control method utilizes different conditions and/or reagent(s) to perform step (d).

Embodiment 40 is the method of embodiment 39, wherein the control method utilizes different enzyme(s) to perform step (d).

Embodiment 41 is the method of embodiment 32, wherein the control method utilizes different condition(s) and/or reagent(s) to perform step (e).

Embodiment 42 is a reaction mixture including: (a) a plurality of capture probes, wherein a capture probe of the plurality includes a capture domain, wherein the capture domain is positioned at a 3' end of the capture probe; and (b) a partially-double stranded template switching oligonucleotide sensor including: (i) a first oligonucleotide including a conjugated first agent at its 3' end, (ii) a second oligonucleotide including a conjugated second agent at its 5' end and a homopolynucleotide sequence at its 3' end, wherein the second oligonucleotide has a single-stranded overhang at its 3' end, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Embodiment 43 is the reaction mixture of embodiment 42, wherein the plurality of capture probes are attached to an array.

Embodiment 44 is the reaction mixture of embodiment 43, wherein the array includes a slide.

Embodiment 45 is the reaction mixture of embodiment 43, wherein the array is a bead array.

Embodiment 46 is the reaction mixture of any one of embodiments 42-45, wherein the capture probe further includes a spatial barcode positioned 5' to the capture domain.

Embodiment 47 is the reaction mixture of any one of embodiments 42-46, wherein the first conjugated agent is a fluorophore and the second conjugated agent is a fluorescence quencher.

Embodiment 48 is the reaction mixture of any one of embodiments 42-46, wherein the first conjugated agent is a fluorescence quencher and the second conjugated agent is a fluorophore.

Embodiment 49 is the reaction mixture of embodiment 47 or 48, wherein the fluorophore includes a xanthene moiety.

Embodiment 50 is the reaction mixture of embodiment 47 or 48, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 51 is the reaction mixture of any one of embodiments 47-50, wherein the quencher is a black hole quencher (BHQ).

Embodiment 52 is the reaction mixture of any one of embodiments 47-50, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 53 is the reaction mixture of any one of embodiments 42-46, wherein the first conjugated agent is a donor fluorophore and the second conjugated agent is an acceptor fluorophore.

Embodiment 54 is the reaction mixture of any one of embodiments 42-46, wherein the first conjugated agent is an acceptor fluorophore and the second conjugated agent is a donor fluorophore.

Embodiment 55 is the reaction mixture of any one of embodiments 42-54, wherein the homopolynucleotide sequence is a poly (C) sequence.

Embodiment 56 is the reaction mixture of any one of embodiments 42-54, wherein the homopolynucleotide sequence is a poly (G) sequence.

Embodiment 57 is the reaction mixture of any one of embodiments 42-54, wherein the homopolynucleotide sequence is a poly (A) sequence.

Embodiment 58 is the reaction mixture of any one of embodiments 42-54, wherein the homopolynucleotide sequence is a poly (T) sequence.

Embodiment 59 is the reaction mixture of any one of embodiments 42-58, further including a terminal deoxynucleotidyl transferase.

Embodiment 60 is the reaction mixture of any one of embodiments 42-59, further including a reverse transcriptase.

Embodiment 61 is the reaction mixture of any one of embodiments 42-60, further including a DNA polymerase.

Embodiment 62 is a kit including: (a) a plurality of capture probes, wherein a capture probe of the plurality includes a capture domain, wherein the capture domain is positioned at a 3' end of the capture probe; and (b) a partially-double stranded template switching oligonucleotide sensor including: (i) a first oligonucleotide including a conjugated first agent at its 3' end, (ii) a second oligonucleotide including a conjugated second agent at its 5' end and a homopolynucleotide sequence at its 3' end, wherein the second oligonucleotide has a single-stranded overhang at its 3' end including the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Embodiment 63 is the kit of embodiment 62, wherein the plurality of capture probes are attached to an array.

Embodiment 64 is the kit of embodiment 63, wherein the array includes a slide.

Embodiment 65 is the kit of embodiment 63, wherein the array is a bead array.

Embodiment 66 is the kit of any one of embodiments 62-65, wherein the capture probe further includes a spatial barcode positioned 5' to the capture domain.

Embodiment 67 is the kit of any one of embodiments 62-66, wherein the first conjugated agent is a fluorophore and the second conjugated agent is a fluorescence quencher.

Embodiment 68 is the kit of any one of embodiments 62-66, wherein the first conjugated agent is a fluorescence quencher and the second conjugated agent is a fluorophore.

Embodiment 69 is the kit of embodiment 67 or 68, wherein the fluorophore includes a xanthene moiety.

Embodiment 70 is the kit of embodiment 67 or 68, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 71 is the kit of any one of embodiments 67-70, wherein the quencher is a black hole quencher (BHQ).

Embodiment 72 is the kit of any one of embodiments 67-70, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 73 is the kit of any one of embodiments 62-66, wherein the first conjugated agent is a donor fluorophore and the second conjugated agent is an acceptor fluorophore.

Embodiment 74 is the kit of any one of embodiments 62-66, wherein the first conjugated agent is an acceptor fluorophore and the second conjugated agent is a donor fluorophore.

Embodiment 75 is the kit of any one of embodiments 62-74, wherein the homopolynucleotide sequence is a poly (C) sequence.

Embodiment 76 is the kit of any one of embodiments 62-74, wherein the homopolynucleotide sequence is a poly (G) sequence.

Embodiment 77 is the kit of any one of embodiments 62-74, wherein the homopolynucleotide sequence is a poly (A) sequence.

Embodiment 78 is the kit of any one of embodiments 62-74, wherein the homopolynucleotide sequence is a poly (T) sequence.

Embodiment 79 is the kit of any one of embodiments 62-78, further including a terminal deoxynucleotidyl transferase.

Embodiment 80 is the kit of any one of embodiments 62-79, further including a reverse transcriptase.

Embodiment 81 is the kit of any one of embodiments 62-80, further including a DNA polymerase.

Embodiment 82 is a method including: (a) contacting a plurality of analyte capture agents to the biological sample, wherein an analyte capture agent of the plurality of analyte capture agents includes an analyte binding moiety barcode, an analyte capture sequence, and an analyte binding moiety that binds specifically to the target analyte; (b) contacting a biological sample with a plurality of capture probes, wherein a capture probe of the plurality includes a capture domain, wherein the capture domain that binds specifically to the analyte capture sequence, wherein the capture domain is positioned at a 3' end of the capture probe; (c) releasing one or more target analyte(s) from the biological sample, wherein the analyte capture sequence of the analyte capture agent selective bound to the target analyte released from the biological sample is specifically bound by the capture domain of the capture probe; (d) extending the 3' end of the capture probe using the analyte binding moiety barcode as a template; (e) adding to the 3' end of the capture probe a first homopolynucleotide sequence, thereby generating a first strand; (f) generating a second strand that includes in a 5' to a 3' direction: a conjugated first agent, a second homopolynucleotide sequence, and a sequence corresponding to the analyte binding moiety barcode, wherein the first homopolynucleotide sequence hybridizes to the second homopolynucleotide sequence, and the step of generating the second strand includes the use of a partially-double stranded template switching oligonucleotide sensor including: (i) a first oligonucleotide including a conjugated second agent at its 3' end, (ii) a second oligonucleotide including the conjugated first agent at its 5' end and the second homopolynucleotide sequence at its 3' end, wherein the second oligonucleotide has a single-stranded overhang at its 3' end including the second homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore; and (g) measuring presence or absence of fluorescence upon release of the first oligonucleotide from the second oligonucleotide by extension of a 3' end of the first strand using the second oligonucleotide as a template.

Embodiment 83 is the method of embodiment 82, wherein the target analyte is protein.

Embodiment 84 is the method of embodiment 83, wherein the protein is an intracellular protein.

Embodiment 85 is the method of embodiment 83, wherein the protein is an extracellular protein.

Embodiment 86 is the method of any one of embodiments 83-85, wherein the analyte binding moiety is an antibody or an antigen-binding fragment thereof.

Embodiment 87 is the method of any one of embodiments 82-86, wherein the plurality of capture probes are attached to an array.

Embodiment 88 is the method of embodiment 87, wherein the array includes a slide.

Embodiment 89 is the method of embodiment 87, wherein the array is a bead array.

Embodiment 90 is the method of any one of embodiments 82-89, wherein the capture probe further includes a spatial barcode positioned 5' to the capture domain.

Embodiment 91 is the method of embodiment 90, further including determining (i) all or a portion of a nucleic acid sequence corresponding to the analyte binding moiety barcode, or a complement thereof, and (ii) all or a portion of a nucleic acid sequence corresponding to the spatial barcode, or a complement thereof.

Embodiment 92 is the method of embodiment 91, further including using the determined sequences of (i) and (ii) to identify the location of the target analyte in the biological sample.

Embodiment 93 is the method of any one of embodiments 82-92, wherein the first conjugated agent is a fluorophore and the second conjugated agent is a fluorescence quencher.

Embodiment 94 is the method of any one of embodiments 82-92, wherein the first conjugated agent is a fluorescence quencher and the second conjugated agent is a fluorophore.

Embodiment 95 is the method of embodiment 93 or 94, wherein the fluorophore includes a xanthene moiety.

Embodiment 96 is the method of embodiment 93 or 94, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 97 is the method of any one of embodiments 93-96, wherein the quencher is a black hole quencher (BHQ).

Embodiment 98 is the method of any one of embodiments 93-96, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 99 is the method of any one of embodiments 82-92, wherein the first conjugated agent is a donor fluorophore and the second conjugated agent is an acceptor fluorophore.

Embodiment 100 is the method of any one of embodiments 82-92, wherein the first conjugated agent is an acceptor fluorophore and the second conjugated agent is a donor fluorophore.

Embodiment 101 is the method of any one of embodiments 82-100, wherein the biological sample is a tissue sample.

Embodiment 102 is the method of embodiment 101, wherein the tissue sample is a tissue section.

Embodiment 103 is the method of embodiment 102, wherein the tissue section is a fixed tissue section.

Embodiment 104 is the method of embodiment 103, wherein the fixed tissue section is a formalin-fixed paraffin-embedded tissue section.

Embodiment 105 is the method of embodiment 102, wherein the tissue section is a fresh, frozen tissue section.

Embodiment 106 is the method of any one of embodiments 82-105, wherein the first homopolynucleotide sequence is a poly (C) sequence and the second homopolynucleotide sequence is a poly (G) sequence.

Embodiment 107 is the method of any one of embodiments 82-105, wherein the first homopolynucleotide sequence is a poly (G) sequence and the second homopolynucleotide sequence is a poly (C) sequence.

Embodiment 108 is the method of any one of embodiments 82-105, wherein the first homopolynucleotide sequence is a poly (A) sequence and the second homopolynucleotide sequence is a poly (T) sequence.

Embodiment 109 is the method of any one of embodiments 82-105, wherein the first homopolynucleotide sequence is a poly (T) sequence and the second homopolynucleotide sequence is a poly (A) sequence.

Embodiment 110 is the method of any one of embodiments 82-109, wherein step (b) includes permeabilizing the biological sample.

Embodiment 111 is the method of any one of embodiments 82-110, further including comparing the measured presence or absence of fluorescence in step (g) to a control value.

Embodiment 112 is the method of embodiment 111, wherein the control value is fluorescence measured in a control method including performance of steps (a) through (g), except the control method differs in condition(s) and/or reagent(s) used to perform one or more of steps (a) through (g).

Embodiment 113 is the method of embodiment 112, wherein the control method utilizes different condition(s) to perform step (a).

Embodiment 114 is the method of embodiment 112, wherein the control method utilizes different condition(s) to perform step (b).

Embodiment 115 is the method of embodiment 112, wherein the control method utilizes different condition(s) and/or reagent(s) to perform step (c).

Embodiment 116 is the method of embodiment 115, wherein the step (c) includes permeabilizing the biological sample.

Embodiment 117 is the method of embodiment 116, wherein the control method utilizes different condition(s) and/or reagent(s) for permeabilizing the biological sample.

Embodiment 118 is the method of embodiment 112, wherein the control method utilizes different condition(s) and/or reagent(s) to perform step (d).

Embodiment 119 is the method of embodiment 118, wherein the control method utilizes different enzyme(s) to perform step (d).

Embodiment 120 is the method of embodiment 112, wherein the control method utilizes different conditions and/or reagent(s) to perform step (e).

Embodiment 121 is the method of embodiment 12-, wherein the control method utilizes different enzyme(s) to perform step (e).

Embodiment 122 is the method of embodiment 112, wherein the control method utilizes different condition(s) and/or reagent(s) to perform step (f).

Embodiment 123 is a reaction mixture including: (a) a plurality of analyte capture agents to the biological sample, wherein an analyte capture agent of the plurality of analyte capture agents includes an analyte binding moiety barcode, an analyte capture sequence, and an analyte binding moiety that binds specifically to the target analyte; (b) a plurality of capture probes, wherein a capture probe of the plurality includes a capture domain, wherein the capture domain binds specifically to the analyte capture sequence and the capture domain is positioned at a 3' end of the capture probe; and (c) a partially-double stranded template switching oligonucleotide sensor including: (i) a first oligonucleotide including a conjugated first agent at its 3' end, (ii) a second oligonucleotide including a conjugated second agent at its 5' end and a homopolynucleotide sequence at its 3' end, wherein the second oligonucleotide has a single-stranded overhang at its 3' end including the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Embodiment 124 is the reaction mixture of embodiment 123, wherein the plurality of capture probes are attached to an array.

Embodiment 125 is the reaction mixture of embodiment 124, wherein the array includes a slide.

Embodiment 126 is the reaction mixture of embodiment 124, wherein the array is a bead array.

Embodiment 127 is the reaction mixture of any one of embodiments 123-126, wherein the capture probe further includes a spatial barcode positioned 5' to the capture domain.

Embodiment 128 is the reaction mixture of any one of embodiments 123-127, wherein the first conjugated agent is a fluorophore and the second conjugated agent is a fluorescence quencher.

Embodiment 129 is the reaction mixture of any one of embodiments 123-127, wherein the first conjugated agent is a fluorescence quencher and the second conjugated agent is a fluorophore.

Embodiment 130 is the reaction mixture of embodiment 128 or 129, wherein the fluorophore includes a xanthene moiety.

Embodiment 131 is the reaction mixture of embodiment 128 or 129, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 132 is the reaction mixture of any one of embodiments 128-131, wherein the quencher is a black hole quencher (BHQ).

Embodiment 133 is the reaction mixture of any one of embodiments 128-131, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 134 is the reaction mixture of any one of embodiments 123-127, wherein the first conjugated agent is a donor fluorophore and the second conjugated agent is an acceptor fluorophore.

Embodiment 135 is the reaction mixture of any one of embodiments 123-127, wherein the first conjugated agent is an acceptor fluorophore and the second conjugated agent is a donor fluorophore.

Embodiment 136 is the reaction mixture of any one of embodiments 123-135, wherein the homopolynucleotide sequence is a poly (C) sequence.

Embodiment 137 is the reaction mixture of any one of embodiments 123-135, wherein the homopolynucleotide sequence is a poly (G) sequence.

Embodiment 138 is the reaction mixture of any one of embodiments 123-135, wherein the homopolynucleotide sequence is a poly (A) sequence.

Embodiment 139 is the reaction mixture of any one of embodiments 123-135, wherein the homopolynucleotide sequence is a poly (T) sequence.

Embodiment 140 is the reaction mixture of any one of embodiments 123-139, further including a terminal deoxynucleotidyl transferase.

Embodiment 141 is the reaction mixture of any one of embodiments 123-140, further including a reverse transcriptase.

Embodiment 142 is the reaction mixture of any one of embodiments 123-141, further including a DNA polymerase.

Embodiment 143 is a kit including: (a) a plurality of analyte capture agents to the biological sample, wherein an analyte capture agent of the plurality of analyte capture agents includes an analyte binding moiety barcode, an analyte capture sequence, and an analyte binding moiety that binds specifically to the target analyte; (b) a plurality of capture probes, wherein a capture probe of the plurality includes a capture domain, wherein the capture domain binds specifically to the analyte capture sequence and the capture domain is positioned at a 3' end of the capture probe; and (c) a partially-double stranded template switching oligonucleotide sensor including: (i) a first oligonucleotide including a conjugated first agent at its 3' end, (ii) a second oligonucleotide including a conjugated second agent at its 5' end and a homopolynucleotide sequence at its 3' end, wherein the second oligonucleotide has a single-stranded overhang at its 3' end including the homopolynucleotide sequence, and wherein: the first conjugated agent is a fluorophore and the second conjugated agent is a fluorescence quencher; the first conjugated agent is a fluorescence quencher and the second conjugated agent is a fluorophore; the first conjugated agent is a donor fluorophore and the second conjugated agent is an acceptor fluorophore; or the first conjugated agent is an acceptor fluorophore and the second conjugated agent is a donor fluorophore.

Embodiment 144 is the kit of embodiment 143, wherein the plurality of capture probes are attached to an array.

Embodiment 145 is the kit of embodiment 144, wherein the array includes a slide.

Embodiment 146 is the kit of embodiment 144, wherein the array is a bead array.

Embodiment 147 is the kit of any one of embodiments 143-146, wherein the capture probe further includes a spatial barcode positioned 5' to the capture domain.

Embodiment 148 is the kit of any one of embodiments 143-147, wherein the first conjugated agent is a fluorophore and the second conjugated agent is a fluorescence quencher.

Embodiment 149 is the kit of any one of embodiments 143-147, wherein the first conjugated agent is a fluorescence quencher and the second conjugated agent is a fluorophore.

Embodiment 150 is the kit of embodiment 148 or 149, wherein the fluorophore includes a xanthene moiety.

Embodiment 151 is the kit of embodiment 148 or 149, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

Embodiment 152 is the kit of any one of embodiments 148-151, wherein the quencher is a black hole quencher (BHQ).

Embodiment 153 is the kit of any one of embodiments 148-151, wherein the quencher is BBQ650, DDQ-1, DABCYL, ECLIPSE, IOWA BLACK FQ, IOWA BLACK RQ, IR Dye-QC1, BHQ-0, BHQ-1, BHQ-2, BHQ-3, QSY-7, or QSY-21.

Embodiment 154 is the kit of any one of embodiments 143-147, wherein the first conjugated agent is a donor fluorophore and the second conjugated agent is an acceptor fluorophore.

Embodiment 155 is the kit of any one of embodiments 143-147, wherein the first conjugated agent is an acceptor fluorophore and the second conjugated agent is a donor fluorophore.

Embodiment 156 is the kit of any one of embodiments 143-155, wherein the homopolynucleotide sequence is a poly (C) sequence.

Embodiment 157 is the kit of any one of embodiments 143-155, wherein the homopolynucleotide sequence is a poly (G) sequence.

Embodiment 158 is the kit of any one of embodiments 143-155, wherein the homopolynucleotide sequence is a poly (A) sequence.

Embodiment 159 is the kit of any one of embodiments 143-155, wherein the homopolynucleotide sequence is a poly (T) sequence.

Embodiment 160 is the kit of any one of embodiments 143-159, further including a terminal deoxynucleotidyl transferase.

Embodiment 161 is the kit of any one of embodiments 143-160, further including a reverse transcriptase.

Embodiment 162 is the kit of any one of embodiments 143-161, further including a DNA polymerase.

Embodiment 163 is a method for detecting capture of a nucleic acid from a biological sample, the method including: (a) migrating a nucleic acid from a biological sample towards a substrate using electrophoresis; (b) capturing the nucleic acid on the substrate, wherein the substrate includes a plurality of capture probes, wherein a capture probe of the plurality of capture probes includes a capture domain that binds specifically to the nucleic acid to form a duplex; (c) contacting the complex with an intercalating dye to form an intercalated duplex; and (d) detecting the intercalated duplex using total internal fluorescence microscopy, thereby detecting capture of the nucleic acid from the biological sample, wherein the capture probe further includes one or both of a spatial barcode and a unique molecular identifier.

Embodiment 164 is a method for detecting nucleic acid migration from a biological sample to a substrate, the method including: (a) migrating a nucleic acid from a biological sample towards a substrate using electrophoresis; (b) capturing the nucleic acid on the substrate, wherein the substrate includes a plurality of capture probes, wherein a capture probe of the plurality of capture probes includes a capture domain that binds specifically to the nucleic acid to form a duplex; (c) contacting the complex with an intercalating dye to form an intercalated duplex; and (d) detecting the intercalated duplex using total internal fluorescence microscopy, thereby detecting analyte migration from the biological sample to the substrate, wherein the capture probe further includes one or both of a spatial barcode and a unique molecular identifier.

Embodiment 165 is the method of embodiment 163 or 164, wherein the intercalating dye includes berberine, ethidium bromide, proflavine, daunomycin, doxorubicin, propidium iodide, 4×1',6×1-diamidino-2×1-phenylindole, oxazole yellow, SYBR Green, or thalidomide.

Embodiment 166 is the method of any one of embodiments 163-165, wherein the total internal reflection fluorescence microscopy is objective-based.

Embodiment 167 is the method of any one of embodiments 163-165, wherein the total internal reflection fluorescence microscopy is prism-based.

Embodiment 168 is the method of any one of embodiments 163-167, wherein the total internal reflection fluorescence microscopy method uses an inverted objective.

Embodiment 169 is the method of any one of embodiments 163-168, wherein the method further includes selecting a set of permeabilization conditions for biological samples similar to the biological sample, based on the detecting in (d).

Embodiment 170 is the method of any one of embodiments 163-169, wherein the method further includes selecting a set of capture conditions for biological samples similar to the biological sample, based on the detecting in (d).

Embodiment 171 is the method of any one of embodiments 163-170, wherein the nucleic acid includes single-stranded DNA or single stranded RNA.

Embodiment 172 is the method of embodiment 171, wherein the single-stranded RNA is mRNA.

Embodiment 173 is the method of embodiment 171, wherein the single-stranded DNA is genomic DNA.

Embodiment 174 is a method for detecting capture of an analyte from a biological sample, the method including: (a) capturing an analyte from a biological sample on a substrate including a plurality of capture probes, wherein a capture probe of the plurality of capture probes includes a capture domain that binds specifically to the analyte to form a complex; (b) contacting the complex with a detectable agent that binds specifically to the complex; and (c) detecting the detectable agent specifically bound to the complex, thereby detecting capture of the analyte from the biological sample, wherein the capture probe further includes one or both of a spatial barcode and a unique molecular identifier.

Embodiment 175 is a method for detecting analyte migration from a biological sample to a substrate, the method including: (a) capturing an analyte from a biological sample on a substrate including a plurality of capture probes, wherein a capture probe of the plurality of capture probes includes a capture domain that binds specifically to the analyte to form a complex; (b) contacting the complex with a detectable agent that binds specifically to the complex; and (c) detecting the detectable agent specifically bound to the complex, thereby detecting analyte migration from the biological sample to the substrate, wherein the capture probe further includes one or both of a spatial barcode and a unique molecular identifier Embodiment 176 is the method of embodiment 174 or 175, wherein the detectable agent is an intercalating dye.

Embodiment 177 is the method of embodiment 176, wherein the intercalating dye includes berberine, ethidium bromide, proflavine, daunomycin, doxorubicin, propidium iodide, 4',6-diamidino-2-phenylindole, oxazole yellow, SYBR Green, or thalidomide.

Embodiment 178 is the method of embodiment 174 or 175, wherein the detectable agent includes an antibody or an antigen-binding fragment thereof.

Embodiment 179 is the method of embodiment 178, wherein the detectable agent further includes a fluorophore.

Embodiment 180 is the method of embodiment 179, wherein the fluorophore includes 7-AAD (7-Aminoactinomycin D), Acridine Orange (+DNA), Acridine Orange (+RNA), Alexa Fluor® 35×10×1, Alexa Fluor® 43×10×1, Alexa Fluor® 48×18×1, Alexa Fluor® 53×12×1, Alexa Fluor® 54×16×1, Alexa Fluor® 55×15×1, Alexa Fluor® 56×18×1, Alexa Fluor® 59×14×1, Alexa Fluor® 63×13×1, Alexa Fluor® 64×17×1, Alexa Fluor® 66×10×1, Alexa Fluor® 68×10×1, Alexa Fluor® 70×10×1, Alexa Fluor® 75×10×1, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPYR 53×10×1/55×10×1, BODIPY® 55×18×1/56×18×1, BODIPY® 56×14×1/57×10×1, BODIPY® 58×11×1/59×11×1, BODIPY® 63×10×1/65×10×1-X, BODIPY® 65×10×1-66×15×1-X, BTC, Calcein, Calcein Blue, Calcium Crimson™, Calcium Green-1™, Calcium Orange™, Calcofluor® White, 5-Carboxyfluorescein (5-FAM), 5-Carboxynaphthofluoroscein, 6-Carboxyrhodamine 6G, 5-Carboxytetramethylrhodamine (5-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DiA (4-Di-16×1-ASP), DiD (DilC18×1 (5)), DIDS, Dil (DilC18×1 (3)), DiO (DiOC18×1 (3)), DiR (DilC18×1 (7)), Di-4 ANEPPS, Di-8 ANEPPS, DM-NERF (4.5-6.5 pH), DsRed (Red Fluorescent Protein), EBFP, ECFP, EGFP, ELF®-97×1 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43×1, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33×13×14×12 & 33×12×15×18, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 75×11×1 (+DNA), LDS 75×11×1 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 48×18×1, Oregon Green® 50×10×1, Oregon Green® 51×14×1, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26×1, PKH67×1, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R67×10×1 (PE-Cy5), Red 61×13×1 (PE-Texas Red), Red Fluorescent Protein (DsRed), Resorufin, RH 41×14×1, Rhod-2, Rhodamine B, Rhodamine Green™, Rhodamine Red™, Rhodamine Phalloidin, Rhodamine 11×10×1, Rhodamine 12×13×1, 5-ROX (carboxy-X-rhodamine), S65×1A, S65×1C, S65×1L, S65×1T, SBFI, SITS, SNAFL®-1 (high pH), SNAFL®-2, SNARFR-1 (high pH), SNARF®-1 (low pH), Sodium Green™, SpectrumAqua®, SpectrumGreen® #1, SpectrumGreen® #2, SpectrumOrange®, SpectrumRed®, SYTOR 11×1, SYTOR 13×1, SYTOR 17×1, SYTOR 45×1, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 78×11×1, X-Rhodamine (XRITC), Y66×1F, Y66×1H, Y66×1 W, YFP (Yellow Fluorescent Protein), YOYO®-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX61×15×1, ATTO 48×18×1, ATTO 53×12×1, ATTO 55×10×1, ATTO 56×15×1, ATTO Rho10×11×1, ATTO 59×10×1, ATTO 63×13×1, ATTO 64×17×1N, TYE 56×13×1, TYE 66×15×1, TYE 70×15×1, 5' IRDye® 70×10×1, 5' IRDye® 80×10×1, 5' IRDye® 80×10×1CW (NHS Ester), WellRED D4 Dye, WellRED D3 Dye, WellRED D2 Dye, Lightcycler® 64×10×1 (NHS Ester), or Dy 75×10×1 (NHS Ester).

Embodiment 181 is the method of any one of embodiments 174-180, wherein electrophoresis is used to migrate the analyte from the biological sample towards the substrate.

Embodiment 182 is the method of any one of embodiments 174-181, wherein the detecting in (c) is performed by detecting fluorescence emission.

Embodiment 183 is the method of any one of embodiments 174-182, wherein the detecting in (c) is performed using total internal reflection fluorescence microscopy.

Embodiment 184 is the method of embodiment 183, wherein the total internal reflection fluorescence microscopy is objective-based.

Embodiment 185 is the method of embodiment 183, wherein the total internal reflection fluorescence microscopy is prism-based.

Embodiment 186 is the method of any one of embodiments 183-185, wherein the total internal reflection fluorescence microscopy method uses an inverted objective.

Embodiment 187 is the method of any one of embodiments 174-186, wherein the analyte includes single-stranded DNA or single-stranded RNA.

Embodiment 188 is the method of embodiment 187, wherein the single-stranded RNA is mRNA.

Embodiment 189 is the method of embodiment 187, wherein the single-stranded DNA is genomic DNA.

Embodiment 190 is the method of any one of embodiments 163-189, wherein the capture probe includes DNA.

Embodiment 191 is the method of embodiment 190, wherein the capture domain includes a poly (T) sequence.

Embodiment 192 is the method of embodiment 190, wherein the capture domain includes a gene-specific capture sequence.

Embodiment 193 is the method of any one of embodiments 163-192, wherein the capture probe further includes a cleavage domain between the substrate and the spatial barcode.

Embodiment 194 is the method of any one of embodiments 163-193, wherein the substrate further includes a signal control region, wherein the signal control region includes one or more detectable marker(s) in known concentration(s).

Embodiment 195 is the method of embodiment 194, wherein the one or more detectable marker(s) of the signal control region include(s) a fluorophore.

Embodiment 196 is the method of embodiment 194 or 195, wherein the one or more detectable marker(s) include(s) the detectable agent.

Embodiment 197 is the method of any one of embodiments 163-196, wherein the substrate further includes a positive control region including a plurality of positive control probes, wherein a positive control probe of the plurality of positive control probes includes (i) a capture domain specifically bound to a positive control analyte to form a positive control complex.

Embodiment 198 is the method of embodiment 197, wherein the detectable agent binds specifically to the positive control complex.

Embodiment 199 is the method of any one of embodiments 163-198, wherein the substrate further includes a negative control region wherein: the negative control region includes a plurality of negative control probes, wherein a negative control probe of the plurality of negative control probes lacks a capture domain that binds specifically to the analyte, the negative control region does not include a capture probe, or the negative control region includes a second plurality of capture probes, wherein a capture probe of the second plurality of capture probes includes a capture domain that binds specifically to the analyte to form a complex, and the negative control region corresponds to a location where little or no analyte has been released from the biological sample.

Embodiment 200 is the method of any one of embodiments 163-199, including permeabilizing the biological sample prior to step (a).

Embodiment 201 is the method of embodiment 200, wherein the location in the biological sample corresponding to the negative control region is not permeabilized.

Embodiment 202 is the method of embodiment 200 or 201, wherein the permeabilizing includes the use of a permeabilization reagent, wherein the permeabilization reagent includes one or more of: an organic solvent, a detergent, and an enzyme.

Embodiment 203 is the method of embodiment 202, wherein the organic solvent includes acetone, ethanol, or methanol.

Embodiment 204 is the method of embodiment 202, wherein the detergent includes a saponin, a polyethylene oxide surfactant, a polysorbate surfactant, or sodium dodecyl sulfate (SDS).

Embodiment 205 is the method of embodiment 202, wherein the enzyme includes trypsin or proteinase K.

Embodiment 206 is the method of embodiment any one of embodiments 200-205, wherein the permeabilizing includes the use of electroporation, mechanical permeabilization, acoustic permeabilization, or thermal permeabilization.

Embodiment 207 is the method of any one of embodiments 174-206, wherein the method further includes selecting a set of permeabilization conditions for biological samples similar to the biological sample, based on the detecting in (c).

Embodiment 208 is the method of any one of embodiments 174-207, wherein the method further includes selecting a set of capture conditions for biological samples similar to the biological sample, based on the detecting in (c).

Embodiment 209 is the method of embodiment 174 or 175, wherein the analyte includes a protein.

Embodiment 210 is the method of embodiment 209, wherein the analyte includes the protein specifically bound by an analyte capture agent including (i) an analyte binding moiety that binds specifically to the protein, (ii) an analyte binding moiety barcode, and (ii) an analyte capture sequence that specifically binds to the capture domain of the capture probe to form a complex.

Embodiment 211 is the method of embodiment 210, wherein the analyte binding moiety is an antibody or an antigen-binding fragment thereof.

Embodiment 212 is the method of any one of embodiments 163-211, wherein the biological sample is a tissue sample.

Embodiment 213 is the method of embodiment 212, wherein the tissue sample is a tissue section.

Embodiment 214 is the method of embodiment 213, wherein the tissue section is a fixed tissue section.

Embodiment 215 is the method of embodiment 214, wherein the fixed tissue section is a formalin-fixed paraffin-embedded tissue section.

Embodiment 216 is the method of any one of embodiments 163-215, wherein the substrate includes a slide.

Embodiment 217 is the method of any one of embodiments 163-216, wherein the substrate includes a bead.

Embodiment 218 is a method for detecting capture of an analyte from a biological sample, the method including: (a) adding a first label to an analyte from a biological sample; (b) capturing the analyte on a substrate including a plurality of capture probes, wherein a capture probe of the plurality of capture probes includes (i) a capture domain that binds specifically to the analyte and (ii) a second label; and (c) detecting the association of the first label and the second label, thereby detecting capture of the analyte from the biological sample, wherein the capture probe further includes one or both of a spatial barcode and a unique molecular identifier.

Embodiment 219 is a method for detecting analyte migration from a biological sample to a substrate, the method including: (a) adding a first label to an analyte from a biological sample; (b) capturing the analyte on a substrate including a plurality of capture probes, wherein a capture probe of the plurality of capture probes includes (i) a capture domain that binds specifically to the analyte and (ii) a second label; and (c) detecting an amount of association of the first label and the second label, thereby detecting analyte migration from a biological sample to the substrate, wherein the capture probe further includes one or both of a spatial barcode and a unique molecular identifier.

Embodiment 220 is the method of embodiment 218 or 219, wherein the first label is a fluorophore and the second label is a quencher.

Embodiment 221 is the method of embodiment 218 or 219, wherein the first label is a quencher and the second label is a fluorophore.

Embodiment 222 is the method of embodiment 218 or 219, wherein the first label is a donor fluorophore and the second label is an acceptor fluorophore.

Embodiment 223 is the method of embodiment 218 or 219, wherein the first label is an acceptor fluorophore and the second label is the donor fluorophore.

Embodiment 224 is the method of any one of embodiments 218-223, wherein electrophoresis is used to migrate the analyte from the biological sample towards the substrate.

Embodiment 225 is the method of any one of embodiments 218-224, wherein the detecting in (c) is performed by detecting fluorescence emission.

Embodiment 226 is the method of any one of embodiments 218-225, wherein the detecting in (c) is performed using total internal reflection fluorescence microscopy.

Embodiment 227 is the method of embodiment 226, wherein the total internal reflection fluorescence microscopy is objective-based.

Embodiment 228 is the method of embodiment 226, wherein the total internal reflection fluorescence microscopy is prism-based.

Embodiment 229 is the method of any one of embodiments 227-228, wherein the total internal reflection fluorescence microscopy method uses an inverted objective.

Embodiment 230 is the method of any one of embodiments 218-229, wherein the analyte includes single-stranded DNA or single-stranded RNA.

Embodiment 231 is the method of embodiment 230, wherein the single-stranded RNA is mRNA.

Embodiment 232 is the method of embodiment 230, wherein the single-stranded DNA is genomic DNA.

Embodiment 233 is the method of any one of embodiments 218-232, wherein the capture probe includes DNA.

Embodiment 234 is the method of embodiment 233, wherein the capture domain includes a poly (T) sequence.

Embodiment 235 is the method of embodiment 233, wherein the capture domain includes a gene-specific capture sequence.

Embodiment 236 is the method of any one of embodiments 218-235, wherein the capture probe further includes a cleavage domain between the substrate and the spatial barcode.

Embodiment 237 is the method of any one of embodiments 218-236, wherein the substrate further includes a signal control region including one or more detectable marker(s) in known concentration(s).

Embodiment 238 is the method of embodiment 237, wherein the one or more detectable marker(s) of the signal control region include(s) a fluorophore.

Embodiment 239 is the method of embodiment 237 or 238, wherein the one or more detectable marker(s) of the signal control region is one or more copies of the first label.

Embodiment 240 is the method of any one of embodiments 237-239, wherein the one or more detectable marker(s) of the signal control region is one or more copies of the second label.

Embodiment 241 is the method of any one of embodiments 218-240, wherein the substrate further includes a positive control region including a plurality of positive control probes, wherein a positive control probe of the plurality of positive control probes includes (i) a capture domain bound specifically to a positive control analyte and (ii) the second detectable label, wherein the positive control analyte includes the first detectable label.

Embodiment 242 is the method of any one of embodiments 218-241, wherein the substrate further includes a negative control region, wherein: the negative control region includes a plurality of negative control probes, wherein a negative control probe of the plurality of negative control probes includes the second detectable label and the negative control probe lacks a capture domain that binds specifically to the analyte, the negative control region does not include a capture probe, or the negative control region includes a second plurality of capture probes, wherein a capture probe of the second plurality of capture probes includes (i) a capture domain that binds specifically to the analyte and (ii) the second label, and the negative control region corresponds to a location where little or no analyte has been released from the biological sample.

Embodiment 243 is the method of embodiment 242, wherein the location where little or no analyte has been released from the biological sample corresponds to a location in the biological sample that has not been permeabilized.

Embodiment 244 is the method of any one of embodiments 218-243, including permeabilizing the biological sample prior to step (a).

Embodiment 245 is the method of embodiment 244, wherein the location in the biological sample corresponding to the negative control region is not permeabilized.

Embodiment 246 is the method of embodiment 244 or 245, wherein the permeabilizing includes the use of a permeabilization reagent, wherein the permeabilization reagent includes one or more of: an organic solvent, a detergent, and an enzyme.

Embodiment 247 is the method of embodiment 246, wherein the organic solvent includes acetone, ethanol, or methanol.

Embodiment 248 is the method of embodiment 246, wherein the detergent includes a saponin, a polyethylene oxide surfactant, a polysorbate surfactant, or sodium dodecyl sulfate (SDS).

Embodiment 249 is the method of embodiment 246, wherein the enzyme includes trypsin or proteinase K.

Embodiment 250 is the method of any one of embodiments 244-249, wherein permeabilizing includes the use of electroporation, mechanical permeabilization, acoustic permeabilization, or thermal permeabilization.

Embodiment 251 is the method of any one of embodiments 218-251, wherein the method further includes selecting a set of permeabilization conditions for biological samples similar to the biological sample, based on the detecting in (c).

Embodiment 252 is the method of any one of embodiments 218-251, wherein the method further includes selecting a set of capture conditions for biological samples similar to the biological sample, based on the detecting in (c).

Embodiment 253 is the method of embodiment 218 or 219, wherein the analyte includes a protein.

Embodiment 254 is the method of embodiment 253, wherein the analyte includes the protein from the biological sample specifically bound by an analyte capture agent including (i) an analyte binding moiety that binds specifically to the protein, (ii) an analyte binding moiety barcode, and (ii) an analyte capture sequence that specifically binds to the capture domain of the capture probe, wherein the analyte capture sequence includes the second label.

Embodiment 255 is the method of embodiment 254, wherein the analyte binding moiety is an antibody or an antigen-binding fragment thereof.

Embodiment 256 is the method of any one of embodiments 218-255, wherein the biological sample is a tissue sample.

Embodiment 257 is the method of embodiment 256, wherein the tissue sample is a tissue section.

Embodiment 258 is the method of embodiment 257, wherein the tissue section is a fixed tissue section.

Embodiment 259 is the method of embodiment 258, wherein the fixed tissue section is a formalin-fixed paraffin-embedded tissue section.

Embodiment 260 is the method of any one of embodiments 218-259, the substrate includes a slide.

Embodiment 261 is the method of any one of embodiments 227-260, wherein the substrate includes a bead.

Embodiment 262 is a method for detecting the capture of an analyte from a biological sample, the method including: (a) capturing an analyte from a biological sample on a substrate including a plurality of capture probes, wherein a capture probe of the plurality of capture probes includes a capture domain that binds specifically to the analyte to form a complex; (b) detecting the complex, thereby detecting capture of the analyte from the biological sample, wherein detecting the complex does not include the use of a fluorophore, wherein the capture probe further includes one or both of a spatial barcode and a unique molecular identifier.

Embodiment 263 is a method for detecting analyte migration from a biological sample to a substrate, the method including: (a) capturing an analyte from a biological sample on a substrate including a plurality of capture probes, wherein a capture probe of the plurality of capture probes includes a capture domain that binds specifically to the analyte to form a complex; (b) detecting an amount of the complex, thereby detecting analyte migration from the biological sample to the array, wherein detecting the amount of the complex does not include the use of a fluorophore, wherein the capture probe further includes one or both of a spatial barcode and a unique molecular identifier.

Embodiment 264 is the method of embodiment 262 or 263, wherein electrophoresis is used to drive the analyte from the biological sample towards the substrate.

Embodiment 265 is the method of any one of embodiments 262-264, wherein the detecting in (b) includes the use of surface plasmon resonance.

Embodiment 266 is the method of embodiment 265, wherein the surface plasmon resonance utilizes the Otto configuration.

Embodiment 267 is the method of embodiment 265, wherein the surface plasmon resonance utilizes the Kretschmann configuration.

Embodiment 268 is the method of any one of embodiments 262-267, wherein the analyte includes single-stranded DNA or single-stranded RNA.

Embodiment 269 is the method of embodiment 268, wherein the single-stranded RNA is mRNA.

Embodiment 270 is the method of embodiment 268, wherein the single-stranded DNA is genomic DNA.

Embodiment 271 is the method of any one of embodiments 262-270, wherein the capture probe includes DNA.

Embodiment 272 is the method of embodiment 271, wherein the capture domain includes a poly (T) sequence.

Embodiment 273 is the method of embodiment 271, wherein the capture domain includes a gene-specific capture sequence.

Embodiment 274 is the method of any one of embodiments 262-273, wherein the capture probe further includes a cleavage domain between the substrate and the spatial barcode.

Embodiment 275 is the method of any one of embodiments 262-274, wherein the substrate further includes a signal control region including one or more detectable marker(s) in known concentration(s).

Embodiment 276 is the method of any one of embodiments 262-275, wherein the substrate further includes a positive control region including a plurality of positive control probes, wherein a positive control probe of the plurality of positive control probes includes a capture domain that can specifically bind to a positive control analyte to form a positive control complex.

Embodiment 277 is the method of any one of embodiments 262-276, wherein: the substrate further includes a negative control region, wherein: the negative control region includes a plurality of negative control probes, and wherein a negative control probe of the plurality of negative control probes lacks a capture domain that can bind specifically to the analyte, the negative control region does not include a capture probe, or the negative control region includes a second plurality of capture probes, wherein a capture probe of the second plurality of capture probes includes a capture domain that binds specifically to the analyte to form a complex, and the negative control region corresponds to a location where little or no analyte has been released from the biological sample.

Embodiment 278 is the method of any one of embodiments 262-277, further including permeabilizing the biological sample prior to step (a).

Embodiment 279 is the method of embodiment 278, wherein the location in the biological sample corresponding to the negative control region is not permeabilized.

Embodiment 280 is the method of embodiment 278 or 279, wherein the permeabilizing includes the use of a permeabilization reagent, wherein the permeabilization reagent includes one or more of: an organic solvent, a detergent, and an enzyme.

Embodiment 281 is the method of embodiment 280, wherein the organic solvent includes acetone, ethanol, or methanol.

Embodiment 282 is the method of embodiment 280, wherein the detergent includes a saponin, a polyethylene oxide surfactant, a polysorbate surfactant, or sodium dodecyl sulfate (SDS).

Embodiment 283 is the method of embodiment 280, wherein the enzyme includes trypsin or proteinase K.

Embodiment 284 is the method of embodiment any one of embodiments 262-283, wherein the permeabilizing includes the use of electroporation, mechanical permeabilization, acoustic permeabilization, or thermal permeabilization.

Embodiment 285 is the method of any one of embodiments 262-284, wherein the method further includes selecting a set of permeabilization conditions for biological samples similar to the biological sample, based on the detecting in (b).

Embodiment 286 is the method of any one of embodiments 262-285, wherein the method further includes selecting a set of capture conditions for biological samples similar to the biological sample, based on the detecting in (b).

Embodiment 287 is the method of embodiment 262 or 263, wherein the analyte includes a protein.

Embodiment 288 is the method of embodiment 287, wherein the analyte includes the protein specifically bound by an analyte capture agent including (i) an analyte binding moiety that binds specifically to the protein, (ii) an analyte binding moiety barcode, and (ii) an analyte capture sequence that specifically binds to the capture domain of the capture probe to form a complex.

Embodiment 289 is the method of embodiment 288, wherein the analyte binding moiety is an antibody or an antigen-binding fragment thereof.

Embodiment 290 is the method of any one of embodiments 262-289, wherein the biological sample is a tissue sample.

Embodiment 291 is the method of embodiment 290, wherein the tissue sample is a tissue section.

Embodiment 292 is the method of embodiment 291, wherein the tissue section is a fixed tissue section.

Embodiment 293 is the method of embodiment 292, wherein the fixed tissue section is a formalin-fixed paraffin-embedded tissue section.

Embodiment 294 is the method of any one of embodiments 262-293, wherein the substrate includes a slide.

Embodiment 295 is the method of any one of embodiments 262-294, wherein the substrate includes a bead.

Embodiment 296 is a method for selecting a set of capture conditions for a biological sample, the method including: (a) applying a first set of test capture conditions to a first portion of a biological sample, wherein the first set of test capture conditions results in the release of an analyte from the first portion of the biological sample; (b) capturing the analyte released from the first portion of the biological sample on a substrate including a plurality of capture probes, wherein a capture probe of the plurality of capture probes includes a capture domain that specifically binds the analyte released from the first portion of the biological sample to form a complex; (c) contacting the complex in step (b) with a detectable agent that specifically binds to the complex; (d) detecting an amount of the detectable agent specifically bound to the complex in (c); (e) applying a second set of test capture conditions to a second portion of a biological sample, wherein the second set of test capture conditions results in the release of the analyte from the second portion of the biological sample; (f) capturing the analyte released from the second portion of the biological sample on a substrate including a plurality of capture probes, wherein a capture probe of the plurality of capture probes includes a capture domain that specifically binds to the analyte released from the second portion of the biological sample to form a complex; (g) contacting the complex in step (f) with the detectable agent that specifically binds to the complex; (h) detecting an amount of the detectable agent specifically bound to the complex in (g); and (i) selecting the first or second set of test capture conditions based on a comparison of the amounts of the detectable agent specifically bound to the complex in steps (d) and (h).

Embodiment 297 is a method for selecting a set of capture conditions for a biological sample, the method including: (a) applying a first set of test capture conditions to a first portion of a biological sample, wherein the first set of test capture conditions results in the release of an analyte from the first portion of the biological sample; (b) adding a first label to the analyte released from the first portion of the biological sample; (c) capturing the analyte released from the first portion of the biological sample on a substrate including a plurality of capture probes, wherein a capture probe of the plurality of capture probes includes (i) a capture domain that specifically binds to the analyte released from the first portion of the biological sample and (ii) a second label; (d) detecting the association of the first label and the second label; (e) applying a second set of test capture conditions to a second portion of the biological sample, wherein the second set of test capture conditions results in the release of the analyte from the second portion of the biological sample; (f) adding the first label to the analyte released from the second portion of the biological sample; (g) capturing the analyte released from the second portion of the biological sample on a substrate including a plurality of capture probes, wherein a capture probe of the plurality of labeled capture probes includes (i) a capture domain that binds specifically to the analyte released from the second portion of the biological sample and (ii) the second label; (h) detecting the association of the first label and the second label; and (i) selecting the first or second set of test capture conditions based on a comparison of the association of the first label and the second label detected in steps (d) and (h).

Embodiment 298 is a method for selecting a set of capture conditions for a biological sample, the method including: (a) applying a first set of test capture conditions to a first portion of a biological sample, wherein the first set of test capture conditions results in the release of an analyte from the first portion of the biological sample; (b) capturing the analyte released from the first portion of the biological sample on a substrate including a plurality of capture probes, wherein a capture probe of the plurality of capture probes includes a capture domain that binds specifically to the analyte released from the first portion of the biological sample to form a complex; (c) detecting a first level of the complex of step (b), wherein the detecting of the first level of the complex does not include the use of a fluorophore; (d) applying a second set of test capture conditions to a second portion of a biological sample, wherein the second set of test capture conditions results in the release of the analyte from the second portion of the biological sample; (e) capturing the analyte released from the second portion of the biological sample on a substrate including a plurality of capture probes, wherein a capture probe of the plurality of capture probes includes a capture domain that binds specifically to the analyte released from the second portion of the biological sample to form a complex; (f) detecting a second level of the complex of step (e), wherein the detecting of the second level of the complex does not include the use of a fluorophore; and (g) selecting the first or second set of test capture conditions based on a comparison of the first level of the complex detected in step (c) and the second level of the complex detected in step (f).

Embodiment 299 is the method of any one of embodiments 291-298, wherein electrophoresis is used to drive the analyte released from the first portion and/or the second portion of the biological sample towards the substrate.

Embodiment 300 is the method of any one of embodiments 296-299, wherein the capture probe of the plurality of capture probes used to capture the analyte released from the first portion of the biological sample further includes: a spatial barcode, a unique molecular identifier, or the spatial barcode and the unique molecular identifier.

Embodiment 301 is the method of any one of embodiments 296-300, wherein the capture probe of the plurality of capture probes used to capture the analyte released from the second portion of the biological sample further includes: a spatial barcode, a unique molecular identifier, or the spatial barcode and the unique molecular identifier.

Embodiment 302 is the method of any one of embodiments 296-301, wherein the substrate further includes a positive control region including a plurality of positive control probes, wherein a positive control probe of the plurality of positive control probes can specifically bind to a positive control analyte to form a positive control complex.

Embodiment 303 is the method of any one of embodiments 296-302, wherein the substrate further includes a negative control region, wherein: the negative control region includes a plurality of negative control probes, and wherein a negative control probe of the plurality of negative control probes lacks a capture domain that can bind specifically to the analyte released from the first or second portion of the biological sample, the negative control region includes no capture probes, or the negative control region includes a second plurality of capture probes, wherein a capture probe of the second plurality of capture probes includes capture domain that can bind specifically to the analyte released from the first or second portion of the biological sample, and the negative control region corresponds to a location where little or no analyte has been released from the first or second portion of the biological sample.

Embodiment 304 is the method of any one of embodiments 296-303, wherein the first or second set of test capture conditions include a permeabilization reagent, wherein the permeabilization reagent includes one or more of: an organic solvent, a detergent, and an enzyme.

Embodiment 305 is the method of embodiment 304, wherein the organic solvent includes acetone, ethanol, or methanol.

Embodiment 306 is the method of embodiment 304, wherein the detergent includes a saponin, a polyethylene oxide surfactant, a polysorbate surfactant, or sodium dodecyl sulfate (SDS).

Embodiment 307 is the method of embodiment 304, wherein the enzyme includes trypsin or proteinase K.

Embodiment 308 is the method of embodiment any one of embodiments 296-307, wherein the first or second set of test capture conditions include the use of electroporation, mechanical permeabilization, acoustic permeabilization, or thermal permeabilization.

Embodiment 309 is the method of any one of embodiments 296-308, wherein the first set of test capture conditions and the second set of test capture conditions differ in temperature of permeabilization.

Embodiment 310 is the method of any one of embodiments 296-309, wherein the first set of test capture conditions and the second set of test capture conditions differ in duration of exposure to the test capture conditions.

Embodiment 311 is the method of any one of embodiments 296-310, wherein the first set of test capture conditions and the second set of test capture conditions differ in identity of one or more of: organic solvent, detergent, and enzyme.

Embodiment 312 is the method of any one of embodiments 296-311, wherein the first set of test capture conditions and the second set of test capture conditions differ in concentration of one or more of: organic solvent, detergent, and enzyme.

Embodiment 313 is the method of any one of embodiments 296-312, wherein the analyte includes single-stranded DNA or single-stranded RNA.

Embodiment 314 is the method of embodiment 313, wherein the single-stranded RNA is mRNA.

Embodiment 315 is the method of embodiment 313, wherein the single-stranded DNA is genomic DNA.

Embodiment 316 is the method of any one of embodiments 296-315, wherein the capture probe includes DNA.

Embodiment 317 is the method of embodiment 316, wherein the capture domain includes a poly (T) sequence.

Embodiment 318 is the method of embodiment 316, wherein the capture domain includes a gene-specific capture sequence.

Embodiment 319 is the method of any one of embodiments 296-318, wherein the analyte includes a protein.

Embodiment 320 is the method of embodiment 319, wherein the analyte includes a protein specifically bound by an analyte capture agent including (i) an analyte binding moiety that binds specifically to the protein, (ii) an analyte binding moiety barcode, and (ii) an analyte capture sequence that specifically binds to the capture domain of the capture probe to form a complex.

Embodiment 321 is the method of embodiment 320, wherein the analyte binding moiety is an antibody or an antigen-binding fragment thereof.

Embodiment 322 is the method of any one of embodiments 296-321, wherein the biological sample is a tissue sample.

Embodiment 323 is the method of embodiment 322, wherein the tissue sample is a tissue section.

Embodiment 324 is the method of embodiment 323, wherein the tissue section is a fixed tissue section.

Embodiment 325 is the method of embodiment 324, wherein the fixed tissue section is a formalin-fixed paraffin-embedded tissue section.

Embodiment 326 is the method of any one of embodiments 296-325, wherein the substrate includes a slide.

Embodiment 327 is the method of any one of embodiments 296-326, wherein the substrate includes a bead.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

All publications, patent applications, patents, and other references mentioned herein are incorporated by reference in their entirety. In case of conflict, the present specification, including definitions, will control. In addition, section headings, the materials, methods, and examples are illustrative only and not intended to be limiting.

What is claimed is:

1. A method of detecting completion of a template switching oligonucleotide (TSO) reaction, the method comprising:
   (a) contacting (i) a tissue section with (ii) a plurality of capture probes attached to an array, wherein a capture probe of the plurality comprises a capture domain, wherein the capture domain is positioned at a 3' end of the capture probe;
   (b) releasing one or more target nucleic acids from the tissue section, wherein a target nucleic acid released from the tissue section is bound by the capture domain of the capture probe;
   (c) extending the 3' end of the capture probe using the bound target nucleic acid as a template thereby creating an extended capture probe comprising a sequence that is complementary to the bound target nucleic acid;
   (d) adding to the 3' end of the extended capture probe a first homopolynucleotide sequence;
   (e) generating a second strand that comprises in a 5' to a 3' direction: a conjugated first agent, a second homopolynucleotide sequence, and a sequence corresponding to a portion of the bound target nucleic acid, wherein the first homopolynucleotide sequence hybridizes to the second homopolynucleotide sequence, and the step of generating the second strand comprises the use of a partially-double stranded template switching oligonucleotide sensor comprising:
   (i) a first oligonucleotide comprising a conjugated second agent at its 3' end, and
   (ii) a second oligonucleotide comprising the conjugated first agent at its 5' end and the second homopolynucleotide sequence at its 3' end, wherein the second oligonucleotide has a single-stranded overhang at its 3' end, and wherein:
   the conjugated first agent is a fluorophore and the conjugated second agent is a fluorescence quencher; or
   the conjugated first agent is a fluorescence quencher and the conjugated second agent is a fluorophore; or
   the conjugated first agent is a donor fluorophore and the conjugated second agent is an acceptor fluorophore; or
   the conjugated first agent is an acceptor fluorophore and the conjugated second agent is a donor fluorophore; and
   (f) measuring fluorescence upon release of the first oligonucleotide from the second oligonucleotide by extension of a 3' end of the extended first capture probe having the first homopolynucleotide sequence using the second oligonucleotide as a template, thereby detecting the completion of the TSO reaction.

2. The method of claim 1, wherein the target nucleic acid is RNA.

3. The method of claim 1, wherein the target nucleic acid is DNA.

4. The method of claim 1, wherein the capture probe further comprises a spatial barcode positioned 5' to the capture domain.

5. The method of claim 4, further comprising determining (i) all or a portion of a nucleic acid sequence corresponding to the target nucleic acid, or a complement thereof, and (ii) a nucleic acid sequence corresponding to the spatial barcode, or a complement thereof.

6. The method of claim 5, further comprising using the determined sequences of (i) and (ii) to identify a location of the target nucleic acid in the tissue section.

7. The method of claim 1, wherein the conjugated first agent is a fluorophore and the conjugated second agent is a fluorescence quencher, or the conjugated first agent is a fluorescence quencher and the conjugated second agent is a fluorophore.

8. The method of claim 2, wherein the RNA is an mRNA.

9. The method of claim 1, wherein the array comprises a slide.

10. The method of claim 1, wherein the array is a bead array.

11. The method of claim 7, wherein the conjugated first agent is a fluorophore and the conjugated second agent is a fluorescence quencher.

12. The method of claim 11, wherein the fluorophore comprises a xanthene moiety.

13. The method of claim 11, wherein the fluorophore is fluorescein, rhodamine, squaraine, naphthalene, oxadiazole, anthracene, pyrene, oxazine, acridine, arylmethine, tetrapyrrole, dipyrromethene, coumarin, cyanine, or a derivative thereof.

14. The method of claim 11, wherein the fluorescence quencher has an absorption range of 550 nm to 750 nm, 380 nm to 500 nm, 425 nm to 530 nm, 390 nm to 625 nm, 420 nm to 620 nm, 500 nm to 700 nm, 500 nm to 800 nm, 480 nm to 600 nm, 480 nm to 680 nm, 570 nm to 740 nm, 500 nm to 600 nm, or 575 nm to 720 nm.

15. The method of claim 1, wherein the tissue section is a fixed tissue section.

16. The method of claim 15, wherein the fixed tissue section is a formalin-fixed paraffin-embedded tissue section.

17. The method of claim 1, wherein the tissue section is a fresh, frozen tissue section.

\* \* \* \* \*

SEQUENCE LISTING

<160> NUMBER OF SEQ ID NOS: 2

<210> SEQ ID NO 1
<211> LENGTH: 16
<212> TYPE: RNA
<213> ORGANISM: Unknown
<220> FEATURE:
<223> OTHER INFORMATION: analyte polyA tail

<400> SEQUENCE: 1
aaaaaaaaaa aaaaaa                                                    16

<210> SEQ ID NO 2
<211> LENGTH: 10
<212> TYPE: DNA
<213> ORGANISM: Artificial Sequence
<220> FEATURE:
<223> OTHER INFORMATION: Capture domain

<400> SEQUENCE: 2
tttttttttt                                                           10